US012655577B2

(12) United States Patent
Hickman et al.

(10) Patent No.: US 12,655,577 B2
(45) Date of Patent: Jun. 16, 2026

(54) AUTONOMOUS DEVICES, SYSTEMS, AND METHODS FOR SORTING AND PACKING FOLDED HOUSEHOLD LAUNDRY

(71) Applicant: Monotony.ai, Inc., Watertown, MA (US)

(72) Inventors: Madeline R. Hickman, Arlington, MA (US); Marissa A. Bennett, Waltham, MA (US); Benjamin D. Bixby, Newton Highlands, MA (US); Samuel Duffley, Somerville, MA (US); Jesse Sielaff, Norfolk, MA (US); Kayla M. Swiston, Chestnut Hill, MA (US)

( * ) Notice: Subject to any disclaimer, the term of this patent is extended or adjusted under 35 U.S.C. 154(b) by 0 days.

(21) Appl. No.: 19/041,364

(22) Filed: Jan. 30, 2025

(65) Prior Publication Data

US 2025/0243623 A1 Jul. 31, 2025

Related U.S. Application Data

(60) Provisional application No. 63/627,377, filed on Jan. 31, 2024.

(51) Int. Cl.
*D06F 93/00* (2006.01)
*B07C 5/342* (2006.01)
(Continued)

(52) U.S. Cl.
CPC ............ *D06F 93/00* (2013.01); *B07C 5/3422* (2013.01); *B65B 25/20* (2013.01); *B65B 57/12* (2013.01)

(58) Field of Classification Search
CPC ....... B07C 5/3422; D06F 93/00; B65B 25/20; B65B 57/12; B65B 5/101
See application file for complete search history.

(56) References Cited

U.S. PATENT DOCUMENTS 3,967,716 A 7/1976 Smith
4,124,967 A 11/1978 Beer et al.
(Continued)

FOREIGN PATENT DOCUMENTS

CN 109365308 A 2/2019
CN 110595355 A 12/2019
(Continued)

OTHER PUBLICATIONS

Invitation to Pay Additional Fees corresponding to PCT/US2021/057322; Mailed: Feb. 14, 2022, (11 pages).
(Continued)

*Primary Examiner* — Daniel Jeremy Leeds
(74) *Attorney, Agent, or Firm* — Myers Bigel, P.A.

(57) ABSTRACT

Systems and methods for autonomously placing and rearranging a plurality of unbound folded laundry articles in an ordered queue for ordered packing in a container are described. The system includes a plurality of tiered platforms configured to receive thereon folded laundry articles, the platforms comprising at least one placer conveyor configured to load the articles in an order into a container. At least two cantilevering, bi-directional conveyors transit along opposite sides of the platforms configured to place, retrieve and stack folded laundry articles on the plurality of tiered platforms and the placer conveyor. At least one controller is in operable communication with drives and sensors of the system, a memory, and a communication network, the at least one controller being configured to instruct the bi-directional conveyors to deposit, retrieve, and stack together the folded laundry articles on the placer conveyor.

24 Claims, 44 Drawing Sheets

(51) Int. Cl.
*B65B 25/20* (2006.01)
*B65B 57/12* (2006.01)

(56) References Cited

U.S. PATENT DOCUMENTS

| | | | |
|---|---|---|---|
| 4,765,487 | A | 8/1988 | Bliss |
| 4,854,111 | A | 8/1989 | Roberts et al. |
| 4,862,677 | A | 9/1989 | Roberts et al. |
| 6,122,895 | A | 9/2000 | Schubert |
| 7,814,733 | B2 | 10/2010 | Carlson et al. |
| 8,689,530 | B2 | 4/2014 | Prahm et al. |
| 9,789,983 | B2 | 10/2017 | Brandhorst et al. |
| 10,287,048 | B2 | 5/2019 | Sytema et al. |
| 10,882,705 | B2 | 1/2021 | Overley |
| 11,059,690 | B2 | 7/2021 | Harrington et al. |
| 11,486,084 | B2 | 11/2022 | Schechter et al. |
| 11,623,828 | B2 | 4/2023 | Hickman et al. |
| 11,873,174 | B2 | 1/2024 | Hickman et al. |
| 2001/0040107 | A1 | 11/2001 | Tourre et al. |
| 2003/0019798 | A1 | 1/2003 | Capps et al. |
| 2003/0033788 | A1 | 2/2003 | Van |
| 2006/0070353 | A1 | 4/2006 | Van |
| 2007/0209327 | A1 | 9/2007 | Kent et al. |
| 2009/0266037 | A1 | 10/2009 | Odman et al. |
| 2010/0230432 | A1 | 9/2010 | Cardinal et al. |
| 2012/0191240 | A1 | 7/2012 | Gilmore |
| 2016/0135510 | A1 | 5/2016 | Ay |
| 2016/0145055 | A1 | 5/2016 | Sielermann et al. |
| 2017/0321372 | A1 | 11/2017 | Powell et al. |
| 2018/0029729 | A1 | 2/2018 | Kim et al. |
| 2018/0061255 | A1 | 3/2018 | Ekambaram et al. |
| 2019/0286138 | A1 | 9/2019 | Skaaksrud et al. |
| 2019/0287051 | A1 | 9/2019 | Heinla |
| 2020/0193336 | A1 | 6/2020 | Capoia et al. |
| 2020/0207550 | A1 | 7/2020 | De Boer et al. |
| 2020/0331645 | A1 | 10/2020 | Almogy et al. |
| 2020/0346792 | A1 | 11/2020 | Curhan et al. |
| 2020/0356951 | A1 | 11/2020 | Cristache |
| 2020/0376668 | A1 | 12/2020 | Russell |
| 2020/0407088 | A1 | 12/2020 | White et al. |
| 2021/0004646 | A1 | 1/2021 | Guizilini et al. |
| 2023/0416975 | A1 | 12/2023 | Schechter et al. |

FOREIGN PATENT DOCUMENTS

| | | | |
|---|---|---|---|
| DE | 29607058 | U1 | 7/1996 |
| EP | 1012086 | B1 | 12/2001 |

OTHER PUBLICATIONS

International Search Report and Written Opinion corresponding to PCT/US2021/057203; Mailed: Feb. 16, 2022, (14 pages).

International Search Report and Written Opinion corresponding to PCT/US2021/057322; Mailed: Apr. 5, 2022, (18 pages).

Dekken Machinery, “T-Apparel—Folding & Packing Solution for Garment”, YouTube Video—https://www.youtube.com/watch?v=wfn8DpXENms, Apr. 25, 2018.

Grenaamontage, “Pullnose, Pull nose, Conveyor, Teleskop conveyor, Teleskoptransportører”, YouTube Video—https://www.youtube.com/watch?v=_DEqMz1SdTc, Jan. 21, 2014.

Ingenia Solutions Ltd, “Automated Box Packing System”, YouTube Video—https://www.youtube.com/watch?v=qNF2vcOdQ04, Nov. 18, 2010.

Inwatec, “#Laundrynerds Expert Session: Greit Stack Storage & Pack-Out System (Live Stream 2)”, YouTube Video—https://www.youtube.com/watch?v=OchpR3VfUWo Streamed live on May 27, 2020.

Inwatec, “Automatic Linen Buffer and Storage”, YouTube Video—https://www.youtube.com/watch?v=RrhX_GzYXk0, May 18, 2018.

Inwatec, “Big Packing Machine—Automated Separation and Packing of Small Laundry Items”, Retrieved from: https://inwatec.dk/products/bag-packing-machine; Available as of the date of date of filing, (8 pages).

Inwatec, “Greit Stack Storage System, Automatic Storage and Transportation of Stacked Laundry Items with Greit”, Retrieved from: https://inwatec.dk/products/greit/; Available as of the date of filing, (9 pages).

Lahooti Printech Pvt. Ltd., “N Fold Hand Towel Paper Packing Machine | N fold Tissue Packing Machine”, YouTube Video—https://www.youtube.com/watch?v=wTARKYfzK6Y, Jan. 24, 2020.

Napkin Machine Manufacturer, “M Fold Paper Towel Machine with Automatic Packing Machine Line”, YouTube Video—https://www.youtube.com/watch?v=O1DYItFHEKM, Aug. 1, 2019.

Pan, Darren, “Automatic Tissue Paper Napkin Packing Machine”, YouTube Video—https://www.youtube.com/ watch?v=Y5QZVjr-5rU, Apr. 24, 2019.

Paschalidis, George, “T-shirt Automatic Folding & Stacking Machine (FX23)”, YouTube Video—https://www.youtube.com/watch?v=_uCL1e4j2PE, Jun. 17, 2010.

Proship, Inc., “CVP Automated Packaging Solution”, YouTube Video—https://www.youtube.com/watch?v=0oe24YsavF8, Jun. 28, 2018.

Ryonet, “ROQ Fold, ROQ Pack and ROQ Stack Automatic Folding Machine”, YouTube Video—https://www. youtube.com/watch?v=8X6mlKmulKQ, Mar. 28, 2017.

AUTONOMOUS DEVICES, SYSTEMS, AND METHODS FOR SORTING AND PACKING FOLDED HOUSEHOLD LAUNDRY

CROSS-REFERENCE TO RELATED APPLICATIONS

This application claims priority under 35 U.S.C. § 119 (c) to U.S. Provisional Patent Application Ser. No. 63/627,377 filed Jan. 31, 2024, titled "Autonomous Devices, Systems, and Methods for Sorting and Packing Folded Household Laundry," the entirety of which application is hereby incorporated by reference.

BACKGROUND

The present disclosure is directed to robotic laundry devices, systems, and methods for intelligently sorting and packing loads of washed and folded household laundry for return to their households.

Automating and outsourcing mundane, time-consuming household chores to robotic devices is increasingly common. Time-saving home robots include, for example, floor vacuuming and floor washing robots. Outsourcing responsibilities include, for example, engaging grocery shopping and delivery, and manually operated and human operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding and repacking clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to the customers outsourcing their laundry for cleaning. Human-reliant laundering services also require that employees touch the belongings of the customer, potentially exposing an employee to contaminants in the dirty laundry and potentially exposing the clean laundry to transferable pathogens, dust, hair, and other debris emanating from a laundry service employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital and hotel bed sheets, medical scrubs, and hotel towels. Such industrial machines are tailor-made to accept one type of laundry item of one size or style. For example, unique folding machines exist to accept washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households and aggregate clean, folded laundry for each individual within a household.

Autonomous robotic device, systems, and methods are provided to process loads of household laundry, in particular to intelligently stack and order clean folded laundry articles for packing in a container for shipment. Such autonomous robotic devices, systems, and methods eliminate human contact with deformable laundry articles and autonomously process batches of disparate article types and sizes. As such, the devices, systems, and methods need to be designed to be efficient and reliable for replacing the common, human-dependent chore of laundry.

SUMMARY

In one example, a system for autonomously placing and rearranging a plurality of folded laundry articles in a queue for sequential packing includes: a plurality of tiered platforms configured to receive thereon the plurality of folded laundry articles at a plurality of spaced apart positions, the plurality of tiered platforms including at least one placer conveyor configured to load the plurality of folded laundry articles in a sequential order into a refillable cartridge; at least two bi-directional conveyors disposed adjacent opposite longest sides of the plurality of tiered platforms configured to at least one of place a folded laundry article of the plurality of folded laundry articles on the plurality of tiered platforms, retrieve a folded laundry article of the plurality of folded laundry articles from the plurality of tiered platforms, and stack a folded laundry article of the plurality of folded laundry articles atop another one of the plurality of folded laundry articles disposed on at least one of the plurality of tiered platforms; at least two driven support towers slidably engaged with upper and lower support rails disposed along the opposite longest sides of the plurality of tiered platforms, each one of the at least two driven support towers having movably engaged thereon a carriage of the at least two bi-directional conveyors; at least two carriage drive motors configured to transit the carriage of each one of the at least two bi-directional conveyors longitudinally and vertically to reach each one of the plurality of spaced apart positions and to reach the at least one placer conveyor for placing a retrieved folded laundry article in the ordered queue; one or more sensors disposed at least one of on and adjacent at least one of the plurality of tiered platforms, the at least two bi-directional conveyors, and the at least two driven support towers, the one or more sensors being configured to output a signal indicative of at least one of one or more occupied spaced apart positions of the plurality of spaced apart positions, one or more characteristics of one or more folded laundry articles at each occupied spaced apart position, a height of a stacked one or more folded laundry articles disposed on the at least one placer conveyor, and a presence of a folded laundry article disposed on one or more of the at least two bi-directional conveyors; and at least one controller in operable communication with the at least two carriage drive motors, at least two support tower drives, the one or more sensors, a belt drive of each of the at least two bi-directional conveyors, a memory, and a communication network, the at least one controller being configured to instruct at least one drive of the at least two driven support towers to transit along the opposite longest sides of the plurality of tiered platforms to one of the plurality of spaced apart positions, and instruct at least one of an elevator drive and a cantilever drive of the at least two carriage drive motors to move at least one of the at least two bi-directional conveyors at least one of vertically and longitudinally to cantilever over and retract from one of the plurality of tiered platforms to at least one of deposit and retrieve at least one of the plurality of folded laundry articles at the one of the plurality of spaced apart positions.

Implementations of the system may include one or more of the following features.

In examples, the at least one controller is further configured to receive via the communication network a signal indicative of the one or more characteristics of each one of the plurality of folded laundry articles.

In examples, the one or more characteristics include at least one of an article size, article height, article type, article color, article tilt direction relative to the opposite longest sides of the plurality of tiered platforms, article tilt angle, article material, and article wearer.

In examples, the at least one controller is further configured to store in the memory an association of the one or more characteristics of each one of the plurality of folded laundry articles placed on the plurality of tiered platforms and an occupied one of the plurality of spaced apart positions at which each one of the plurality of folded laundry articles is disposed.

In examples, the at least one controller is further configured to determine, based on the one or more characteristics, an order of arranging on the at least one placer conveyor for packing, two or more of the plurality of folded laundry articles, instruct at least one of the at least two support tower drives and at least one of the at least two carriage drive motors to move at least one of the at least two bi-directional conveyors to a spaced apart position of one of the plurality of folded laundry articles, instruct the belt drive to rotate in a reverse direction to retrieve one of the plurality of folded laundry articles from the spaced apart position, instruct at least one of the at least two support tower drives and at least one of the at least two carriage drive motors transit the at least one of the at least two bi-directional conveyors and the retrieved one of the plurality of folded laundry articles to an ordered position along the at least one placer conveyor, and instruct a belt drive of the at least one of the at least two bi-directional conveyors to rotate in a forward direction to place the retrieved one of the plurality of folded laundry articles at least one of on the at least one placer conveyor and atop a previously deposited another one of the plurality of folded laundry articles in the ordered position for packing.

In examples, determining the order of arranging on the at least one placer conveyor for packing further includes receiving outputs from one or more sensors regarding each one of the placed folded laundry articles of the plurality of folded laundry articles and determining an order of packing based on at least one of detected folded article sizes of the plurality of folded laundry articles and known packing container dimensions.

In examples, the detected folded article sizes are variable among the plurality of folded laundry articles, the plurality of folded laundry articles includes household laundry belonging to a common household, and the household laundry includes two or more article types of at least one of different sizes and different shapes, the two or more article types including a longest dimension of between about 4 cm to 500 cm.

In examples, instructing at least one of the at least two carriage drive motors to move at least one of the at least two bi-directional conveyors includes instructing two or more of the at least two carriage drive motors simultaneously to move two or more of the at least two bi-directional conveyors.

In examples, the at least two bi-directional conveyors run 90 degrees to an orientation the opposite longest sides of the plurality of tiered platforms.

In examples, the plurality of spaced apart positions includes at least two parallel lengths of positions disposed adjacent each longest opposite side of the plurality of tiered platforms, and each one of the at least two bi-directional conveyors is configured to reach all of the plurality of spaced apart positions in either of the at least two parallel lengths of positions.

In examples, the at least two bi-directional conveyors include a conveyor configured to receive a folded laundry article from a folding robot and place the retrieved folded laundry article at one of the plurality of spaced apart positions on one of the plurality of tiered platforms, and a stacking conveyor configured to retrieve the folded laundry article from the one of the plurality of spaced apart positions and stack the folded laundry article on the at least one placer conveyor in the order for packing into the refillable cartridge.

In examples, the at least one controller is configured to store in the memory the one of the plurality of spaced apart positions on which the retrieved folded laundry article is placed and at least one article characteristic including at least one of folded article size and article type.

In examples, the at least one controller is configured to instruct the stacking conveyor to retrieve one or more articles for packing based on at least one of evaluating the one or more characteristics of each one of one or more placed laundry articles at one or more spaced apart positions and receiving at least one sensor output indicative of at least one of a folded article size and article type of one or more laundry articles being folded or expected to be folded.

In examples, the at least one controller is further configured to retrieve from a database for determining the order of packing one or more characteristics including at least one of article wearer and customer sorting preference.

In examples, the one or more sensors includes at least one of an image sensor, a position sensor, and a distance sensor.

In examples, the one or more sensors include at least one of a 3-D camera, an IR sensor, a 2-D camera, LIDAR, LADAR, a sonar proximity sensor, an ultrasonic ranging sensor, a radar sensor, and a pair of stereo depth cameras.

In examples, the at least one controller is configured to analyze a received image from an image sensor and process the received image with a classifier to determine at least one of the one or more characteristics.

In examples, each one of the at least two bi-directional conveyors include a rotatable surface disposed on the carriage and a drive motor configured to rotate the rotatable surface to move an article disposed thereon in a direction of motion of the rotatable surface.

In examples, the system further includes at least one retractable plunger configured to at least one of compress one or more folded laundry articles disposed within a refillable cartridge configured to be loaded with one or more folded laundry articles by the at least one placer conveyor and detect a stack height of the one or more folded laundry articles disposed within the refillable cartridge, the at least one retractable plunger including one or more springs mounted to a top surface of a plunger plate.

In examples, a method for rearranging in a packing order on a placer conveyor a plurality of folded laundry articles, includes: identifying, at a controller, an unoccupied position along a length of each one of a plurality of tiered platforms configured to receive each one of the plurality of folded laundry articles at a plurality of spaced apart positions, the unoccupied position being at least one of tracked by the controller and detected by one or more sensors configured to output a signal to the controller indicative of the position being unoccupied by a fold laundry article; instructing a motor drive of one of at least two bi-directional conveyors to place one of the plurality of folded laundry articles in the identified unoccupied position; receiving a sensor signal indicative of at least one characteristic associated with the placed one of the plurality of folded laundry articles; storing in a memory in communication with the controller the at least one characteristic of the placed one of the plurality of folded laundry articles and the position where the one of the plurality of folded laundry articles is placed, the at least one article characteristic including at least one of folded article size and article type; identifying two or more folded laundry articles of the plurality of folded laundry articles placed on the plurality of tiered platforms to at least one of stack together and place in an ordered queue on the placer conveyor for placement in a container of known dimensions; and instructing at least one motor drive of the at least two bi-directional conveyors in operable communication with the controller to move one of the at least two bi-directional conveyors to each stored position of the identified two or more folded laundry articles; retrieve the identified two or more folded laundry articles individually; and place the retrieved two or more folded laundry articles on the placer conveyor in at least one of a collated stack and an ordered queue.

Implementations of the method may include one or more of the following features.

In examples, the controller is configured to instruct at least one of the at least two bi-directional conveyors to retrieve the identified two or more folded laundry articles upon determining 80 percent or more of the spaced apart positions are occupied by the plurality of folded laundry articles.

In examples, the plurality of folded laundry articles are separated, spread, and folded by a plurality of autonomous systems including one or more sensors configured to detect one or more characteristics of each on of the plurality of folded laundry articles and communicate the detected one or more characteristics to the controller for determining two or more articles for stacking together on the placer conveyor.

In examples, the at least two bi-directional conveyors include a conveyor configured to receive a folded laundry article from a folding robot and place the retrieved folded laundry article at one of the plurality of spaced apart positions on one of the plurality of tiered platforms, and a stacking conveyor configured to retrieve the folded laundry article from the one of the plurality of spaced apart positions and stack the folded laundry article on the at least one placer conveyor in the order for packing into a refillable packing cartridge.

In examples, the method further includes instructing the stacking conveyor to retrieve one or more folded laundry articles of the plurality of folded laundry articles from the plurality of platforms for packing based on at least one of evaluating the one or more characteristics of each one of one or more placed folded laundry articles at one or more of the plurality of spaced apart positions and receiving at least one sensor output indicative of at least one of a folded article size and article type of one or more laundry articles being folded by the folding robot or expected to be folded and received by one of the at least two bi-directional conveyors.

In one example, a system for autonomously placing and rearranging in a plurality of unbound folded laundry articles an ordered queue for ordered packing in a container includes: a plurality of tiered platforms each configured to receive thereon the plurality of unbound folded laundry articles at a plurality of spaced apart coordinate positions along a length of each one of the plurality of tiered platforms. The plurality of tiered platforms include at least one placer conveyor configured to load the plurality of folded laundry articles in an order into a refillable cartridge configured to load the container. The system includes at least two bi-directional conveyors disposed adjacent opposite sides of the plurality of tiered platforms configured to at least one of place a folded laundry article on the plurality of tiered platforms, retrieve a folded laundry article from the plurality of tiered platforms, and stack a folded laundry article atop another one of the plurality of unbound folded laundry articles disposed on at least one of the plurality of tiered platforms. The system includes at least two driven support towers slidably engaged with upper and lower support rails disposed along the length of opposite sides of the plurality of tiered platforms, each one of the at least two driven support towers having movably engaged thereon a carriage of the at least two bi-directional conveyors. At least two carriage drive motors are configured to transit the carriage of each one of the at least two bi-directional conveyors longitudinally and vertically to reach each one of the plurality of spaced apart coordinate positions and to reach the at least one placer conveyor for placing a retrieved folded laundry article in the ordered queue. The system includes one or more sensors disposed at least one of on and adjacent at least one of the plurality of tiered platforms, the at least two bi-directional conveyors, and the at least two driven support towers, the one or more sensors being configured to output a signal indicative of at least one of one or more occupied spaced apart coordinate positions of the plurality of spaced apart coordinate positions, one or more characteristics of one or more unbound folded laundry articles at each occupied spaced apart coordinate position, a height of a stacked one or more folded laundry articles disposed on the at least one placer conveyor, and a presence of a folded laundry article disposed on one or more of the at least two bi-directional conveyors. The system includes at least one controller in operable communication with the at least two carriage drive motors, at least two support tower drives, the one or more sensors, a belt drive of each of the at least two bi-directional conveyors, a memory, and a communication network. The at least one controller is configured to instruct at least one drive of the at least two driven support towers to transit along the length of the plurality of tiered platforms to one of the plurality of spaced apart coordinate positions, and instruct at least one of an elevator drive and a cantilever drive of the at least two carriage drive motors to move at least one of the at least two bi-directional conveyors at least one of vertically and longitudinally to cantilever over and retract from one of the plurality of tiered platforms to at least one of deposit and retrieve at least one of the plurality of unbound folded laundry articles at the one of the plurality of spaced apart coordinate positions.

Implementations of the system may include one or more of the following features.

In examples, the at least one controller is further configured to receive via the communication network a signal indicative of the one or more characteristics of each one of the plurality of unbound folded laundry articles.

In examples, the one or more characteristics include at least one of an article size, article height, article type, article color, article tilt direction relative to a longitudinal axis of the plurality of tiered platforms, article tilt angle, article material, and article wearer.

In examples, at least one of the one or more sensors and one or more additional sensors of one or more robot preceding the system is configured to detect the one or more characteristics and output a signal to the at least one controller indicative of detected one or more characteristics.

In examples, the detected one or more characteristics are stored in the memory in a database.

In examples, the at least one controller is further configured to store in the memory, an association of the one or more characteristics of an unbound folded laundry article placed on the plurality of tiered platforms and the one of the plurality of spaced apart coordinate positions at which the unbound folded laundry article is disposed.

In examples, the at least one controller is further configured to determine, based on the one or more characteristics, an order of arranging on the at least one placer conveyor for packing, two or more of the plurality of folded laundry articles, instruct at least one of the at least two carriage drive motors to move at least one of the at least two bi-directional conveyors to a spaced apart coordinate position of one of the plurality of folded laundry articles, instruct the belt drive to rotate in a reverse direction to retrieve the one of the plurality of folded laundry articles from the spaced apart coordinate position, instruct at least one of the at least two carriage drive motors transit the at least one of the at least two bi-directional conveyors and the retrieved one of the plurality of folded laundry articles to an ordered position along the at least one placer conveyor, and instruct the belt drive to rotate in a forward direction to place the one of the plurality of folded laundry articles at least one of on the at least one placer conveyor and atop a previously deposited another one of the plurality of folded laundry articles in the determined order for packing.

In examples, determining the order of arranging on the at least one placer conveyor for packing further includes receiving outputs from one or more sensors regarding each one of the placed folded laundry articles of the plurality of folded laundry articles and determining an order of packing based on at least one of detected folded article sizes of the plurality of folded laundry articles and known container dimensions.

In examples, the detected folded article sizes are variable among the plurality of folded laundry articles.

In examples, the at least one controller is configured to receive output of one or more additional sensors disposed on or adjacent a preceding robot, and wherein the preceding robot is one of a plurality of autonomous robots configured to at least one of sort, wash, dry, separate, spread, fold, and deliver the plurality of folded unbound laundry articles to the at least two bi-directional conveyors.

In examples, instructing at least one of the at least two carriage drive motors to move at least one of the at least two bi-directional conveyors includes instructing two or more of the at least two carriage drive motors simultaneously to move two or more of the at least two bi-directional conveyors.

In examples, the at least two driven support towers are configured to engage with the plurality of tiered platforms at a top end and at a bottom end, and the top end and bottom end are configured to be driven synchronously.

In examples, the at least two bi-directional conveyors run 90 degrees to the length of the plurality of tiered platforms.

In examples, one of the at least two bi-directional conveyors receives each one of the plurality of folded laundry articles from a discharge station including a rotatable platform.

In examples, the discharge station is configured to rotate to orient a folded edge of a laundry article thereon with a double nose retrieval conveyor.

In examples, each one of the at least two bi-directional conveyors includes a double nose conveyor and a receiving end configured to nest with a discharge end of the retrieval conveyor.

In examples, the plurality of spaced apart coordinate positions includes at least two parallel lengths of positions disposed adjacent each longitudinal edge of the plurality of tiered platforms.

In examples, each one of the at least two bi-directional conveyors is configured to reach all of the plurality of spaced apart coordinate positions in either of the at least two parallel lengths of positions.

In examples, the at least two bi-directional conveyors include a conveyor configured to receive a folded laundry article from a discharge station and place the retrieved folded laundry article at one of the plurality of spaced apart coordinate positions on one of the plurality of tiered platforms, and a stacking conveyor configured to retrieve the folded laundry article from the one of the plurality of spaced apart coordinate positions and stack the folded laundry article on the at least one placer conveyor in the order for packing into the refillable cartridge.

In examples, the at least one controller is configured to store in the memory the one of the plurality of spaced apart coordinate positions on which the retrieved folded laundry article is placed and at least one article characteristic including at least one of folded article size and article type.

In examples, the at least one controller is configured to instruct the stacking conveyor to retrieve one or more articles for packing based on at least one of evaluating the one or more characteristics of each one of one or more placed laundry articles at one or more spaced apart coordinate positions and receiving at least one sensor output indicative of at least one of a folded article size and article type of one or more laundry articles being folded or expected to be folded.

In examples, the at least two bi-directional conveyors are configured to retrieve one the plurality of folded laundry articles from the plurality of tiered platforms and arrange the retrieved folded laundry article on the at least one placer conveyor for loading into the refillable cartridge.

In examples, the at least one placer conveyor includes an extendable nose roller.

In examples, the at least one placer conveyor includes at least one slidable support beam attached to the extendable nose roller, the at least one slidable support beam being configured to support a conveyor belt thereon as the extendable nose roller extends.

In examples, the at least one placer conveyor includes at least two side by side placer conveyors configured to at least one of extend independently and extend simultaneously.

In examples, the refillable cartridge spans a combined width of the at least two side by side placer conveyors.

In examples, the refillable cartridge is configured to movably engage a vertical lifter affixed to the at least one placer conveyor for vertical, horizontal, and depth alignment with the extendable at least two side-by side placer conveyors.

In examples, the at least one controller is further configured to retrieve from a database for determining the order of packing one or more characteristics including at least one of article wearer and customer sorting preference.

In examples, the at least one controller is further configured to receive via the communication network a user input indicative of the one or more characteristics of each one of the plurality of unbound folded laundry articles.

In examples, the one or more sensors includes at least one of an image sensor, a position sensor, and a distance sensor.

In examples, the one or more sensors include at least one of a 3-D camera, an IR sensor, a 2-D camera, LIDAR, LADAR, a sonar proximity sensor, an ultrasonic ranging sensor, a radar sensor, and a pair of stereo depth cameras.

In examples, the at least one controller is configured to analyze a received image from an image sensor and process the image with a classifier to determine at least one of a folded state and at least one of the one or more characteristics.

In examples, each one of the at least two bi-directional conveyors include a rotatable surface disposed on the carriage and a drive motor configured to rotate the rotatable surface to move an article disposed thereon in a direction of motion of the rotatable surface.

In examples, the carriage includes a proximity sensor configured to output a signal indicative of an unacceptable height of the carriage relative to a surface of one of the plurality of tiered platforms.

In examples, the carriage includes a pair of nose wheels configured to elevate the one of the at least two bi-directional conveyors from a surface of one of the plurality of tiered platforms while at least one of placing and retrieving a folded laundry article on one of the plurality of spaced apart coordinate positions.

In examples, the system further includes at least one of a motor encoder and a hall sensor configured to output a signal indicative of each of one of the plurality of spaced apart coordinate positions.

In examples, the plurality of unbound folded laundry articles includes household laundry belonging to a common household In examples, the household laundry includes two or more article types of at least one of different sizes and different shapes.

In examples, each one of the two or more article types includes a longest dimension of between about 4 cm to 500 cm.

In examples, the system further includes at least one retractable plunger configured to at least one of compress one or more folded laundry articles disposed within the refillable cartridge and detect a stack height of the one or more folded laundry articles dispose within the refillable cartridge, the at least one retractable plunger including one or more constant force springs mounted to a top surface of a plunger plate.

In one example, a method for rearranging in a packing order a plurality of unbound folded laundry articles disposed on a plurality of tiered platforms, including: identifying an unoccupied a coordinate position along a length of each one of the plurality of tiered platforms; instructing a motor drive of one of at least two bi-directional conveyors to place a folded laundry article of the plurality of unbound folded laundry articles in the identified coordinate position; receiving a sensor signal indicative of at least one characteristic associated with the folded laundry article; storing in a memory the at least one characteristic of the placed folded laundry article and the coordinate position where the folded laundry article is placed; identifying two or more folded laundry articles placed on the plurality of tiered platforms to at least one of stack together and place in an ordered queue on a placer conveyor for placement in a container of known dimensions; and instructing at least one motor drive of the at least two bi-directional conveyors to move one of the at least two bi-directional conveyors to each stored coordinate position of the identified two or more folded laundry articles; retrieve the identified two or more folded laundry articles one-by-one; and place the retrieved two or more folded laundry articles on a placer conveyor in at least one of a collated stack and an ordered queue.

DETAILED DESCRIPTION

This disclosure relates to autonomous robotic devices, systems, and methods for sorting, intelligently batching (e.g., aggregating), and queuing clean, folded residential laundry articles of various types and sizes for efficiently and securely packing them into a return shipping container. Implementations described herein are configured to intelligently sort and batch folded laundry articles for packing into a container with little or no pockets of unused volume that could lead to instability of the folded stacks and/or wasted transport space. One or more autonomous process lines comprise a plurality of robotic devices configured to work in concert to process a dirty load of household laundry from a mass of dirty, non-uniform articles to individually separated, cleaned, and folded laundry articles. The plurality of robotic devices operate without human intervention to efficiently and effectively launder a customer's dirty laundry items. This disclosure relates to autonomous robotic devices configured to autonomously and intelligently place, sort, arrange, and queue for packing on a plurality of tiered platforms a plurality of clean, folded deformable laundry articles for return to a residential household. The laundry articles are collected from a household and delivered to the autonomous process line for cleaning and autonomous packing for return to the household. The laundry articles can comprise a plurality of deformable article types and sizes. The autonomous processes are time, energy, and cost efficient, eliminate human intervention-based delays, eliminate line workers and associated introduction of human contaminants potentially introduced by line workers, and eliminate any concerns with having private personal items handled by strangers.

Figure 1:
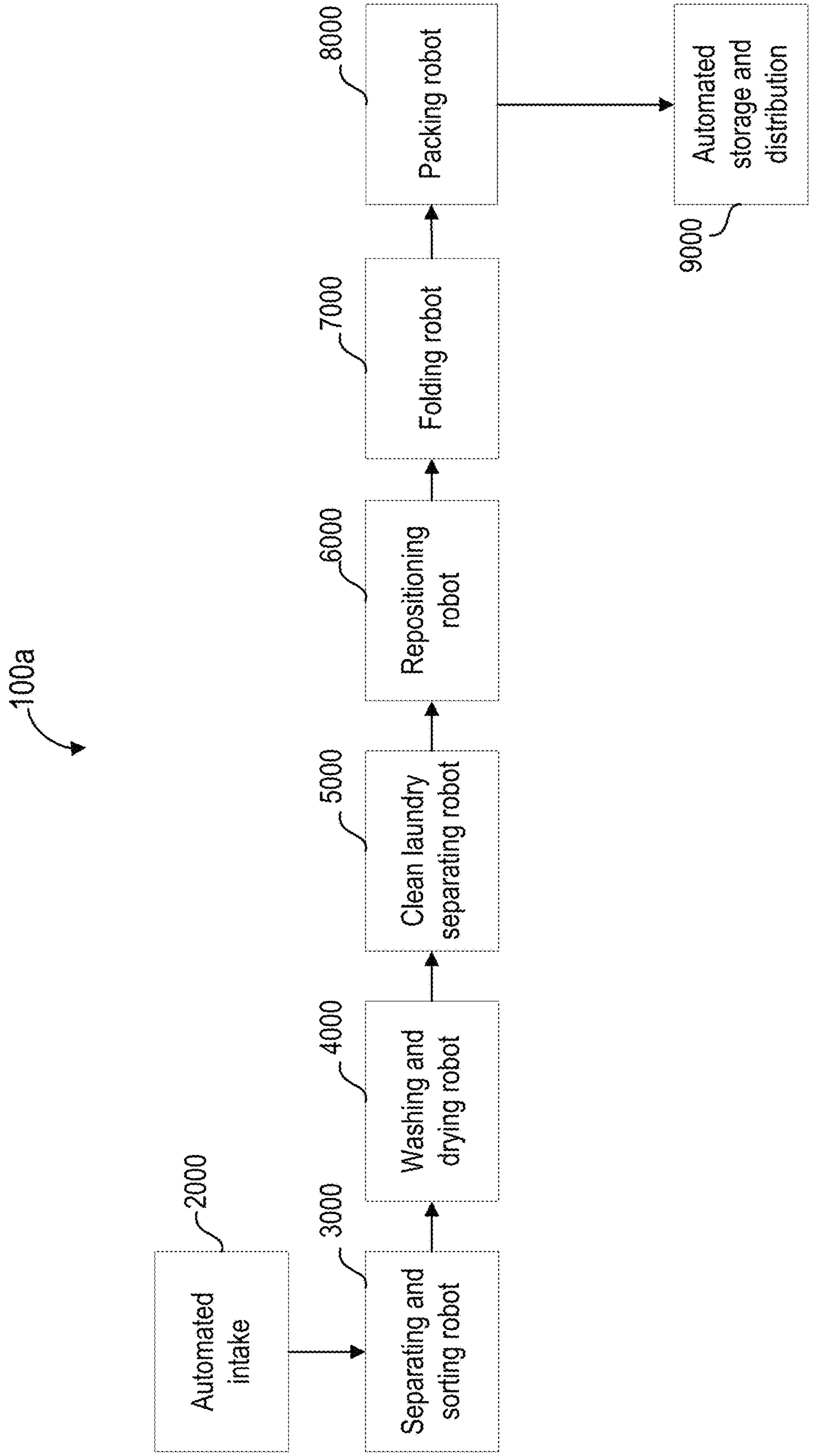
FIG. 1 depicts a schematic of an example autonomous robotic laundry process line.

As shown in FIG. 1, in implementations of the system, a laundry facility process line 100*a* comprises a plurality of autonomous robots configured to operate in series without human intervention to process and transport dirty laundry through the cleaning process and fold and repack the clean laundry for return to a household. In one implementation, the process line 100*a* comprises an autonomous intake robot 2000 for receiving one or more loads of dirty household laundry comprising a plurality of deformable laundry articles associated with a single household. The deformable laundry articles can be non-uniform in type, size, shape, color, and fabric and can require particular treatment and handling. For example, the plurality of deformable laundry articles can include items commonly laundered in homes, such as sheets, towels, tablecloths, and adults' and childrens' garments such as, for example, tee shirts, pants, socks, undergarments, hooded sweatshirts, baby socks, wash cloths, dresses, open front dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles pertaining to a single customer and/or household. In implementations, the separating and sorting robot 3000 is configured to sort each one of the separated deformable laundry articles into one or more related batches for washing. In implementations, the separating and sorting robot 3000 is configured to intelligently batch the separated each one of the deformable laundry articles into its own dedicated load or into a load with at least one other separated deformable laundry article according to a programmed sorting algorithm. The programmed sorting algorithm can be based, for example, on criteria including at least one of material color, material type, customer washing preference, water temperature requirements, article type, and load size. In implementations, the separating and sorting robot 3000 is configured to identify and record the number and types of garments in each load of laundry and provide this information to one or more robots in the process line 100*a*.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate each washed and dried batched load of clean laundry into individual deformable laundry articles for introduction into a repositioning robot 6000. The repositioning robot 6000 receives a single deformable laundry article and manipulates and repositions it for automated introduction into a folding robot 7000, which automatically folds the laundry article for introduction to a packing robot 8000. In implementations, the packing robot 8000 is a system comprising one or more autonomous devices working in concert and in series to automatically and intelligently place, sort, stack, queue, and pack one or more clean loads of household laundry comprising a plurality of clean and folded deformable laundry articles into one or more shipping containers for automated redistribution to the residential household customer. In implementations, the shipping container is a reusable container. In implementations, the shipping container is a disposable container. In implementations, the shipping container is at least one of a rigid box and a bag. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529.

Figure 2:
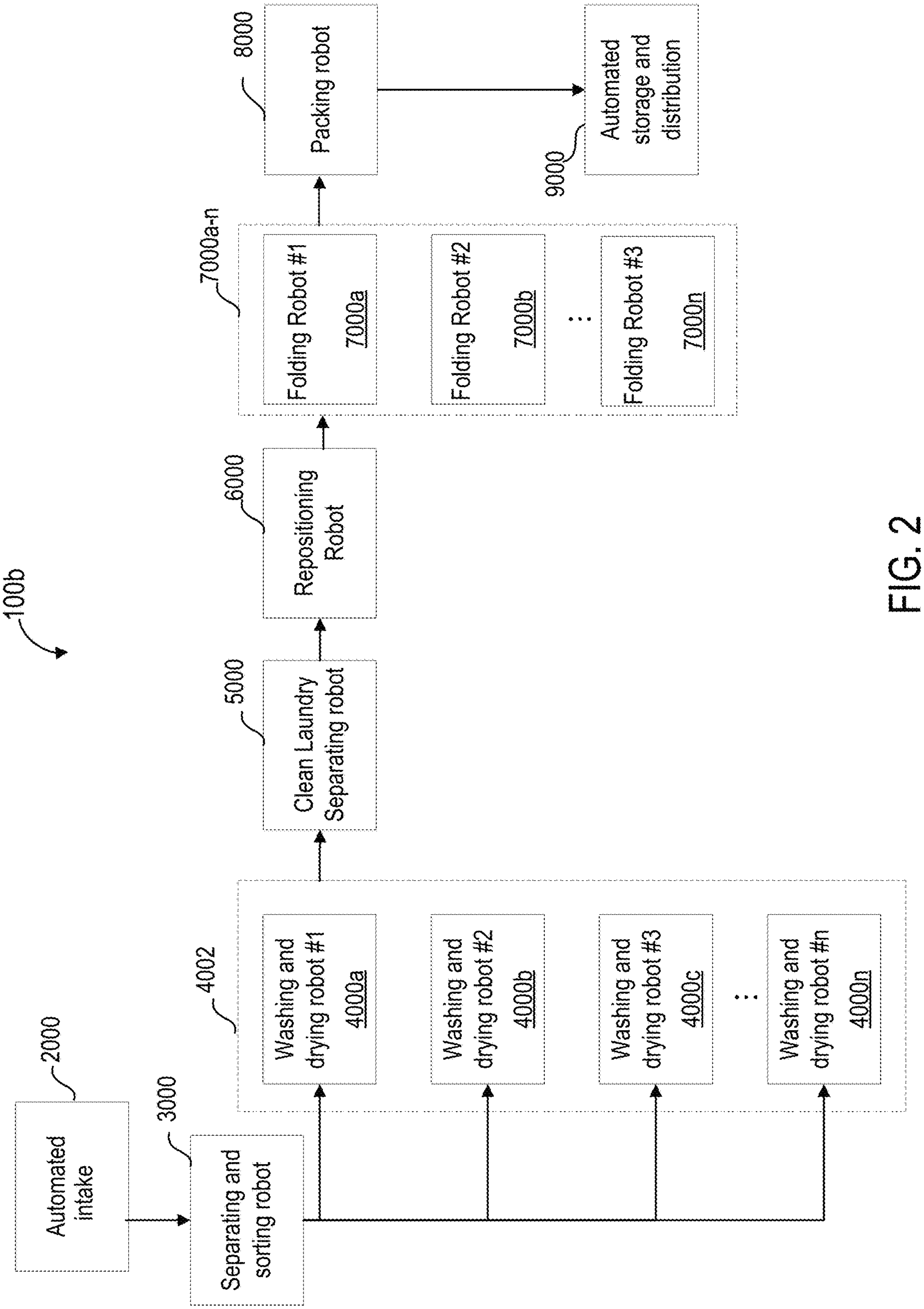
FIG. 2 depicts a schematic of an example autonomous robotic laundry process line comprising a plurality of washing and drying robots and a plurality of folding robots.

Implementations of the process line 100*a* of household laundry cleaning robots can comprise one or more of each of the robots depicted in FIG. 1. For example, as shown in FIG. 2, each autonomous process line 100*b* can include a plurality of washing and drying robots 4000*a-n*, wherein "n" represents a total number of robots in the cluster 4002. (Throughout the description herein "n" is used to indicate a non-determinative number of units greater than one (1) and is not intended to be limited to the number of elements shown in figures with a limited number of elements.) In implementations, the plurality of washing and drying robots 4000*a-n* comprises one or more clusters 4002 of washing and drying robots 4000*a-n* accessing shared services (e.g., water, air, washing chemicals, etc.) delivered to each cluster 4002. Additionally or alternatively, in implementations, the autonomous process line 100*b* includes a plurality of washing and drying robots 4000*a-n* shared by two or more sets of automated intake robots 2000 and dirty laundry separating and sorting robots 3000 and two or more sets of clean laundry separating robots 5000, repositioning robots 6000, folding robots 7000, and packing robots 8000. Additionally or alternatively, the process line 100*b* can include a plurality of folding robots 7000*a-n* (where "n" represents a count of robots greater than one (1) configured to receive spread apart and/or repositioned clean laundry articles from one or more repositioning robots 6000. In implementations, having the number of folding robots 7000*a-n* exceed a number of repositioning robots can prevent a process bottleneck at the folding step. In implementations, having one repositioning robot 6000 delivering spread laundry articles to at least two folding robots results in a throughput time savings in a range of between about 30% to 50% over a one-to-one pairing of a repositioning robot 6000 to a single folding robot 7000. Additionally or alternatively, in implementations, a plurality of folding robots 7000*a-n* can be stacked, or tiered, to reduce overall floor space (e.g., floor 10) occupancy of the process line 100, 100*a-b* within a facility. Additionally, two or more of the robots in a process line 100, 100*a-b* (collectively referred to hereinafter as "the process line 100") can be combined in a single module in alternate implementations. In implementations, one or more of the robots 2000-9000 in the process line 100 are configured to communicate over wired connections or wireless communication protocols. For example, in implementations, one or more robots in the process line 100 can communicate with another one or more robots in the process line 100 over a wired BUS, LAN, WLAN, 4G, 5G, LTE, Ethernet, BLUETOOTH, or other IEEE 801.11 standard.

Figure 3:
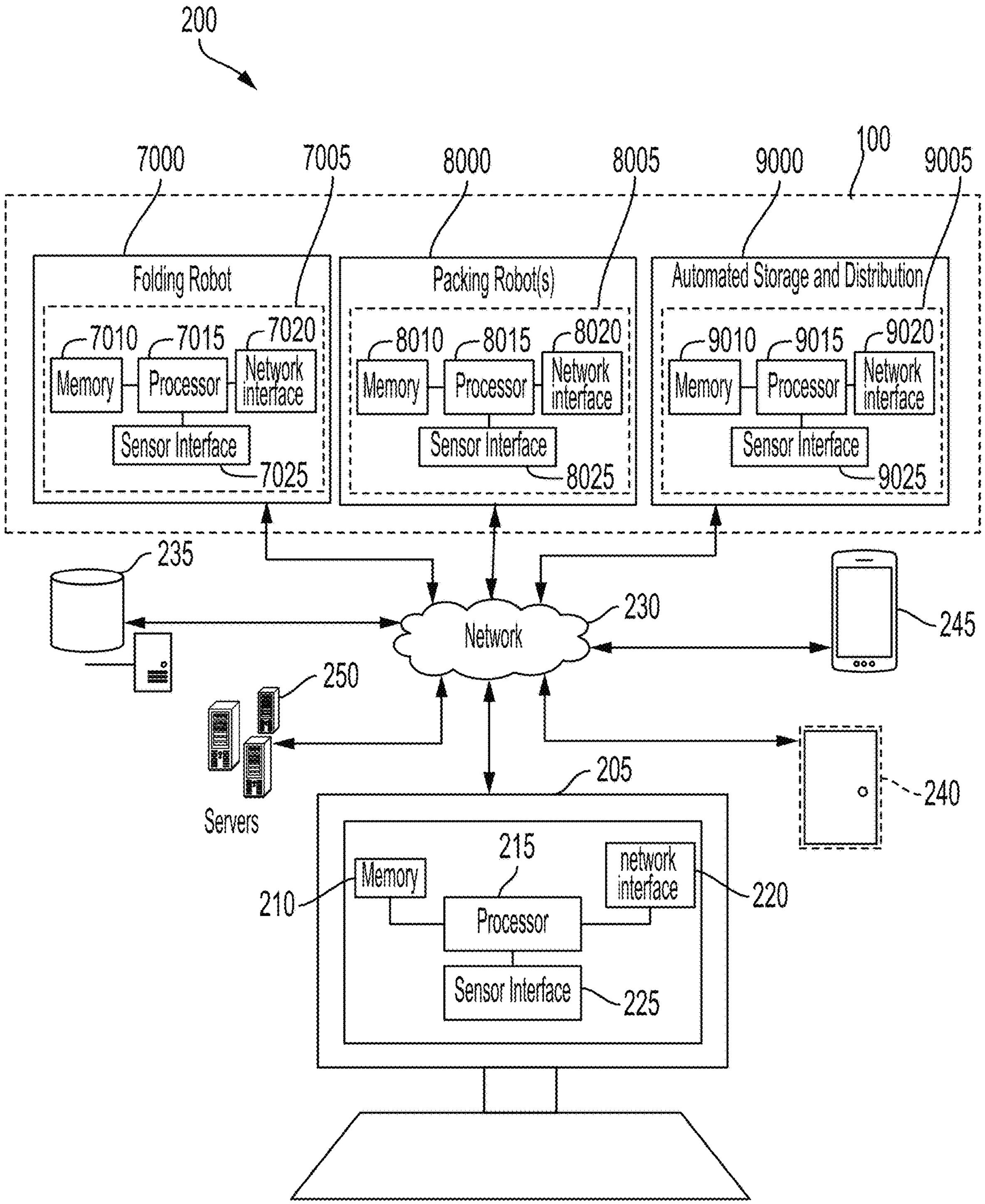
FIG. 3 depicts a schematic example of a system for controlling an autonomous robotic process line.

Referring to FIG. 3, an example of a system 200 of operatively connected autonomous robots is shown. FIG. 3 depicts a schematic implementation of a portion of an autonomous robotic process line 100 that processes the clean deformable laundry articles. Although each robot is referred to in singular form with regard to the schematic of FIG. 3, this is by way of example only, and, in implementations, each representative robot can represent a plurality of robots. A packing robot 8000 is in operative communication with one or more folding robots 7000 configured to output folded laundry articles from one or more batched loads of household laundry to the packing robot 8000, and, in implementations, the packing robot 8000 is in communication with an automated storage and distribution system configured to receive and queue a packed one or more shipping containers (e.g., boxes) for return to the residential household customer. In implementations, each robot 7000, 8000, 9000 includes at least one controller 7005, 8005, 9005 configured to operate the associated robot.

For example, in implementations, the packing robot 8000 includes one or more controllers 8005. Each of the one or more controllers 8005 includes a processor 8015 in communication with a memory 8010, a network interface 8020, and a sensor interface 8025. The processor 8015 can be a single microprocessor, multiple microprocessors, a many-core processor, a microcontroller, and/or any other general purpose computing system that can be configured by software and/or firmware. In implementations, the memory 8010 contains any of a variety of software applications, algorithms, data structures, files and/or databases as appropriate to the requirements of repositioning non-uniform deformable laundry articles. In one implementation, the controller 8005 includes dedicated hardware, such as single-board computers, one or more GPUs, application specific integrated circuits (ASICs), and field programmable gate arrays (FPGAs).

A network interface 8020 is configured to couple the controller 8005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 8020 is coupled to the network 230 via a networking device, such as a bridge, router, or hub. In other implementations, the network 230 may involve only two endpoints that each have a network connection directly with the other. In implementations, the network interface 8020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 8005 can transmit data via the network interface 8020 using a variety of security measures including, for example, TLS, SSL or VPN. In implementations, the network interface 8020 includes both a physical interface configured for wireless communication and a physical interface configured for wired communication. According to various embodiments, the network interface 8020 enables communication between the controller 8005 of the packing robot and at least one of the plurality of robots 2000, 3000, 4000, 5000, 6000, 7000, 9000 of the process line 100.

Additionally or alternatively, the network interface 8020 is configured to facilitate the communication of information between the processor 8015 and one or more other devices or entities over the network 230. For example, in implementations, the network interface 8020 is configured to communicate with a remote computing device such as a computing terminal 205, database 235, server 240, smartphone 245, and server farm 250. In implementations, the network interface 8020 can include communications circuitry for at least one of receiving data from a database 235 and transmitting data to a remote server 240, 250. In some implementations, the network interface 7020 can communicate with a remote server over any of the wired protocols previously described, including a WI-FI communications link based on the IEEE 802.11 standard.

In some examples in accordance with FIG. 3, the network 230 may include one or more communication networks through which the various robots and computing devices illustrated in FIG. 3 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although an embodiment of a controller 8005 of the packing robot 8000 is described herein in particular, one or more of the plurality of robots 2000, 3000, 4000, 5000, 6000, 7000, 9000 of the process line 100 includes similar components having similar functionality.

In implementations, the packing robot 8000 (also alternatively referred hereinafter as the "packing system 8000") can be a packing system comprising one or more autonomous devices working in concert (e.g., as controlled as a group) to autonomously retrieve and place clean, folded deformable laundry articles onto one or more tiered platforms for rearranging in an intelligently ordered packing queue for return to a residential household in as few shipping containers as possible, with as little open space as possible within the container to prevent toppling. Additionally, the clean, folded deformable laundry articles can be arranged for packing in logical batches of household wearers' articles for simplified grouped return to household drawers, shelves, and closets. The system 8000 is configured to lay out the folded laundry articles on a plurality of platforms 8105*a-n* and intelligently rearrange and/or stack in one or more optimized groupings of folded laundry articles from a household in a queue for packing. As will be described subsequently with regard to implementations, the queue of sorted and rearranged laundry articles is optimized for known and detected customer categories and preferences, stack stability, loading success, and fill completion in a customer return container.

Figure 4:
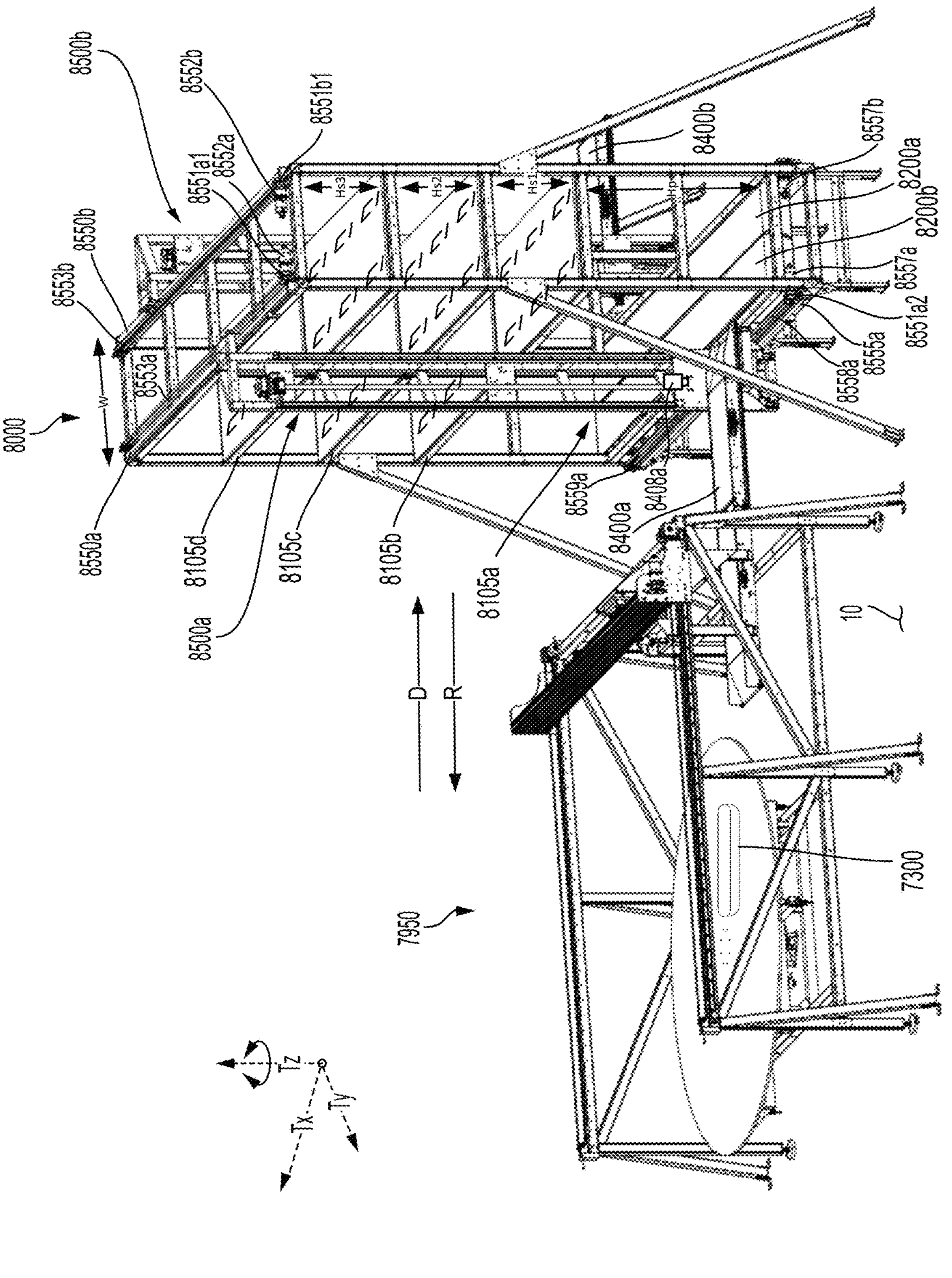
FIG. 4 depicts a perspective front view of an example system for receiving, placing, sorting, stacking, and queuing unbound folded household laundry articles for packing into a shipping container.

In implementations, as shown in FIG. 4, a system 8000 for autonomously placing and rearranging in a plurality of unbound folded laundry articles in an ordered queue for ordered packing in a container for return to the residential household from which the laundry articles came comprises a plurality of tiered platforms 8105*a-d*. In implementations, the plurality of tiered platforms 8105*a-d* are horizontal platforms stacked one atop the other and spaced apart vertically to occupy a footprint on a floor 10 of a single platform while providing ample area for placing folded laundry articles from an entire household's worth of washed, folded laundry. Alternatively, in implementations, the plurality of platforms 8105*a-n* could comprise other configurations including at least one of an end-to-end configuration, a side-by-side configuration, a single large platform, and a combination of any of these configurations.

As shown in FIGS. 4-5 and 7A-C, in implementations, the plurality of tiered platforms comprises at least one of conveyors and static holding shelves. In implementations, a plurality of tiered platforms 8105*a-d* comprise a combination of one or more platforms 8105*b-d* comprising static holding shelves positioned above a platform 8105*a* comprising at least one placer conveyor 8200, 8200*a-b*. In implementations, the at least one placer conveyor comprises two side-by-side, independently operated conveyors. At least two bi-directional conveyors 8400*a-b* oriented with a run direction perpendicular to one of the longest sides of the plurality of tiered platforms 8105*a-d* are configured to distribute folded laundry articles 7300*a-n* belonging to a single household among the plurality of tiered platforms 8105*a-d* and, as will be described subsequently with regard to implementations. The system 8000 is configured to store in a database at least one of the area footprint, height, article type, and wearer of each of each folded laundry article 7300 and/or stacks of folded laundry articles and their locations on the plurality of tiered platforms 8105*a-d*. In implementations, least two bi-directional conveyors 8400*a-b* are configured to move vertically and laterally along a height and length of the plurality of tiered platforms 8105*a-d* and cantilever over the plurality of tiered platforms 8105*a-d* to deposit and retrieve articles by bi-directionally rotating a conveyor belt.

The at least two bi-directional conveyors 8400*a-b* are therefore configured to redistribute the plurality of folded laundry articles 7300*a-n* and/or stacks of folded laundry articles from the static holding shelves 8105*b-d* of the plurality of tiered platforms 8105*a-d* to the at least one placer conveyor 8200*a-b*. The at least two bi-directional conveyors 8400*a-b* are configured to combine at least one of folded articles 7300*a-n* and stacks 7301, 7301*a-n* of folded laundry articles 7300 and organize them in an order for loading containers for return to a household. The order can be at least one of predetermined through predictive modelling of laundry articles in process at a preceding one or more robots 3000-7000, determined incrementally once a threshold number of folded laundry articles are deposited on the static shelves 8105*b-d* of the plurality of tiered platforms 8105*a-d*, and determined by an established loading order of article types on the at least one placer conveyor 8200*a-b*. Additionally or alternatively, in implementations, the system 8000 is configured to optimize loading folded laundry articles 7300*a-n* into containers for customer convenience by clustering articles together by wearer, wearer's drawer(s), and/or another customer-designated sorting category. Additionally or alternatively, in implementations, the system 8000 is configured to optimize loading to eliminate empty volume within each return container or output a smallest number of partially filled containers 7800 to return to a customer household. This reduces the amount of space occupied in a delivery truck, the amount of effort expended by a delivery driver returning the containers, and reduces the risk of folded items toppling within a partially filled container 7800 during transit.

Figure 5:
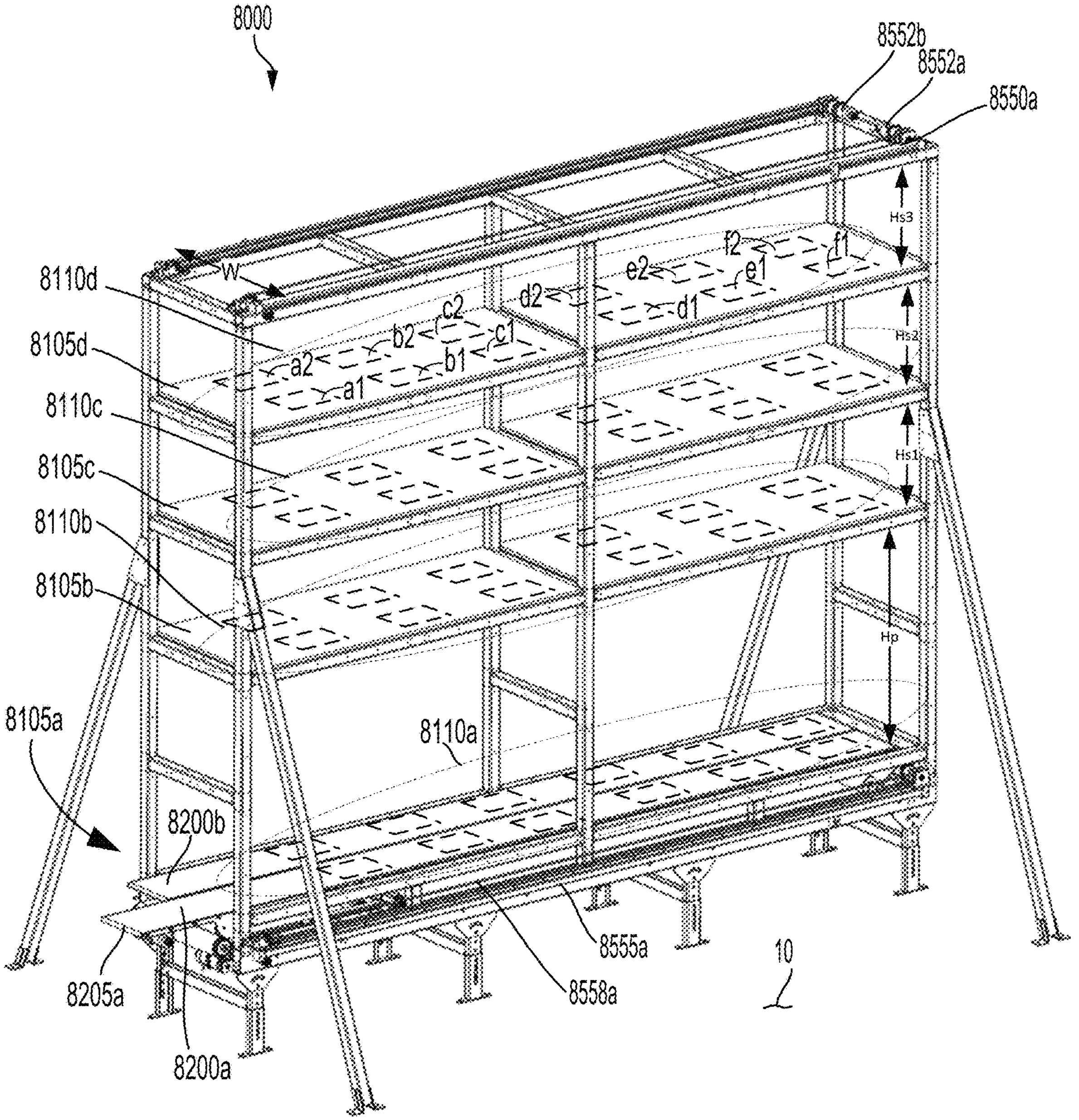
FIG. 5 depicts a perspective front view of an example system for placing, sorting, stacking, and queuing unbound folded household laundry articles for packing into a shipping container.

As shown in FIG. 5, the plurality of tiered platforms 8105*a-d* are configured to receive thereon the plurality of unbound folded laundry articles at a plurality of spaced apart positions 8110*a*(*a*1-*f*2)-8110*d*(*a*1-*f*2) having unique coordinates along a length of each one of the plurality of tiered platforms 8105*a-d*. Although the example of FIG. 5 shows 6 pairs of spaced apart positions, the number of spaced apart positions can comprise fewer positions or more positions (e.g., 8, 10, 12, 14, etc.) along the length L of the plurality of stacked platforms 8105*a-d*, as shown in FIGS. 7B-C and FIGS. 37A-B, for example. In implementations, the plurality of spaced apart positions 8110*a*(*a*1-*f*2)-8110*d*(*a*1-*f*2) (e.g., coordinate positions), indicated in broken line in FIG. 5, comprise spaced apart targets such that placing a folded laundry article on one target does not interfere with (e.g., topple, jostle, move, etc.) another already placed folded laundry article.

Figure 8:
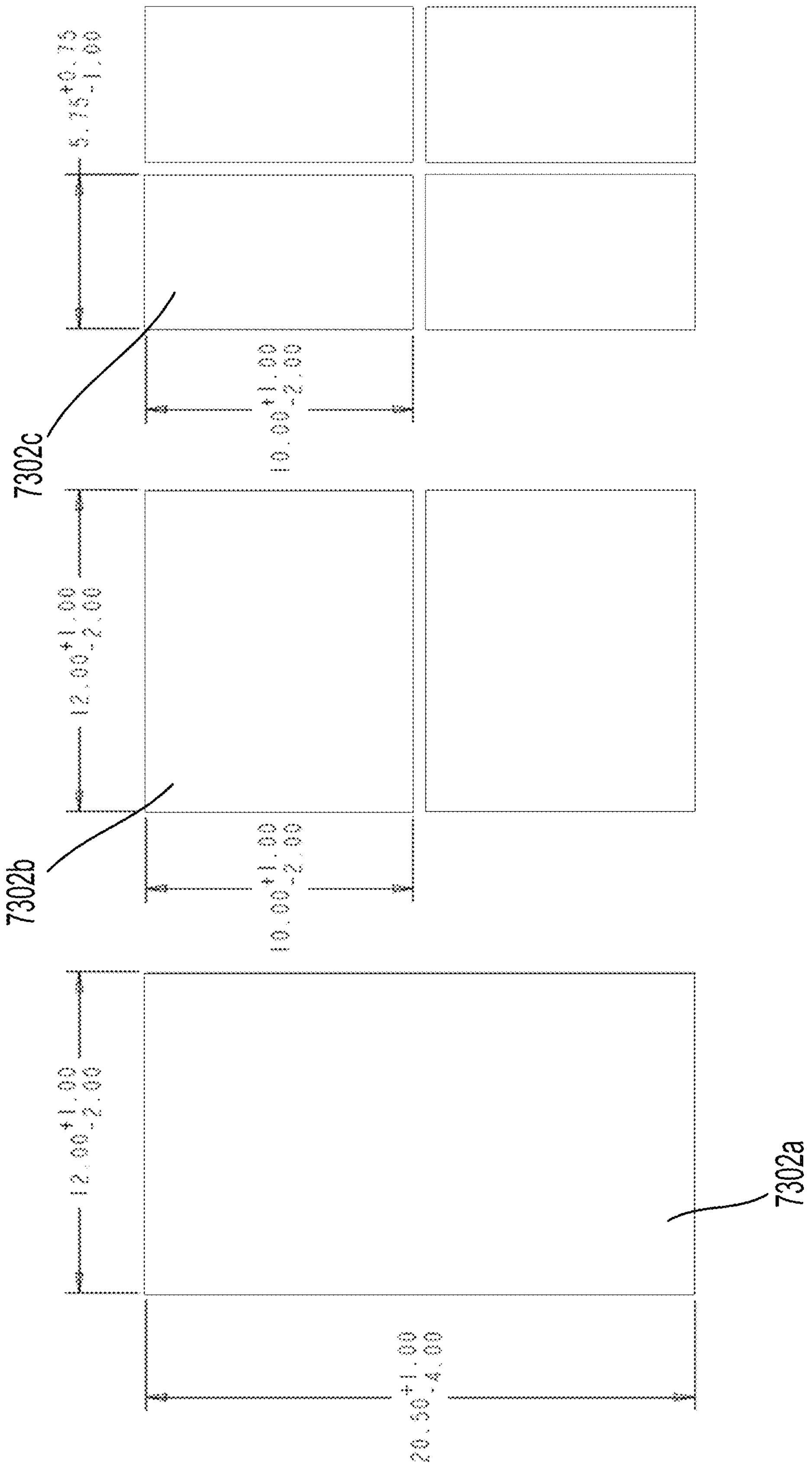
FIG. 8 depicts example target sizes and tolerances for area footprint dimensions (e.g., quantized rectangle sizes) of folded laundry articles.

In implementations, the at least two bi-directional conveyors 8400*a-b* are configured to target one of the plurality of spaced apart positions 8110*a*(*a*1-*f*2)-8110*d*(*a*1-*f*2) such that a folded laundry article 7300 is centered on one of the plurality of spaced apart positions with an acceptable shifted tolerance in a range of between about 0.75 to 4 inches (e.g., 1.9 cm to 10.2 cm) in each of the width W direction and length L direction from the center of the target position. An acceptable tolerance range can vary depending on, for example, a target quantized rectangle size (e.g., area footprint 7302, 7302*a-c*) of a folded laundry article as shown in FIG. 8. Centering a folded laundry article atop another folded laundry article in a stack 7301, 7301*a-n* assists with building a stable and tidy stack of laundry articles that is not tilting and at risk for toppling during packing and transit. The spacing between stacks 7301, 7301*a-n* includes the shifted tolerances so as to accommodate the width of one of the at least two bi-directional conveyors 8400*a-b* being centered on a spaced apart position 8110(*a*1-*f*1) during placement and retrieval without disturbing articles and/or stacks of articles at adjacent coordinate positions. The tolerances for accommodating a folded laundry article 7300 being off center of the spaced apart coordinate position therefore ensures that the one of the at least two bi-directional conveyors 8400*a-b* doesn't contact an adjacent stack 7301, 7301*a-n* of folded laundry articles while depositing or retrieving a folded laundry article or stack of folded laundry articles.

Figure 6:
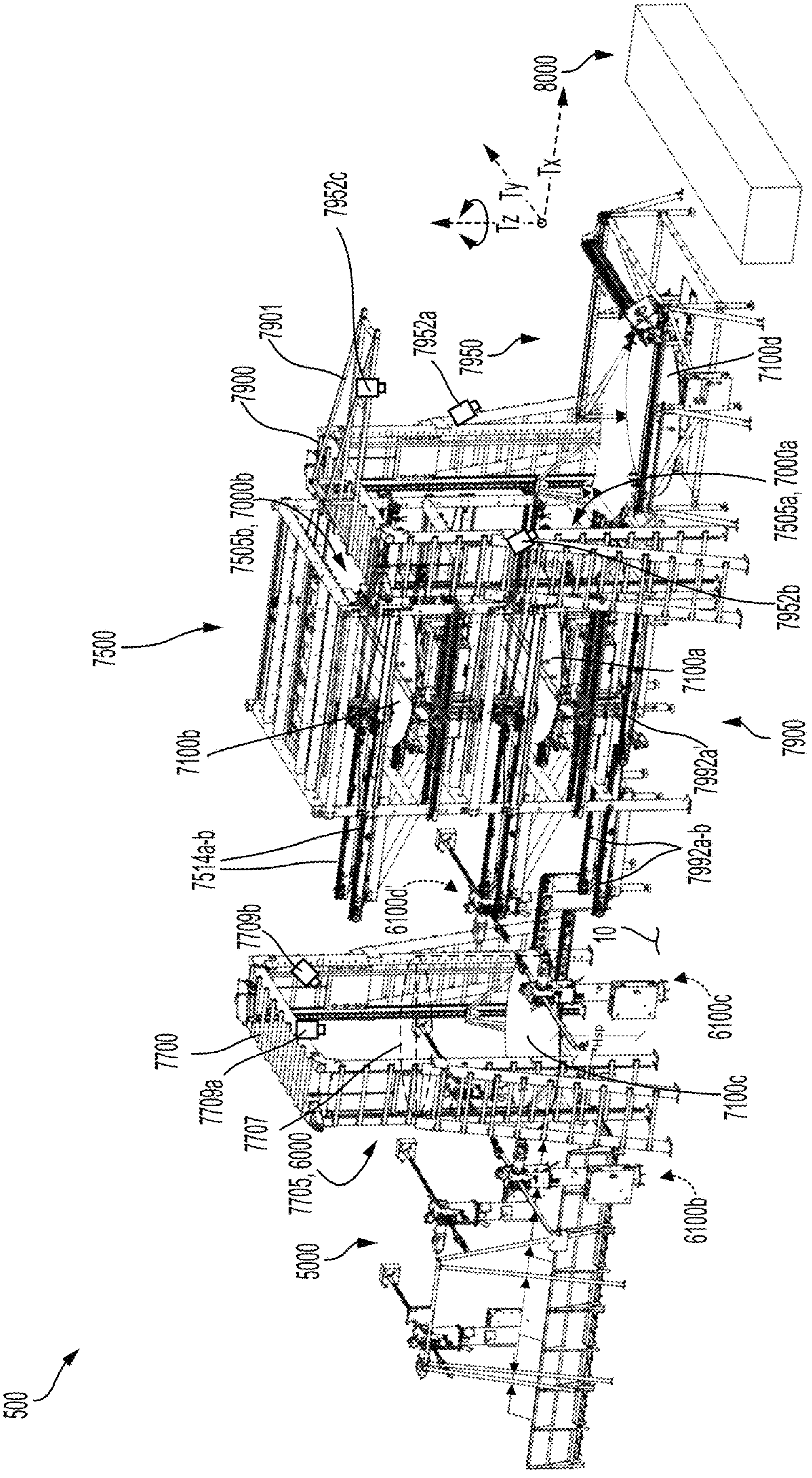
FIG. 6 depicts an end perspective view of an example of an autonomous tiered folding system in line with an autonomous tiered packing system.

In implementations, as shown in FIG. 6, a washed and dried load of household laundry articles is folded by two or more stacked folding robots 7000, 7000*a-b* such that folded laundry articles are delivered in series to the plurality of tiered platforms 8105*a-d*. Alternately, in implementations, the washed and dried load of household laundry articles is folded by one or more single tier folding robots. The plurality of tiered platforms 8105*a-d* or one or more single tier folding robots therefore need not receive an entire household's load of folded laundry articles simultaneously, and the folded laundry articles can be placed in a rolling accrual at different ones of the plurality of spaced apart positions 8110*a*(*a*1-*f*2)-8110*d*(*a*1-*f*2).

In implementations, as shown in FIGS. 4-5 and 7A-11, the plurality of tiered platforms 8105*a-d* comprise at least one placer conveyor 8200, 8200*a-b* configured to load the plurality of folded laundry articles 7300*a-n* into at least one of a customer container 7800 and a refillable cartridge 8300 configured to load the container 7800. In implementations, the at least one placer conveyor comprises a pair of placer conveyors 8200*a-b* configured to extend simultaneously and independently to load articles into a movable refillable cartridge 8300 as will be described subsequently with regard to implementations. An order of queuing comprises placing folded articles in an order at the plurality of spaced apart coordinate positions 8110*a*(*a*1-*f*2) on the at least one placer conveyor 8200, 8200*a-b* for loading in that order into a packing container. Additionally, as will be described subsequently, in implementations, the order of queueing and loading a plurality of folded laundry articles 7300*a-n* comprises at least one of a predetermined order, a predictively modeled order, and an order determined after one or more thresholds have been reached with regard to filling a volume of a container with a portion of the plurality of folded laundry articles placed on the plurality of tiered platforms 8105*a-d*. Predictive modeling comprises at least one of modeling a packing order based on predictions made at the start of the process line 100 (e.g. information about the plurality of laundry articles 7300*a-n* detected by sensors at the separating and sorting robot 3000) and adaptively modeling a packing order as laundry articles are processed through the process line 100 by the clean laundry separating robot 5000, the repositioning robot 6000, and folding robots 7000 and information is gathered over time. Adaptive modelling enables loading fully packed boxes before all clean laundry articles have been detected and processed by one or more robots 5000-7000 preceding the packing system 8000.

In implementations, as shown in at least FIGS. 4 and 12-14, the system 8000 comprises at least two bi-directional conveyors 8400*a-b* disposed adjacent opposite sides of the plurality of tiered platforms 8105*a-d* configured to at least one of place a folded laundry article 7300 on the plurality of tiered platforms 8105*a-d*, retrieve a folded laundry article from the plurality of tiered platforms 8105*a-d*, and stack a folded laundry article atop another one of the plurality of unbound folded laundry articles disposed on at least one of the plurality of tiered platforms 8105*a-d*. In implementations, as shown in at least FIGS. 4, 12, and 14, at least two driven support towers 8500*a-b* are slidably engaged with upper support rails 8553*a-b* and lower support rails 8555*a-b* (e.g., upper and lower SBR linear rails) disposed along the lengths of opposite longest sides of the plurality of tiered platforms 8105*a-d*.

In implementations, as shown in at least FIGS. 4, 5, and 13-15B the at least two driven support towers 8500*a-b* are driven by pairs of synchronously operated upper drive motors 8552*a-b* and lower drive motors 8557*a-b*. The respective pairs of upper drive motors 8552*a-b* and lower drive motors 8557*a-b* are configured to synchronously drive upper and lower ends of each of the at least two driven support towers 8500*a-b* such that each tower 8500 moves along the upper and lower support rails 8553, 8555 without twisting or bending and potentially coming to a standstill. In other words, the upper and lower pairs of drive motors 8552*a-b*, 8557*a-b* are configured to drive the at least two driven support towers 8500*a-b* from the top and bottom ends to avoid racking. Racking is a scenario in which in which one end lags behind the other and causes a tower 8500 to lose perpendicularity with the rails 8550*a-b*, 8555*a-b* and potentially bind up the linear bearings 8511*a-d*, a1-d1, *a*2-*d*2 engaging the rails 8550*a-b*, 8555*a-b*. In implementations, as shown at least in FIGS. 4-5, 8-9, 12, and 15A-B, each one of the upper drive motors 8552*a-b* and lower drive motors 8557*a-b* drives a respective pulley belt 8553*a-b*, 8558*a-b* fixedly engaged with upper and lower ends 8512*a-b*, a1-b1, *a*2-*b*2 of respective ones of the at least two driven support towers 8500*a-b* and engaged on a far end from each drive motor 8552*a-b*, 8557*a-b* drive pulley 8551*a*2-*b*2, 8551*a*2-*b*2 with a respective idler (e.g., tension) pulley 8554*a*1-*b*1, 8554*a*2-*b*2.

Figure 16A:
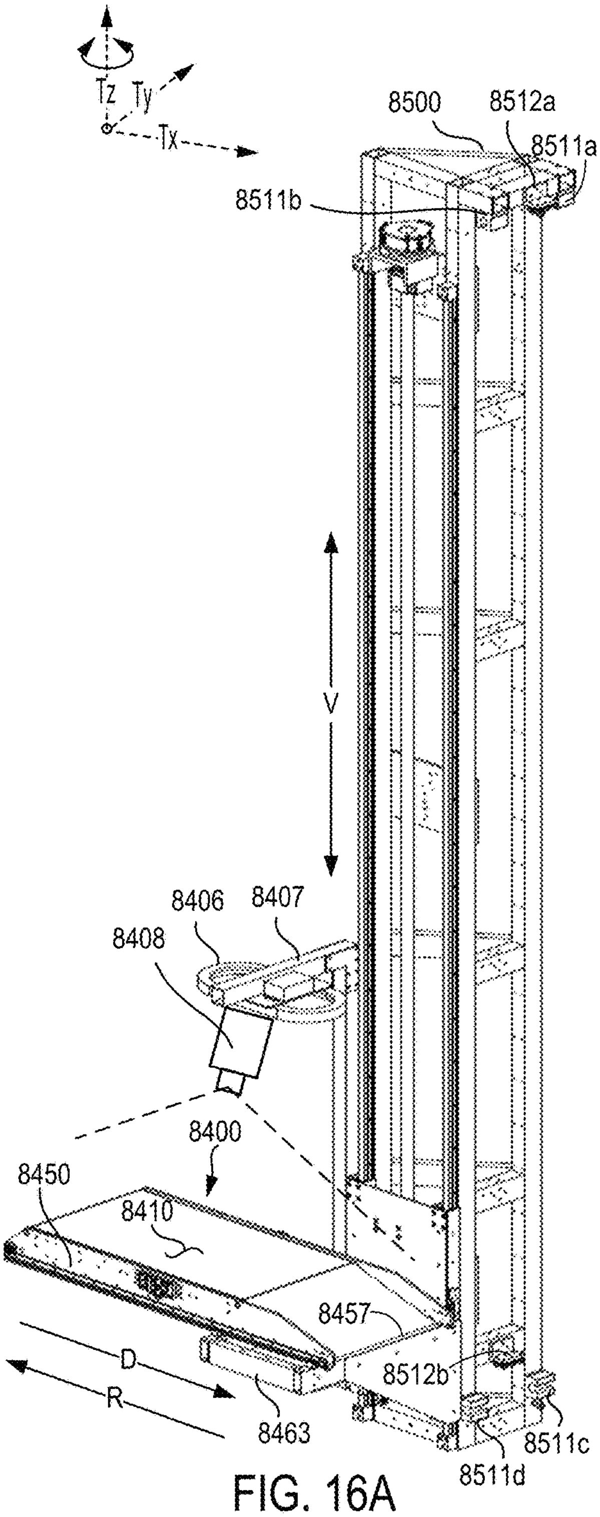
FIG. 16A depicts a perspective view of a portion of an example support tower and conveyor of the system of FIG. 4 including an example fixed support with mounted a camera and lighting.
Figure 16B:
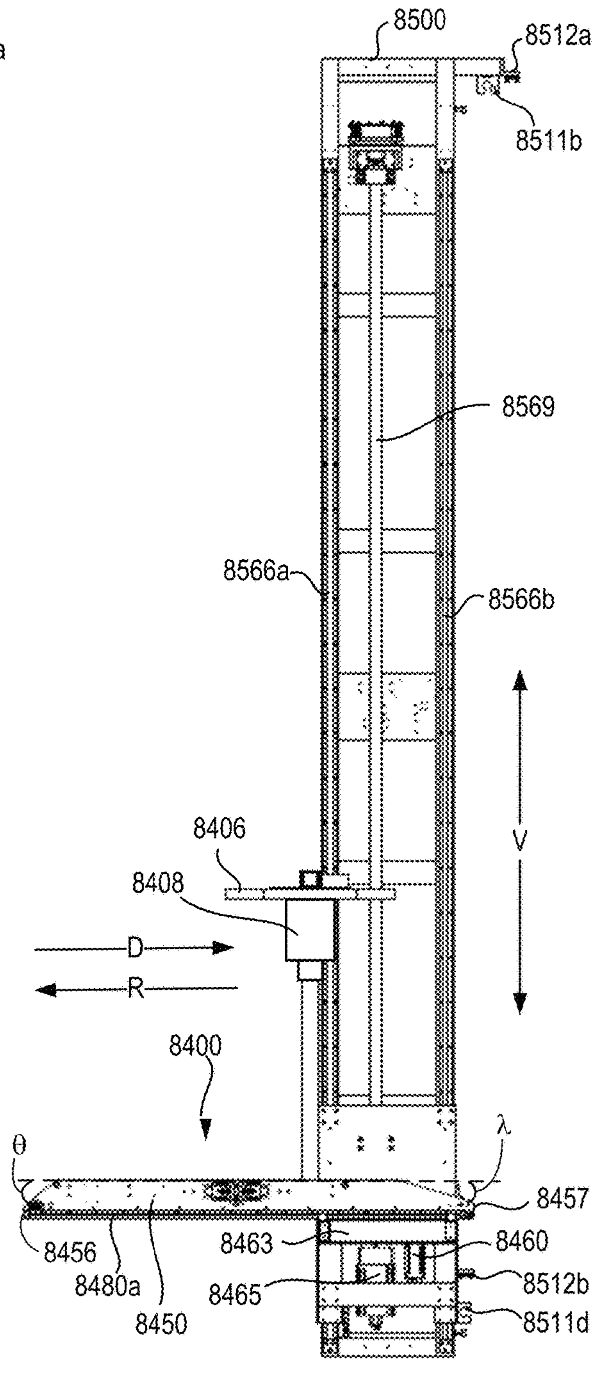
FIG. 16B depicts a side view of the portion of the example support tower and conveyor of FIG. 26A.
Figure 17:
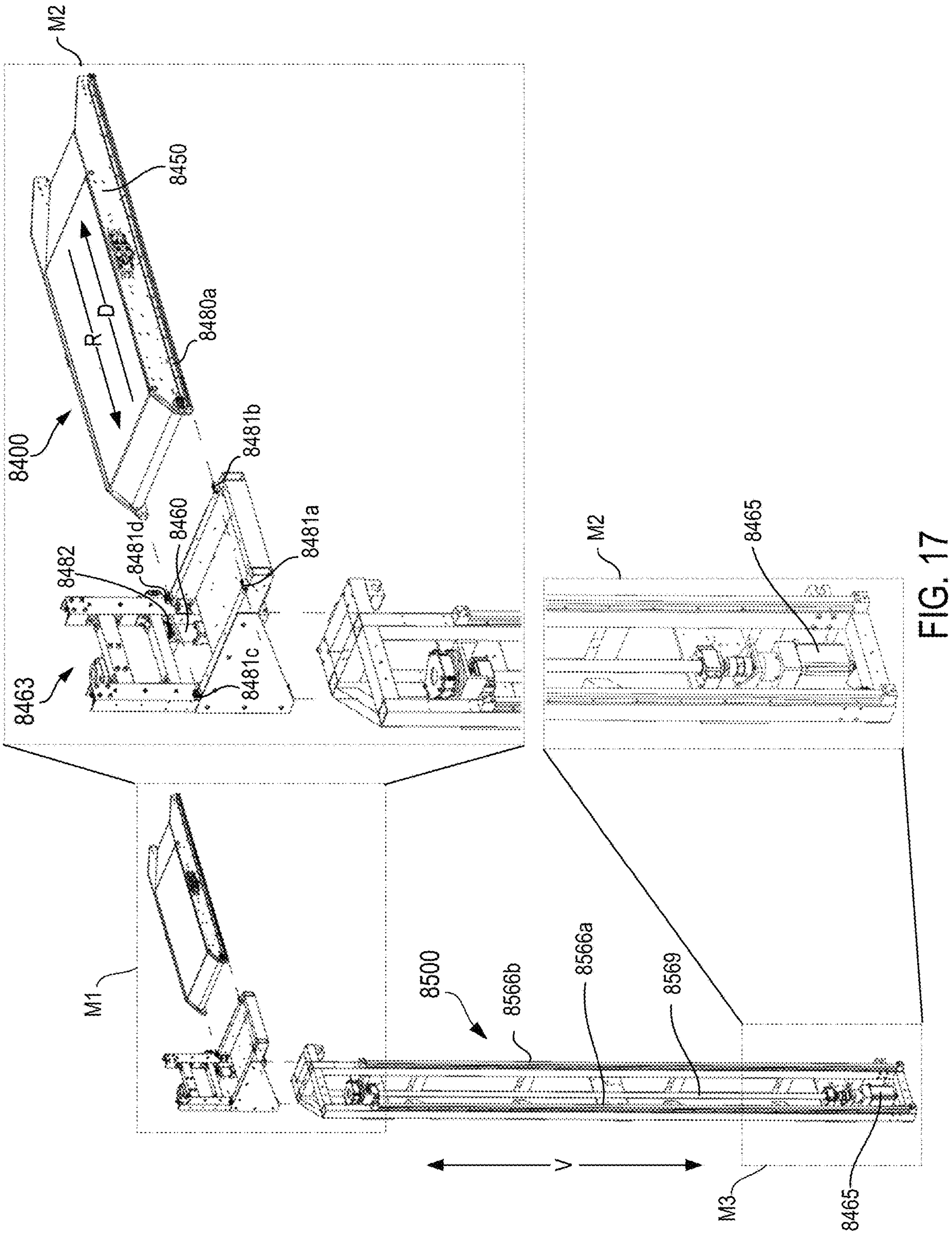
FIG. 17 depicts an exploded view of the support tower and conveyor assembly of FIGS. 16A-B, with magnified views, M1 and M2, of portions of the exploded view.

As shown in at least FIGS. 16A-B and 17 (including magnified views M1 and M2 of portions of the support tower assembly), in implementations, each one of the at least two driven support towers 8500, 8500*a-b* has movably engaged thereon a carriage 8450, 8450*a-b* configured to support the at least two bi-directional conveyors 8400, 8400*a-b*. FIGS. 16A-B and the magnified views M1 and M2 of FIG. 17 depict an implementation of a single driven support tower 8500 and all elements as described and referred to in the singular are intended to represent identical elements of the two or more driven support towers 8500*a-b* and respective carriages 8450*a-b*. At least two carriage drive motors are configured to transit the carriage 8450 of each one of the at least two bi-directional conveyors longitudinally and vertically to reach each one of the plurality of spaced apart positions 8110*a-d* and to reach the at least one placer conveyor 8200, 8200*a-b* for placing a retrieved folded laundry article in the ordered queue. In implementations, the at least two carriage drive motors comprise a cantilever drive 8460 configured to transit the carriage 8450 in the directions of arrows D (forward) and R (reverse) as shown in FIG. 17, toward and away from the plurality of tiered platforms 8105*a-d* and an elevator drive 8465 configured to raise and lower the carriage 8450 along one or more elevator rails 8566*a-b*. In implementations, the elevator drive 8465 is configured to drive a ball screw 8569 to raise and lower a platform 8463 supporting the carriage 8450 to reach each one of the plurality of tiered platforms 8105*a-d*. In implementations, each of the cantilever drive 8460 and the elevator drive 8465 comprises at least one of a motor encoder and a hall sensor (e.g., a hall effect limit switch for homing) for accurately positioning the bi-directional conveyor 8400 at a vertical height and cantilevered position relative to the plurality of tiered platforms 8105*a-d*.

In implementations, one or more sensors 8210*a-b*, 8408*a-b*, 8430*a-b* are disposed at least one of on and adjacent at least one of the plurality of tiered platforms 8105*a-d*, the at least two bi-directional conveyors 8400*a-b*, and the at least two driven support towers 8500*a-d*. In implementations, the one or more sensors 8210*a-b*, 8408*a-b*, 8430*a-b* comprise at least one of a 3-D camera, an IR sensor, a 2-D camera, LIDAR, a sonar proximity sensor, an ultrasonic ranging sensor, a radar sensor, and a pair of stereo depth cameras. The one or more sensors 8210*a-b*, 8408*a-b*, 8430*a-b* are configured to output a signal indicative of at least one of: one or more occupied spaced ones of the plurality of spaced apart coordinate positions 8110*a*(*a*1-*f*2)-8110*d*(*a*1-*f*2), one or more characteristics of one or more unbound folded laundry articles at each occupied spaced apart coordinate position, a height of a stacked one or more folded laundry articles disposed on the at least one placer conveyor, and a presence of a folded laundry article disposed on one or more of the at least two bi-directional conveyors. In implementations, the one or more sensors are configured to detect and output a signal indicative of at least one of a presence and position of a folded laundry article disposed on one of the at least two bi-directional conveyors, a folded state of the folded laundry article, and a height measurement of the folded laundry article 7300 to store in a memory 8010, 210 for calculating packing order and/or stacking in aggregate with one or more other folded laundry articles to fill a container 7800 intelligently (e.g., stable stacks of folded laundry articles occupying maximum container volume). The one or more sensors 8210*a-b*, 8408*a-b*, 8430*a-b* are configured to detect whether the folded laundry article has unfolded such that it requires refolding prior to being deposited at one of the plurality of spaced apart coordinate positions 8110*a*(*a*1-*f*2)-8110*d*(*a*1-*f*2).

For clarity, a plurality of spaced apart positions a1-f2 are labeled in FIG. 5 only on a top platform 8105*d* of the plurality of tiered platforms 8105*a-d*, and it is to be understood that each one of the plurality of tiered platforms 8105*a-d* similarly comprises a plurality of spaced apart positions a1-f2. In implementations, the plurality of spaced apart positions a1-f2 comprises two parallel rows of positions, each row being closer to one or the other of the at least two bi-directional conveyors 8400*a-b*. In implementations, the plurality of spaced apart coordinate positions 8110*a*(*a*1-*f*2)-8110*d*(*a*1-*f*2) comprises a single row of positions. In implementations, as shown in the example of FIG. 5, the plurality of spaced apart positions 8110*a*(*a*1-*f*2)-8110*d*(*a*1-*f*2) comprises two or more parallel rows of positions, and the at least two bi-directional conveyors 8400*a-b* are configured to extend across a width W of each platform of the plurality of tiered platforms 8105*a-d* to reach all of the parallel rows of spaced apart positions 8110*a*(*a*1-*f*2)-8110*d*(*a*1-*f*2) to deposit and retrieve one or more folded laundry articles from any of the plurality of spaced apart positions 8110*a*(*a*1-*f*2)-8110*d*(*a*1-*f*2).

Figure 7A:
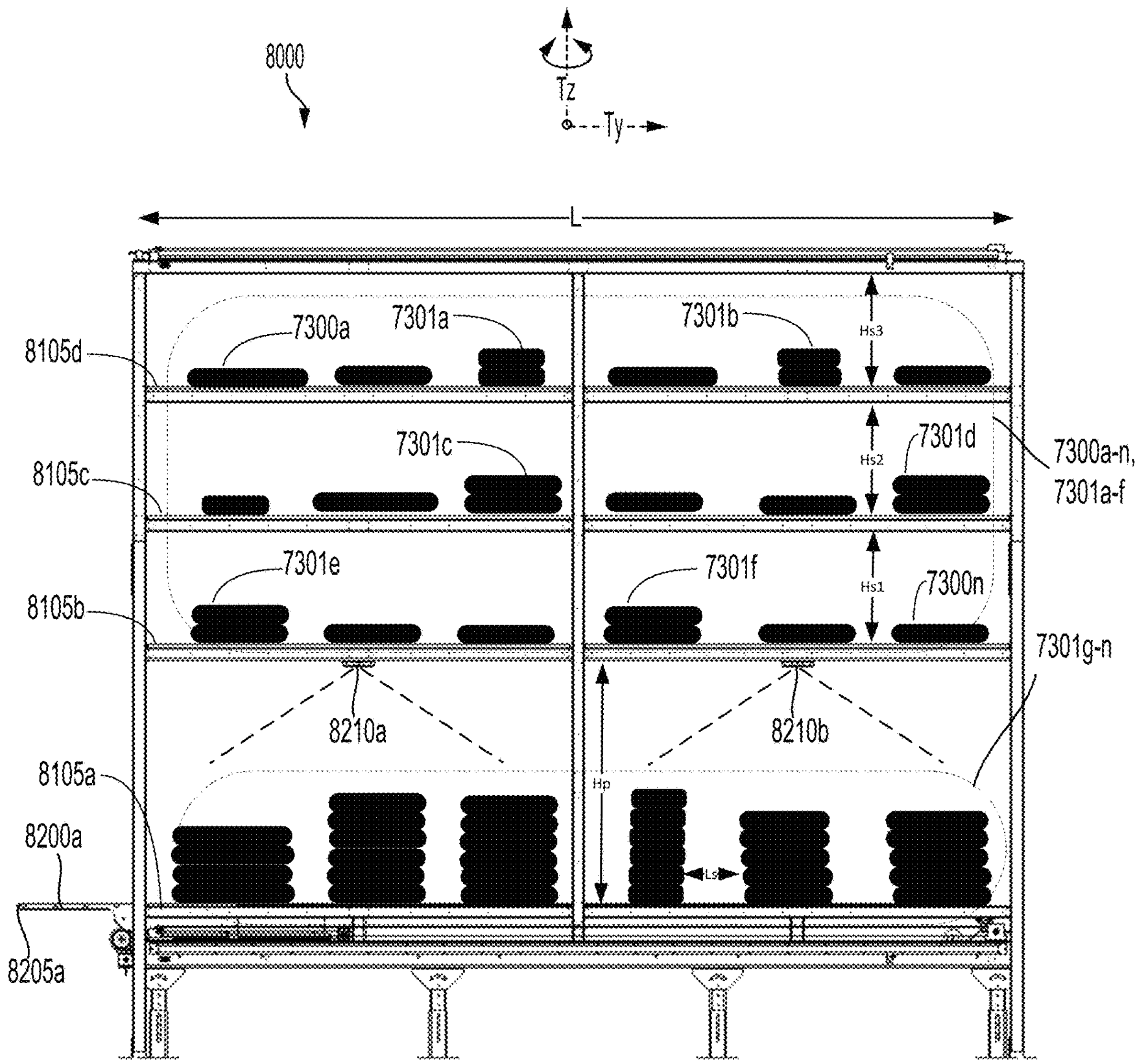
FIG. 7A depicts a side view of the example tiered packing system of FIG. 5 with folded laundry articles disposed on the plurality of tiered platforms.
Figure 16D:
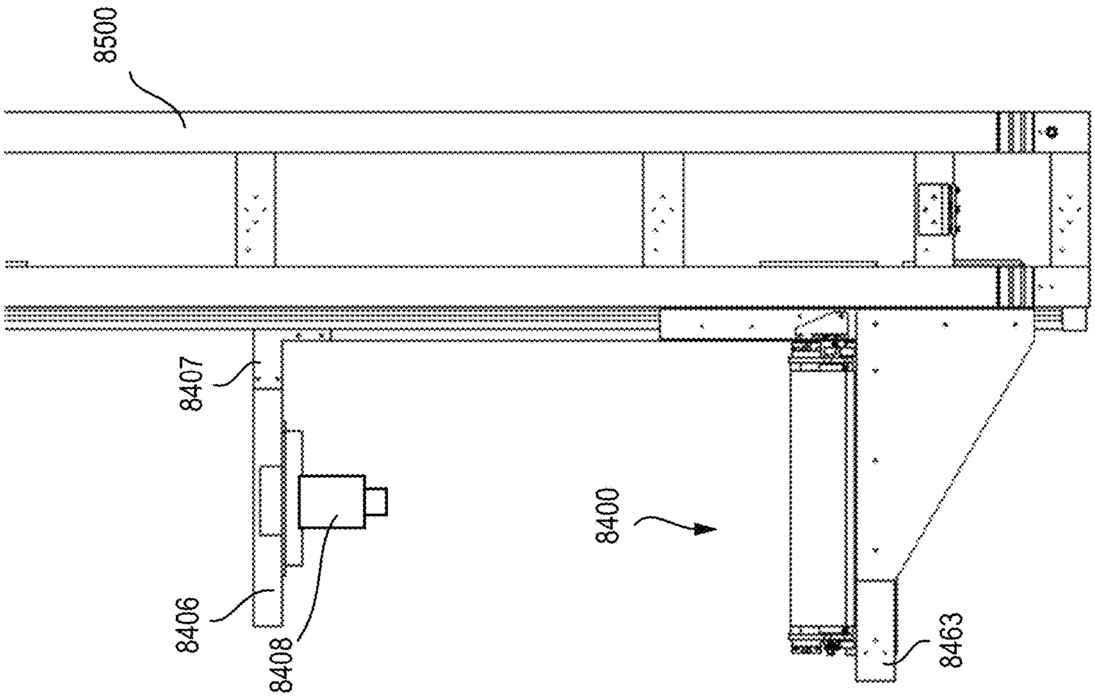
FIG. 16D depicts a side view of the example support tower and conveyor of FIG. 16C.
Figure 16C:
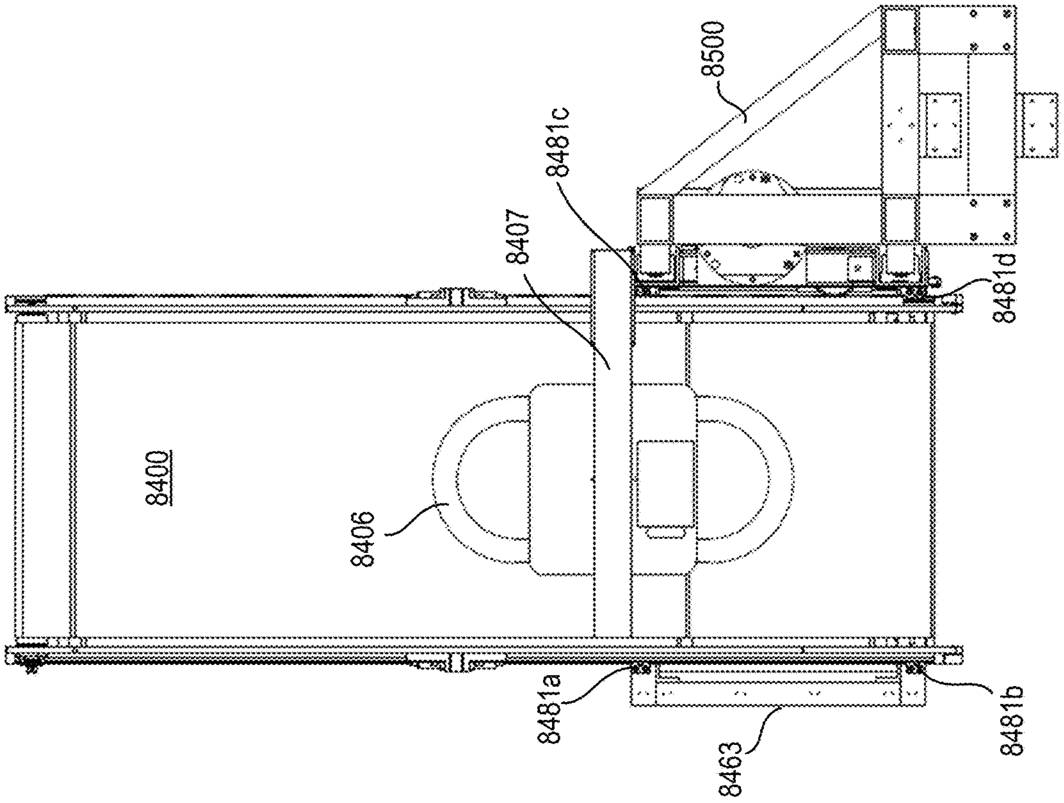
FIG. 16C depicts a top view of an example support tower and conveyor of the system of FIG. 4 including an example fixed support with mounted camera and lighting.

In implementations, as shown in FIG. 7A, the one or more sensors 8210*a-b*, 8408*a-b*, 8430*a-b* comprise at least one of an image sensor and a distance sensor disposed above the at least one placer conveyor 8200, 8200*a-b* to detect a height of at least one of one or more folded laundry articles 7300 and stacks 7301 of folded laundry articles. Additionally or alternatively, the one or more sensors comprise one or more sensors 8408, 8408*a-b* disposed on or adjacent the at least two driven support towers 8500*a-b* configured to detect at least one of a presence and height (e.g., a distance from the top of a top most article folded laundry article 7300 to a top surface of a platform 8105*a-d* or a top surface of the at least one placer conveyor 8200, 8200*a-b*) of one of one or more folded laundry articles 7300 *a-n* and stacks 7301 of folded laundry articles disposed on at least one of the one or more of the plurality of tiered platforms 8105*a-d* and at least one of the at least two bi-directional conveyors 8400*a-b*. In implementations, as shown in FIGS. 16A-B and 16D, a sensor 8408 comprises a camera (e.g., a depth camera) mounted at a fixed height on an arm 8407 extending from an elevator platform 8463 such that the camera 8408 is at a fixed height above the bidirectional conveyor 8400. Although the at least one sensor 8408 is shown schematically in FIGS. 16A-B and 16D, in implementations, the at least one sensor 8408 comprises at least one of a depth camera that generates point clouds (e.g., a REALSENSE camera) or a stereoscopic arrangement of two or more 2D or 3D cameras positioned at least one of above and adjacent a folded laundry article. The at least one sensor, e.g. a depth camera, enables accurate depth measurements used to determine a height of a folded laundry article 7300 disposed on the conveyor 8400 at known fixed distance from the at least one sensor 8408. In implementations, a light ring 8406 is affixed to the arm 8407 for even lighting upon a folded laundry articled disposed therebeneath on the at least one placer conveyor 8200, 8200*a-b*, thereby further enabling accurate presence and height detection of a folded laundry article disposed on the conveyor 8400.

Additionally or alternatively, in implementations, the one or more sensors 8210*a-b*, 8408*a-b*, 8430*a-b* comprise at least one position sensor 8430*a-b* (FIG. 18) configured to detect a position of each one of the at least two driven support towers 8500*a-b* along the length L of the plurality of tiered platforms 8105*a-d*. In implementations, the at least one position sensor 8430*a-b* comprises at least one of a motor encoder and a hall sensor (e.g., a hall effect limit switch for homing) configured to output a signal indicative of the two or more driven support towers 8500*a-b* transiting to one of the plurality of spaced apart positions 8110*a*(*a*1-*f*2)-8110*d*(*a*1-*f*2).

Figure 18:
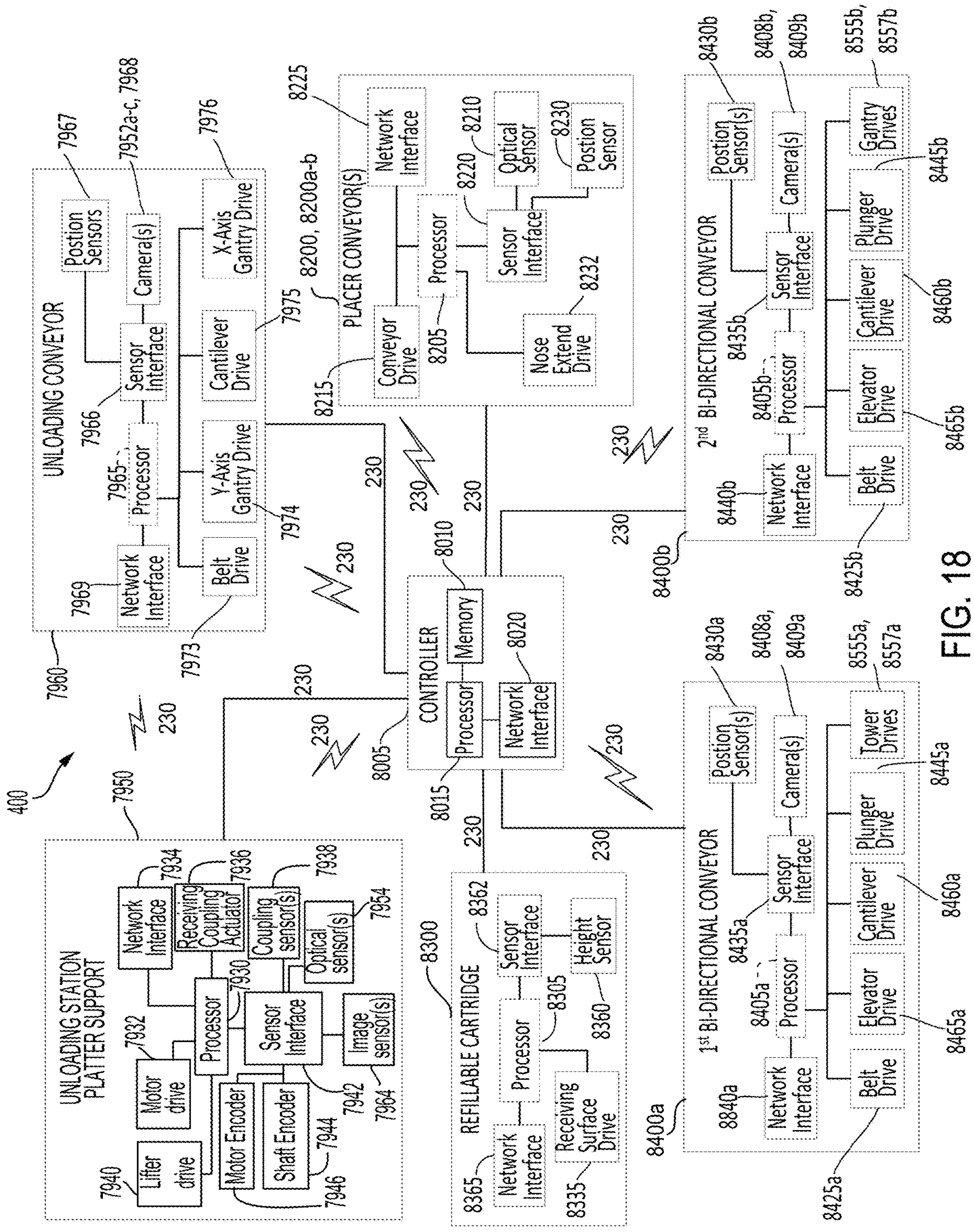
FIG. 18 depicts a schematic example of a system for controlling an autonomous system for sorting, stacking, and queuing unbound folded household laundry articles for packing into a shipping container.

Turning now to FIG. 18, a schematic of an implementation of a control system 400 is shown. The controls system 400 includes one or more of the features described with regard to the embodiments of FIGS. 1-3. In implementations, the packing system 8000 comprises a plurality of robotic devices configured to operate autonomously and in coordination under the control of the controls system 400. In implementations, each of the components comprises one or more elements having similar or identical functionality to the components described with regard to FIG. 3, such as processors, sensor interfaces, and networking interfaces for communicating with the at least one controller 8005, 205 and other components of the controls system 400 via at least one of a wired and wireless network 230.

In implementations, the packing system 8000 further comprises at least one controller 8005 in operable communication with the at least two carriage drive motors comprising at least a cantilever drive 8460*a-b* and an elevator drive 8465*a-b*, at least two support tower drives 8552*a-b*, 8557*a-b*, the one or more sensors 8210*a-b*, 8408*a-b*, 8430*a-b*, a belt drive 8425*a-b* that drives the motorized drive roller 8475 (FIG. 29B) of each of the at least two bi-directional conveyors 8400*a-b*, placer conveyor drive(s) 8215 and extend drives 8232, a memory comprising at least one of a local memory 8010 and a remote memory 210, and at least one of a wired and wireless communication network 230 as previously described with regard to FIG. 3. Additionally or alternatively, in implementations, the at least one controller comprises at least one of a local device controller 8005 and a remote controller 205.

In implementations, the at least one controller 8005, 205 is configured to instruct at least one drive of the at least two driven support tower drives 8552*a-b*, 8557*a-b* to transit along the length L of the plurality of tiered platforms 8105*a-d* to one of the plurality of spaced apart coordinate positions 8110*a*(*a*1-*f*2)-8110*d*(*a*1-*f*2). In implementations, to increase processing time and efficiently deposit and retrieve folded laundry articles for packing, the at least one controller 8005, 205 is configured to move the at least two driven support towers 8500*a-b* both independently and simultaneously. Additionally, in implementations, the two or more driven support towers 8500*a-b* comprise more than one support tower transiting along the length L of each side of the plurality of tiered platforms 8105*a-b* to increase speed and efficiency of depositing, retrieving, and rearranging folded laundry articles for packing in a stable arrangement (e.g., without toppling in transit to the customer) and in as few containers as possible to reduce occupied delivery truck volume and improve the efficiencies and costs associated with delivery. The at least one controller 8005, 205 is further configured to instruct at least one of an elevator drive 8465*a-b* and a cantilever drive 8460*a-b* of the at least two carriage drive motors to respectively move at least one of the at least two bi-directional conveyors 8400*a-b* at least one of vertically between the plurality of tiered platforms 8105*a-d* and longitudinally in the direction of bidirectional conveyor belt rotation (e.g., perpendicular to the length L of the plurality of tiered platforms 8105*a-d*). Moving one of the at least two bi-directional conveyors 8400*a-b* longitudinally cantilevers the conveyor 8400 out over one of the plurality of tiered platforms 8105*a-d* and retracts the conveyor 8400 to at least one of deposit and retrieve at least one of the plurality of unbound folded laundry articles 7300*a-n* at the one of the plurality of spaced apart positions 8110*a*(*a*1-*f*2)-8110*d*(*a*1-*f*2). In implementations, instructing at least one of the at least two carriage drive motors (e.g., a cantilever drive 8460*a-b* and an elevator drive 8465*a-b*) to move at least one of the at least two bi-directional conveyors 8400*a-b* comprises instructing two or more of the at least two carriage drive motors simultaneously to move two or more of the at least two bi-directional conveyors 8400*a-b*. The at least two bi-directional conveyors 8400*a-b* therefore are configured to operate simultaneously and independently such that one of the at least two bi-directional conveyors 8400*a-b* can be receiving folded laundry articles from a folding robot 7000 and depositing the folded laundry articles on the plurality of tiered platforms 8105*a-d* while another one of the at least two bi-directional conveyors 8400*a-b* is retrieving deposited articles from the plurality of tiered platforms 8105*a-d* and redepositing them on the at least one placer conveyor 8200*a-b* in at least one of an ordered queue and an aggregate stack of two of more related laundry articles.

In implementations, the at least one controller 8005, 205 is further configured to receive via the communication network 230 a signal from the one or more sensors indicative of the one or more characteristics of each one of the plurality of unbound folded laundry articles. In implementations, the one or more characteristics comprise at least one of an article size, article height, article type, article color, article tilt direction relative to a width W (e.g., perpendicular to the length L) of the plurality of tiered platforms, article top surface tilt angle relative to a surface of a platform 8105, an article material, and an article wearer (e.g., a member of a customer household or shared account). In implementations, the at least one controller 8005, 205 is configured to match the tilt of a folded laundry article to an oppositely tilted folded laundry article or stack 7301 of folded laundry articles on the at least one placer conveyor 8200, 8200*a-b* to build a stable stack with little to no cumulative tilt from plumb vertical. The at least one controller 8005, 205 can signal a platter 7100 rotatably engaged within the unloading station 7950 to rotate a folded laundry article thereon to align a detected tilt for complementary placement atop another article 7300 or stack 7301 of two or more folded laundry articles 7300*a-n* on the at least one placer conveyor 8200, 8200*a-b*.

Additionally or alternatively, in implementations, at least one of the one or more sensors 8210*a-b*, 8408*a-b*, 8430*a-b* and one or more additional sensors of one or more robots 3000-7000 preceding the system 8000 is configured to detect the one or more characteristics and output a signal to the at least one controller 8005, 205 indicative of detected one or more characteristics. In implementations, the detected one or more characteristics are stored in the memory 8010, 210 in a database. Additionally or alternatively, the one or more characteristics can be stored in the database by a customer (e.g., a user) in remote communication with the system 8000 accessing a customer account from a remote terminal or handheld device 245. A user can input at the remote device the one or more characteristics of one or more of the plurality of laundry articles 7300*a-n* and associated one or more batching preferences for aggregating folded laundry articles for packing. The at least one controller 8005, 205 is further configured to retrieve from the database for determining the order of packing one or more characteristics comprising at least one of article wearer and customer sorting preference. Additionally, the at least one controller 8005, 205 is further configured to store in the at least one memory 8010, 210, an association of the one or more characteristics of an unbound folded laundry article 7300 placed on the plurality of tiered platforms 8105*a-d* and the one of the plurality of spaced apart coordinate positions 8110*a*(*a*1-*f*2)-8110*d*(*a*1-*f*2) at which the unbound folded laundry article 7300 is disposed.

In implementations, the memory 8010, 210 of the at least one controller 8005, 205 comprises a neural network, and determining the one or more characteristics of each one of the plurality of deformable articles 7300*a-n* comprises processing the received output signal of at least one sensor of the one or more sensors 8210*a-b*, 8408*a-b*, 8430*a-b* with a neural network model. In implementations, the neural network model fulfills tasks comprising at least one of classifying, detecting, and segmenting. In implementations, the neural network model is at least one of a supervised learning model (e.g., comprising at least one of a regression algorithm, a linear classifier, a support vector machine (SVM), a decision tree, and a random forest algorithm) configured to predict an outcome based on labeled data, and an unsupervised model (e.g., comprising at least one of K-Means clustering, principal component analysis (PCA), and auto-encoding) configured to determine patterns and associations in unlabeled data. In implementations, supervised and unsupervised models are configured to implement deep learning techniques. In implementations, the neural network model can be a reinforcement learning model, which also can use deep learning techniques. In implementations, the at least one controller 8005, 205 is configured to analyze a received image from an image sensor of the one or more sensors 8210*a-b*, 8408*a-b*, 8430*a-b* and process the image with a classifier to determine at least one of a folded state and at least one of the one or more characteristics.

In implementations, the neural network comprises a trained neural network model, for example a convolutional neural network that operates quickly on 3D and/or 2D data and is configured to classify images from one or more 3D and/or 2D cameras. In an implementation, the classification comprises generating a descriptor based on the output signal of the one or more sensors 8210*a-b*, 8408*a-b*, 8430*a-b* and classifying, using the neural network, the output signal based on the descriptor. The neural network is configured to output a probability that the output signal corresponds to a class of the stored data. For example, a neural network can be trained with a set of training data, and after training, the neural network comprises a set of weights that can be used for neural network inference to determine whether an input (e.g., output signal from one of the one or more sensors 8210*a-b*, 8408*a-b*, 8430*a-b*) is within one of the trained classes. In implementations, the classes of trained data in the neural network comprise data associated with many types of labels (e.g., classes). The plurality of classes, or labels, comprises at least two of type of article, a feature on an article (e.g., a pom pom, a tassel, a zipper, etc.), a location on the article (e.g., a waistband, a cuff, a pants crotch, etc.), the location of the article on at least one of the at least two bi-directional conveyors 8400*a-b* and the plurality of tiered platforms 8105*a-d*, and one or more customer specific labels. A class can be indicative, for example, of one or more deformable article types (e.g., adult jeans, button down shirts, tee shirts) that should be grouped together for packing, for example. In implementations, the classes of trained data in the neural network comprise data associated with at least one of many types of deformable laundry articles, features, key points, etc. that influence cumulatively improved sorting and batching of folded laundry articles for packing.

In implementations the one or more sensors 8210*a-b*, 8408*a-b*, 8430*a-b* comprises a depth camera that generates point clouds (e.g., a REALSENSE camera) or a stereoscopic arrangement of two or more 2D or 3D cameras positioned at least one of above and adjacent a folded laundry article. The at least one controller 8005, 205 is configured to generate a rendering of folded laundry articles 7300 disposed on at least one of the at least two bi-directional conveyors and one or more of the plurality of tiered platforms 8105*a-d*. In implementations, the rendering can be provided to the neural network model for prediction. In all implementations, the one or more sensors 8210*a-b*, 8408*a-b*, 8430*a-b* are positioned at a fixed height and orientation relative to at least one of the at least two bi-directional conveyors and one or more of the plurality of tiered platforms 8105*a-d*.

In implementations, the at least one controller 8005, 205 is further configured to determine, based on the one or more characteristics, an order of arranging on the at least one placer conveyor 8200*a-b* for packing, two or more of the plurality of folded laundry articles 7300*a-n*. The at least one controller 8005, 205 is configured to instruct at least one of the at least two support tower drives 8555*a-b*, 8557*a-b* and at least one of the at least two carriage drive motors comprising the elevator drive motor 8465 and the cantilever drive 8460 to move at least one of the at least two bi-directional conveyors 8400*a-b* to one of the plurality of spaced apart coordinate positions 8110*a*(*a*1-*f*2)-8110*d*(*a*1-*f*2) of one or more of the plurality of folded laundry articles 7300, 7300*a-n*. The at least one controller 8005, 205 is configured to instruct a belt drive 8425 of the at least one of the at least two bi-directional conveyors 8400*a-b* to rotate in a reverse direction R (e.g., in a direction away from the plurality of tiered platforms 8105*a-d*, FIGS. 16A-B) to retrieve the one of the plurality of folded laundry articles 7300, 7300*a-n* from the spaced apart coordinate position. In implementations, the at least one controller 8005, 205 is configured to simultaneously instruct the belt drive 8425 to rotate the belt of a bi-directional conveyor 8400 in reverse direction R while instructing the cantilever drive 8460 to extend toward the folded laundry article 7300 disposed on the platform 8100 such that the conveyor is extended under the article 7300 while the reverse rotational motion of the belt 8410 pulls the article 7300 up onto the conveyor belt 8410. As will be described subsequently with regard to FIGS. 25-28, a pair of nose wheels 8485*a-b* are configured to raise the depositing end 8457 above a top surface of a platform 8105 by between about 0.0254 mm to 5 mm (e.g., about 0.001 inch to 0.2 inch) such that the depositing end 8457 can slide up against and/or beneath an edge of the folded article 7300 during retrieval from one of the plurality of tiered platforms 8100, 8105*a-d*. During retrieval of an article from one of the plurality of tiered platforms 8100, 8105*a-d*, the cantilever drive 8460 is configured to drive the conveyor carriage 8450 forward in direction D while the belt drive 8425 rotates the belt backwards in the reverse direction R at the same speed as the belt rotation.

The at least one controller 8005, 205 is configured to instruct at least one of the at least two support tower drives 8555*a-b*, 8557*a-b* and the elevator drive motor 8465 to transit the at least one of the at least two bi-directional conveyors 8400*a-b* and the retrieved one of the plurality of folded laundry articles 7300, 7300*a-n* at least one of horizontally (parallel to the length L of the plurality of platforms 8105*a-d*) and vertically to an ordered position of a plurality of spaced apart positions 8110*a*(*a*1-*f*2) along the at least one placer conveyor 8200*a-b*. The at least one controller 8005, 205 is configured to instruct the cantilever drive 8460 to extend at least one of the at least two bi-directional conveyors 8400, 8400*a-b* over the ordered position of the plurality of spaced apart positions 8110*a*(*a*1-*f*2). Once the depositing end 8457 of the a conveyor 8400 is positioned over the one of the plurality of spaced apart coordinate positions, the at least one controller 8005, 205 is configured to instruct the cantilever drive 8460 to retract the conveyor 8400 while simultaneously instructing a belt drive 8425 of the at least one of the at least two bi-directional conveyors 8400*a-b* to rotate a belt 8410 of the conveyor 8400 in a forward direction D (e.g. toward the plurality of tiered platforms 8105*a-d*) to place the one of the plurality of folded laundry articles 7300, 7300*a-n* at least one of on the at least one placer conveyor 8200*a-b* and atop a previously deposited another one of the plurality of folded laundry articles 7300*a-n* in the determined order for packing.

In implementations, prior to instructing the cantilever drive 8460*a-b* to withdraw a cantilevered depositing end 8457 of the at least one of the at least two bi-directional conveyors 8400*a-b*, the at least one controller 8005, 205 receives a sensor signal from at least one of the one or more sensors 8210*a-b*, 8408*a-b*, 8430*a-b* indicative of the folded laundry article 7300 being proximate the depositing end 8457. Additionally or alternatively, in implementations at least one of an article size (e.g., area footprint 7302, 7302*a-c*) and a position of the folded laundry article 7300 relative to the depositing end 8457 is detected by a preceding one or more sensors (e.g., at least one of sensor 7964 and one or more sensors 7952*a-c* at the unloading station 7950). Once the folded laundry article 7300 disposed on the at least one of the at least two bi-directional conveyors 8400*a-n* cantilevered over one of the plurality of tiered platforms 8105*a-d* is aligned with the selected position of the plurality of spaced apart positions 8110*a*(*a*1-*f*2)-8110*d*(*a*1-*f*2), the at least one controller 8005, 205 instructs the cantilever drive 8460*a-b* to retract the conveyor 8500*a-b* in the direction of arrow R (e.g., reverse direction) as shown in FIGS. 16A-17. The conveyor 8500*a-b* retracts while a belt 8410 circulates in the forward direction D, e.g., in a direction opposite of the reverse direction R (e.g., retraction) retraction the cantilever, such that the unbound folded laundry article is deposited at least one of on the at least one placer conveyor 8200*a-b* and atop a previously deposited another one of the plurality of folded laundry articles 7300*a-n* in the determined order for packing.

More particularly, the at least one controller 8005, 205 is configured to determine alignment of the depositing end 8457 based on receiving one or more outputs of one of more sensors 8210*a-b*, 8408*a-b*, 8430*a-b*, and instruct, simultaneously, the belt drive 8425 to rotate the belt 8410 of the conveyor 8400 while also instructing the cantilever drive 8460 to withdraw the cantilevered depositing end 8457 to deposit the folded laundry article 7300 at the selected one of the spaced apart positions 8110*a*(*a*1-*f*2)-8110*d*(*a*1-*f*2). Additionally or alternatively, the alignment of the depositing end 8457 with the selected one of the spaced apart positions 8110*a*(*a*1-*f*2)-8110*d*(*a*1-*f*2) comprises detecting alignment with a pre-determined position indicative of the selected one of the spaced apart positions 8110*a*(*a*1-*f*2)-8110*d*(*a*1-*f*2). The at least one controller 8005, 205 is configured to detect the depositing end 8457 reaching the pre-determined position indicative of the selected on of the spaced apart positions 8110*a*(*a*1-*f*2)-8110*d*(*a*1-*f*2) based on a receipt of a position sensor signal (e.g., a signal output by an encoder and limit switch homing sensor pair) for one or more of the elevator drive 8465, the cantilever drive 8460, and the tower drives 8555, 8557.

As previously described with regard to implementations, the system 8000 comprises at least one position sensor 8430 (FIG. 18) disposed adjacent to or along at least one of the plurality of tiered platforms 8105*a-d*, the upper and lower rails 8553*a-b*, 8555*a-b*, and the tower 8500. In implementations, the at least one position sensor comprises motor encoders on each of the elevator drive 8465, the cantilever drive 8460, and the tower drives 8555, 8557 and corresponding limit switches (e.g., homing switches) disposed at or adject the bottom of the vertical rails 8566*a-b*, the end of the carriage 8450 of the bi-directional conveyor 8400, and at least one end of the upper and lower rails 8550*a-b*, 8555*a-b*. The position sensor 8430 (e.g., a combination of encoder and limit switch) is configured to output a signal to the at least one controller 8005, 205 determinative of a position of the bi-directional conveyor 8400 along a length L of the upper and lower rails 8553*a-b*, 8555*a-b*, a vertical position of the carriage 8450 on the tower 8500, and the extended position of the bi-directional conveyor 8400 (e.g., of the conveyor carriage 8450). In implementations the position sensor 8430 can include at least one of a camera, an optical break beam, a hall sensor, a proximity sensor, a time of flight sensor, LIDAR, and an IR sensor. In implementations, the position sensor 8430 comprises a rotational encoder disposed on the tower drive 8552*a-b* and motors 8557*a-b* for transiting the tower 8500 along the upper and lower rails 8553*a-b*, 8555*a-b*. The encoder is configured to output a signal to the at least one controller 8005, 205 indicative of an absolute position of the bi-directional conveyor 8400 along the upper and lower rails 8553*a-b*, 8555*a-b*. In implementations, the encoder is re-zeroed and/or re-calibrated with a limit switch disposed at or adjacent at least one end of the upper and lower rails 8553*a-b*, 8555*a-b*.

As will be described subsequently in detail with regard to methods of use of the system 8000, in implementations, determining the order of arranging on the at least one placer conveyor 8200*a-b* for packing further comprises receiving outputs from one or more sensors 8210*a-b*, 8408*a-b*, 8430*a-b* regarding each one of the placed folded laundry articles 7300 of the plurality of folded laundry articles 7300*a-n* and determining an order of packing based on at least one of detected folded article sizes of the plurality of folded laundry articles and known dimensions of a packing container 7800. The plurality of folded laundry articles 7300*a-n* comprises laundry belonging to a common household comprising two or more article types of at least one of different sizes and different shapes. Each one of the two or more article types comprises a longest dimension of between about 4 cm to 500 cm, and the detected sizes of the plurality of folded laundry articles therefore are variable. The system 8000 provides buffer space to lay out folded laundry articles at least one of individually and in short stacks at each of the plurality of spaced apart positions 8110*a*(*a*1-*f*2)-8110*d*(*a*1-*f*2) on the plurality of tiered platforms 8105*a-d*. The system is then configured to analyze the folded article sizes (e.g., area footprints 7302 and height) and types to determine which articles 7300 to stack together in a stack 7301, 7301*a-n* on the at least one placer conveyor 8200*a-b* and in which order along a length of the at least one placer conveyor 8200*a-b* in the direction of a placing end for loading a refillable cartridge 8300.

Additionally or alternatively, in implementations, the at least one controller 8005, 205 is configured to receive output of one or more additional sensors disposed on or adjacent a preceding robot 3000-7000. The preceding robot comprises one of a plurality of autonomous robots configured to at least one of sort, wash, dry, separate, spread, fold, and deliver the plurality of folded unbound laundry articles to the at least two bi-directional conveyors 8400*a-b*. The order for packing, therefore, can be predetermined through predictive modelling of laundry articles in process at preceding one or more robots 3000-7000. The at least one controller 8005, 205 therefore is configured to execute a predictive modelling routine (e.g., algorithm running on a processor 8015) that maps out the queue location (e.g., one of the spaced apart positions 8110*a*(*a*1-*f*2)-8110*d*(*a*1-*f*2)) at which to deposit each one of the laundry articles in a plurality of household laundry articles 7300*a-n* that has been folded or will be folded by a folding robot 7000. For example, the one or more article types and one or more article sizes of the plurality of folded household laundry articles are detected by one or more sensors of one or more preceding autonomous devices (e.g., preceding one or more robots 3000-7000). The at least one controller 8005, 205 is in operable communication with the preceding one or more robots 3000-7000 and predetermines at least one of a queue location (e.g., spaced apart position 8110*a*(*a*1-*f*2)-8110*d*(*a*1-*f*2)) and packing order for each one of the plurality of household laundry items based on the known (e.g., detected) quantities of each article type, weight, and size, and a predicted folded article area footprint 7302 and height for each one of plurality of household laundry items.

In implementations, the predictive modelling routine comprises adaptive modelling. As articles of laundry are processed by preceding one or more robots 3000-7000, the at least one controller 8005, 250 is configured to learn how many articles and how many of each type comprise one or more wash loads of a customer's household laundry. The at least one controller 8005, 250 is configured to instruct the at least two bi-directional conveyors to dispose each folded laundry article on the plurality of platforms 8105*a-d* and keep a tally of the number of laundry articles that have been processed out of the total known number of articles. With the folded laundry articles laid out on the plurality of platforms 8105*a-d* and one of more characteristics detected and recorded for each folded article at each spaced apart position 8110*a*(*a*1-*f*2)-8110*d*(*a*1-*f*2)), the at least one controller 8005, 250 can identify which folded articles to stack together on the at least one placer conveyor 8200, 8200*a-b* and in what order for loading into a container 7800. In implementations, the at least one controller 8005, 250 is configured to instruct the at least two bi-direction conveyors to start stacking together folded articles for packing when a packing condition is met. A packing condition comprises at least one of a range of 80 to 100 percent of the total number of laundry articles being folded and received by the packing system 8000 and a percentage of 90 percent or greater of the spaced apart position 8110*a*(*a*1-*f*2)-8110*d*(*a*1-*f*2) being occupied on the plurality of platforms 8105*a-d*. In implementations, the at least one controller 8005, 250 is configured to instruct a packing order based on a default category (e.g., towels, pants, shirts, etc.) or a most frequent type of laundry article detected by one or more sensors of the packing system 8000 or any of the preceding one or more robots 3000-7000. Additionally, in implementations, the at least one controller 8005, 250 is configured to instruct placement of folded laundry articles in a packing order based on loading full sized articles first, full size articles being those having a footprint area spanning the cross section of a container 7800.

Additionally or alternatively, the order for packing and therefore queuing on the at least one placer conveyor 8200*a-b* can be determined by an established loading order on the at least one placer conveyor 8200*a-b* of article types. For example, in implementations, the first two positions a1-a2 of a plurality of spaced apart positions 8110*a*(*a*1-*f*2) nearest a placing end (e.g., the nose 8205*a-b*) of the at least one placer conveyor 8200, 8205*a-b* can be designated for receiving the largest, tallest, and/or heaviest folded items to be placed at a bottom of the container 7800 for packing stability. In implementations each subsequent pair of positions comprises parallel stacks 7301, 7301*a-n* of at least one of matching article types and even stack heights. For example, in implementations, the pairs of two positions can comprise, from the placing end 8205 backward to the opposite end: folded pants, folded shorts, folded long-sleeved shirts, and folded t-shirts. In implementations, the folded article sizes can be pre-set folding sizes such that the folded article sizes are one of a number of area footprints 7302, 7302*a-c* that can combine side-by-side to fill a width and depth of the container 7800 for packing stability. Additionally or alternatively, in implementations, each container 7800 comprises at least one of a tie strap, a closable liner, and an inflatable bladder on an underside of a lid such that the loaded folded laundry articles do not topple in transit for return delivery to a customer.

Additionally or alternatively, in implementations, the system 8000 is configured to optimize loading into containers for customer convenience by clustering articles together by wearer and/or wearer's drawer(s). Additionally or alternatively, in implementations, the system 8000 is configured to optimize loading into containers to output a smallest number of partially filled containers 7800 to return to a customer household. This reduces the amount of space occupied in a delivery truck, the amount of effort expended by a delivery driver returning the containers, and reduces the risk of folded items toppling within a partially filled container 7800 during transit.

Returning now to FIGS. 5 and 12-14, one of the at least two bi-directional conveyors 8400*a-b* receives each one of the plurality of folded laundry articles 7300 from one of the folding robot or a discharge station 7950 comprising a rotatable platform 7100. The discharge station 7950 is configured to rotate to orient a folded edge of a laundry article thereon with a double nose retrieval conveyor 7960, such as that described in U.S. Patent Publication No. US20230416975 titled, "AUTONOMOUS TIERED LAUNDRY FOLDING DEVICES, SYSTEMS, AND METHODS OF USE", herein incorporated by reference in its entirety. Alternatively, in implementations, a bidirectional conveyor 8400 of the packing robot 8000 is configured to retrieve a folded laundry article directly from a folding robot 7000.

As described with regard to implementations, a robotic process line 100, 100*a-b* comprises a plurality of autonomous robots interacting with one another. As shown in FIG. 6, in implementations, the folding robot 7000 comprises an autonomous tiered folding system 500. The autonomous tiered folding system comprises a plurality of rotatable platters 7100*a-n* (where "n" represents a total number of platters greater than 1) configured to be conveyed into and out of a folding device 7500. As shown in FIGS. 5-9, the folding device 7500 comprises a plurality of tiered folding bays 7505*a-n* (where "n" represents a total number of bays equal to or greater than 2 and equal to or greater than the total number of platters in the system 500) for folding a laundry article 7300 disposed on each of the plurality of platters 7100*a-n*. Each bay of the plurality of tiered folding bays 7505*a-n* functions as a folding robot 7000*a-n* when a rotatable platter is disposed therewithin, such as a folding robot 7000 described in U.S. Patent Publication No. US20220002936, "AUTONOMOUS LAUNDRY FOLDING DEVICES, SYSTEMS, AND METHODS OF USE," herein incorporated by reference in its entirety.

Figure 19:
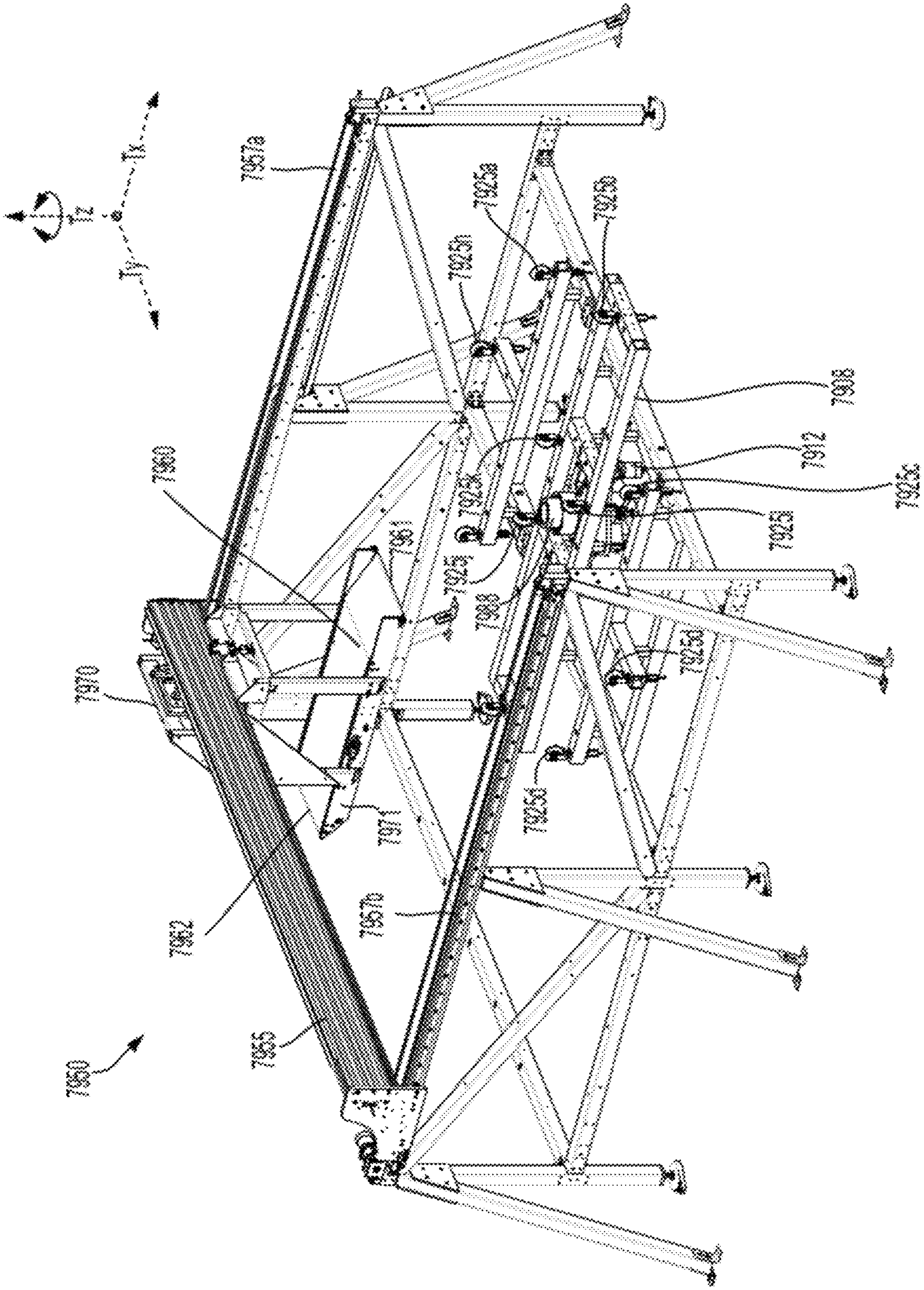
FIG. 19 depicts a folded garment unloading station of the of FIGS. 12-14 without a movable platter disposed therein.
Figure 20:
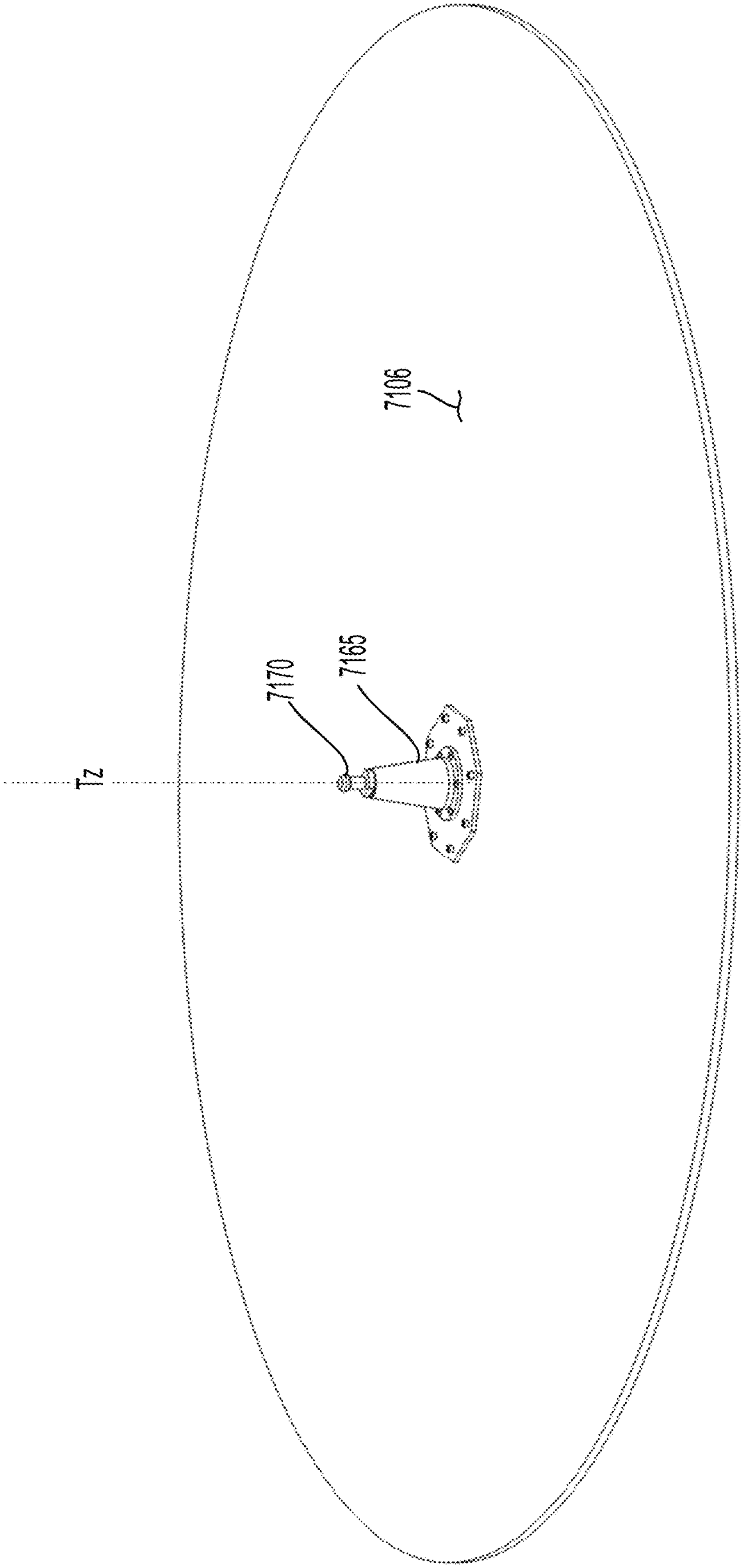
FIG. 20 depicts a perspective view of the underside surface of a rotatable platter and an example platter coupling of the autonomous tiered folding system of FIG. 6.
Figure 21:
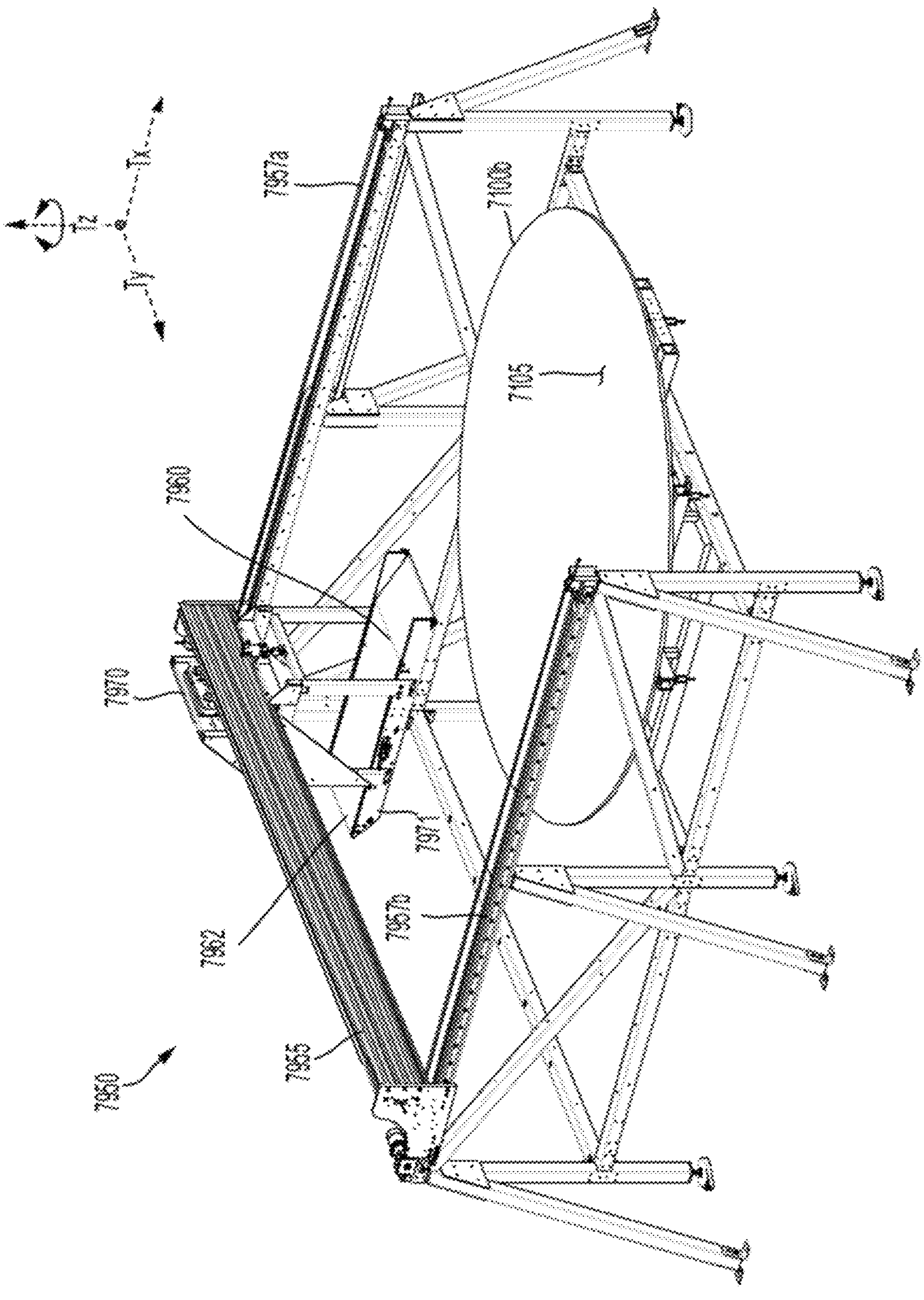
FIG. 21 depicts the example folded garment unloading station of FIG. 20 with a movable platter disposed therein and a folded article retrieval conveyor disposed in a first position.
Figure 22:
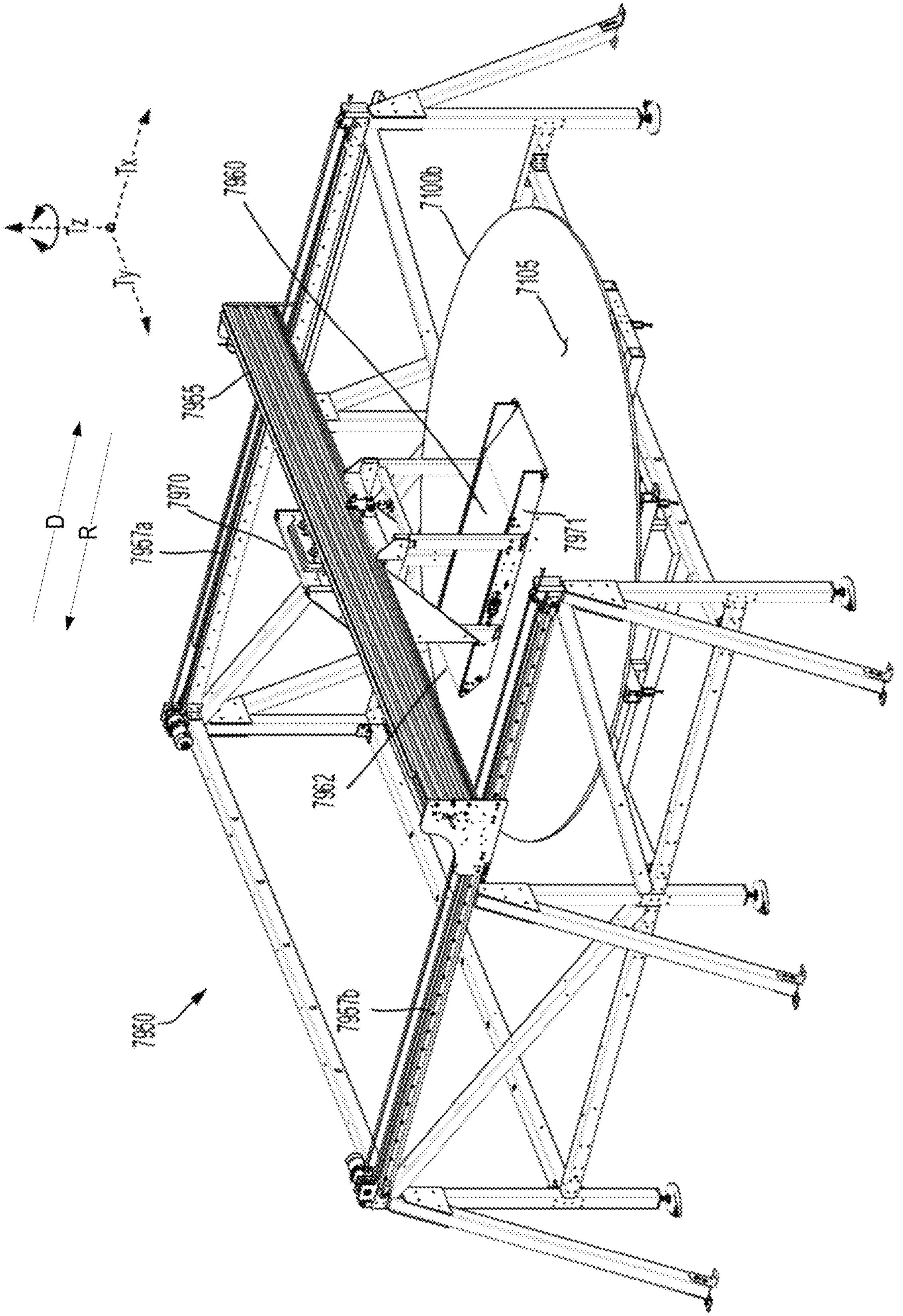
FIG. 22 depicts the example folded garment unloading station of FIG. 21 with the folded article retrieval conveyor moved over the platter to a second position.

As shown in FIGS. 19-20, in implementations, each of the plurality of rotatable platters 7100*a-n* comprises a platter coupling 7165 configured to reversibly engage with a receiving coupling 7510, 7988 disposed within a folding bay 7505 and a receiving coupling disposed within an unloading station 7590, respectively. Each platter 7100 of the plurality of platters 7100*a-n* is interchangeable in each one of the plurality of tiered folding bays 7505*a-n* and an unloading station 7950. The plurality of platters 7100*a-n* comprise identical platter couplings 7165*a-n* for mating with any of the plurality of receiving couplings 7510*a-n*. The receiving couplings 7510, 7988 are configured to rotate a received platter 7100 about a spin axis Tz (e.g., vertical axis Tz). In implementations, the spin axis Tz is vertically aligned through the center 7107 of the platter 7100. The platter coupling 7165 is configured to be disposed on an underside surface 7106 of the platter 7100. In implementations, the platter coupling 7165 is a protrusion configured to extend from the underside surface 7106 of the platter 7100 and the receiving coupling 7510, 7988 is configured to receive the protruding platter coupling 7165 in a bore formed therein. Alternatively, in implementations, the receiving coupling is configured to comprise a protrusion and the platter coupling comprises a bore configured to receive the protrusion.

As shown in FIG. 6, in implementations, an unloading elevator 7900 is disposed adjacent a second open end 7507 of the plurality of tiered folding bays 7505*a-n* (e.g., the tower of stacked folding bays 7505*a-b*, or folding device 7500) and is configured to retrieve and align a platter 7100 having a folded laundry article disposed thereon to an unloading station 7950. The unloading elevator 7900 is configured to raise and lower a platter 7100 thereon in a level orientation such that a folded laundry article 7300 thereon does not topple and/or unfold during discharge to the unloading station 7950 at which the folded article is retrieved for transfer to a packing robot 8000.

In implementations, the unloading elevator 7900 is configured to lower the platter 7100 into the unloading station 7950, and unloading conveyors 7915*a-b* of the unloading elevator 7900 are configured to move the platter coupling 7165 into position over the receiving coupling 7988 within the unloading station 7950. As shown in FIGS. 21-24B, in implementations, the unloading station 7950 comprises a folded laundry article retrieval conveyor 7960 (herein after referred to as the "conveyor 7960") suspended from a gantry rail 7955 by a carriage 7970. The carriage 7970 is configured to move in the y-axis direction Ty along the gantry rail 7955, and the gantry rail 7955 is configured to transit on a stationary pair of parallel rails 7957*a-b* in the x-axis Tx direction over a platter 7100 received within the unloading station 7950. The suspended conveyor 7960 is thus able to move in X and Y directions, Tx and Ty, and lower to the platter top surface 7105 to retrieve a folded article 7300 disposed anywhere on the top surface 7105 of the platter 7100. As shown in the controls system 400 of FIG. 18, the at least one controller 8005, 205 is in operative communication with the unloading station sensors and drive elements. Alternatively, in implementations, a single tier, non-stacked folding robot 7000 is disposed adjacent the retrieval conveyor 7960 and gantry rail for retrieving a folded laundry article 7300 directly from the folding robot 7000. Alternatively, in implementations, a single, non-stacked folding robot 7000 is disposed adjacent a bi-directional conveyor 8400 such that the bi-directional conveyor of the packing robot 8000 retrieves a folded laundry article directly from the folding robot 7000 for placement at the packing robot 8000.

Figure 12:
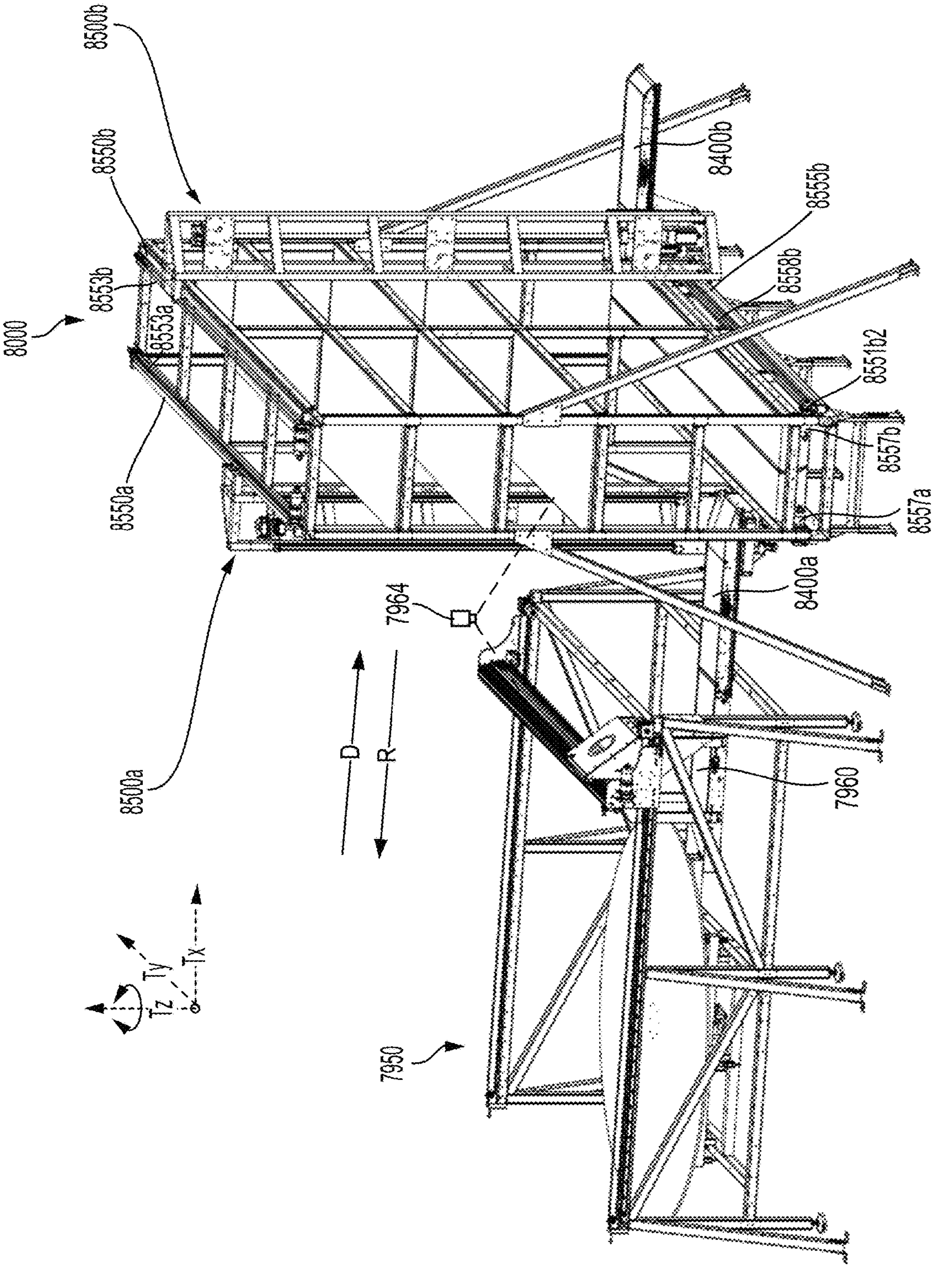
FIG. 12 depicts a side perspective view of the autonomous system of FIG. 4 interacting with the autonomously operating discharge station of FIG. 6.
Figure 13:
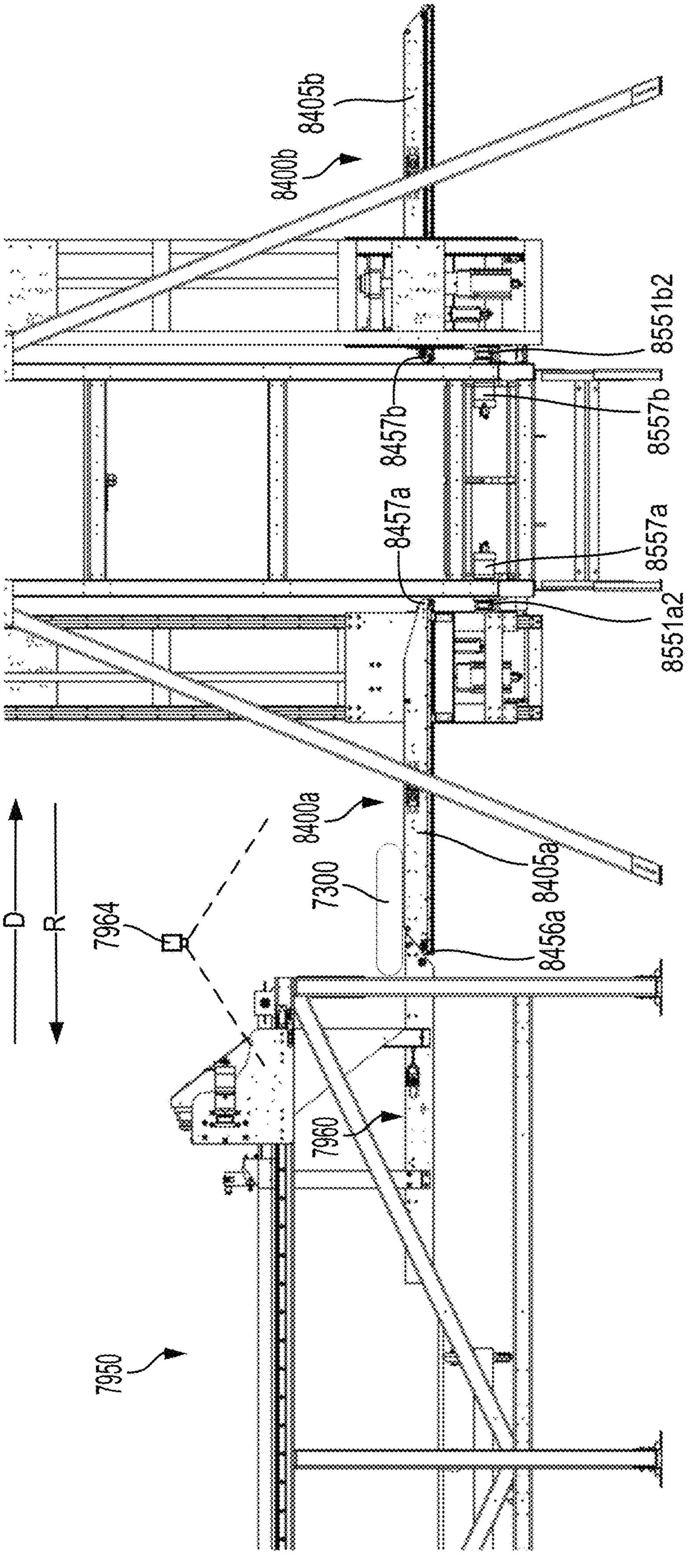
FIG. 13 depicts a side view of the interacting autonomous systems of FIG. 12 showing a conveyor of the placing and rearranging system of FIG. 4 and the retrieval conveyor of an unloading station in a nested arrangement for smoothly and reliably transferring a folded laundry article between conveyors without toppling or otherwise unfolding the article.
Figure 14:
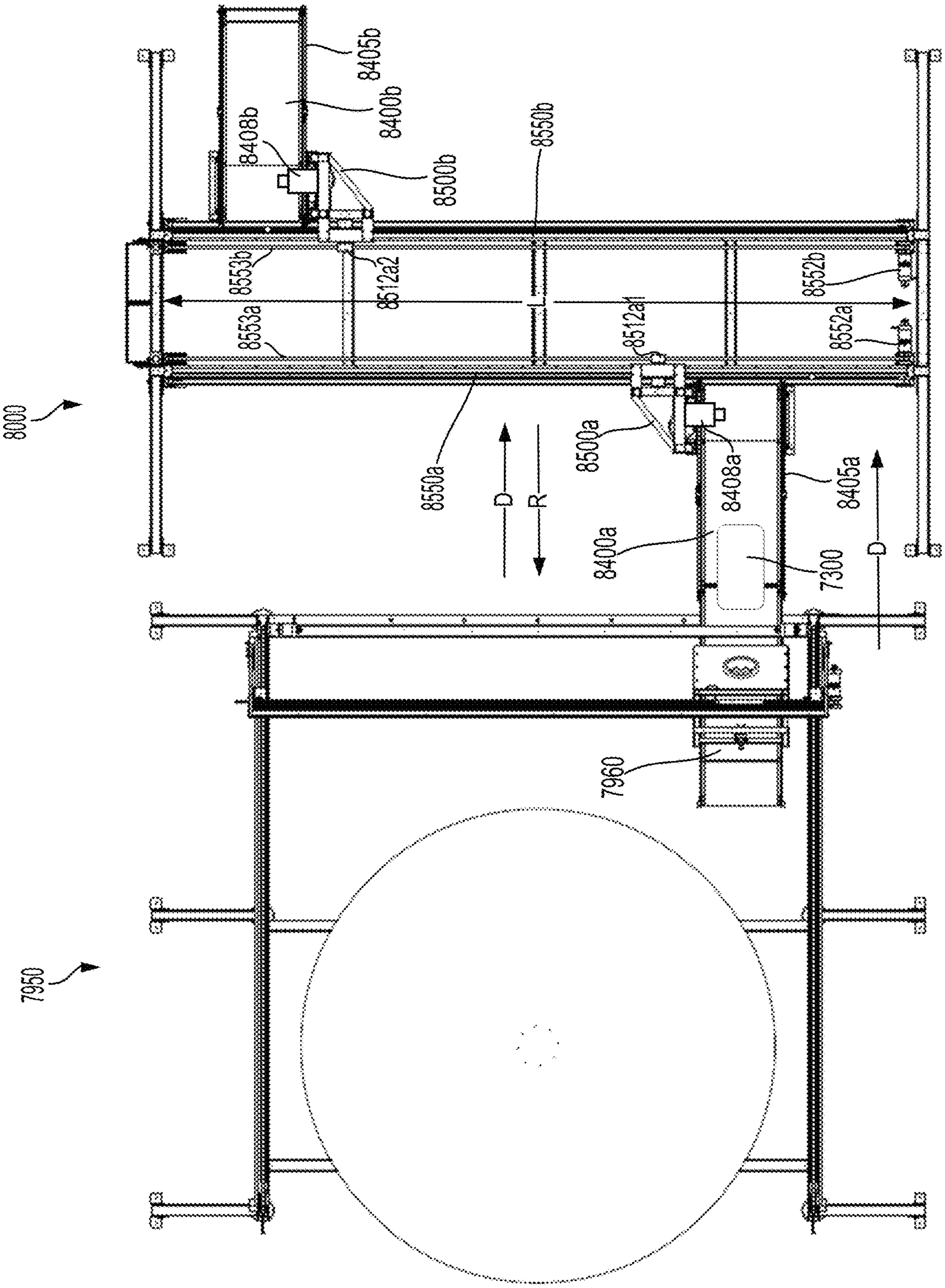
FIG. 14 depicts a top perspective view of the interacting autonomous systems of FIG. 13.
Figure 15A:
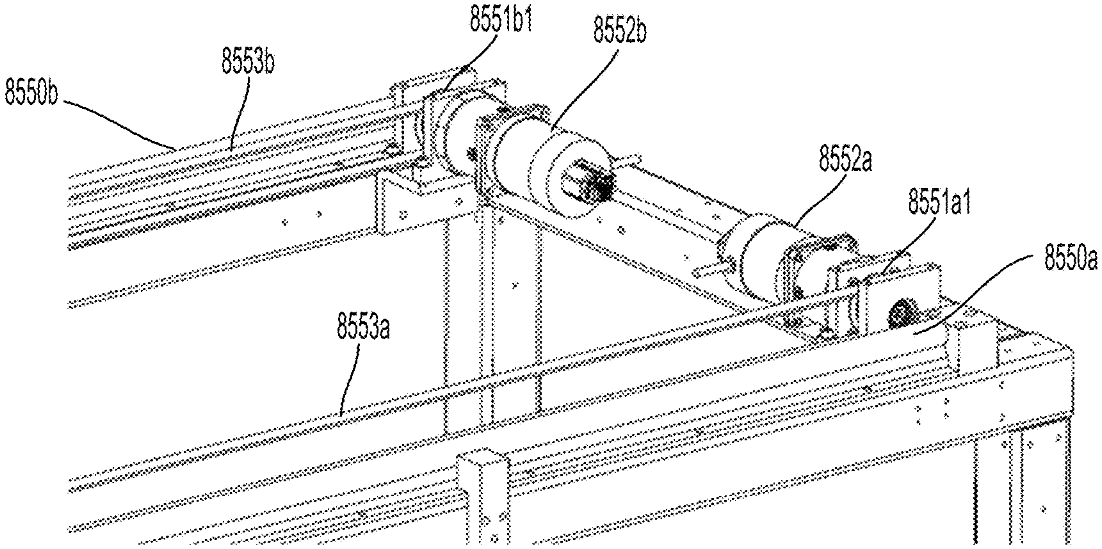
FIG. 15A depicts a close-up perspective partial view of an example of a top mounting rail and drive system of a support tower of the placing and sorting system.
Figure 15B:
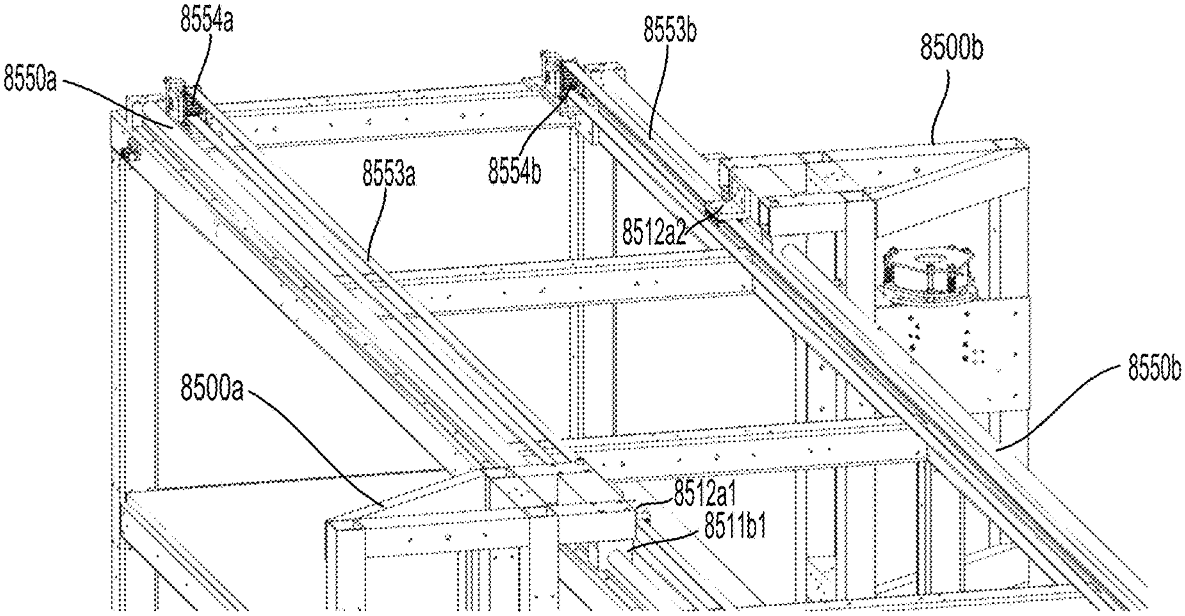
FIG. 15B depicts a close-up perspective partial view of a pulley end of a top mounting rail and drive system of a support tower of the placing and sorting system.

Returning to unloading station 7950 of FIGS. 21-24B, once the carriage 7970 transits the conveyor 7960 to a location adjacent and above a folded article 7300, the controller 7005 instructs an actuator of the carriage 7970 to lower a leading edge 7961 of the conveyor 7960 onto the top surface 7105 of the platter 7100. In implementations, the leading edge 7961 is configured to be advanced to a position adjacent an edge of the folded article. Once the leading edge 7961 contacts the folded article, a rotating belt of the conveyor 7960 advances the article up onto the conveyor 7960. In implementations, the belt of the conveyor 7960 rotates its belt in direction D at the same time that the carriage 7970 advances forward (in direction R) at the same speed of belt rotation. The conveyor carriage 7970 thus pulls itself under the folded article as the folded laundry article is transited up onto the belt of the conveyor 7960. In implementations, the leading edge 7961 is at the bottom of a downwardly sloped end portion of the conveyor 7960. In implementations, a trailing edge 7962 of the conveyor 7960 is sloped inwardly from the top of the conveyor to the bottom to create an overhanging portion, or an inwardly sloped nose. As will be described subsequently with regard to implementations, that inwardly sloped nose is configured to nest with a downwardly sloped end of one of the at least two bi-directional conveyors 8400*a-b* of the packing robot 8000 as shown in FIGS. 12-14 and form a continuous overlapping surface to hand off a folded article 7300 between the conveyors without the article toppling and/or unfolding. Alternatively, in implementations, a trailing edge 7962 of the conveyor 7960 is downwardly and outwardly sloped similar to the leading edge 7961 such that a folded article can be handed off across a level surface to a nested nose of one of the at least two complementarily sloped bi-directional conveyors 8400*a-b* of the packing robot 8000 without a folded article toppling and/or unfolding.

Figure 23:
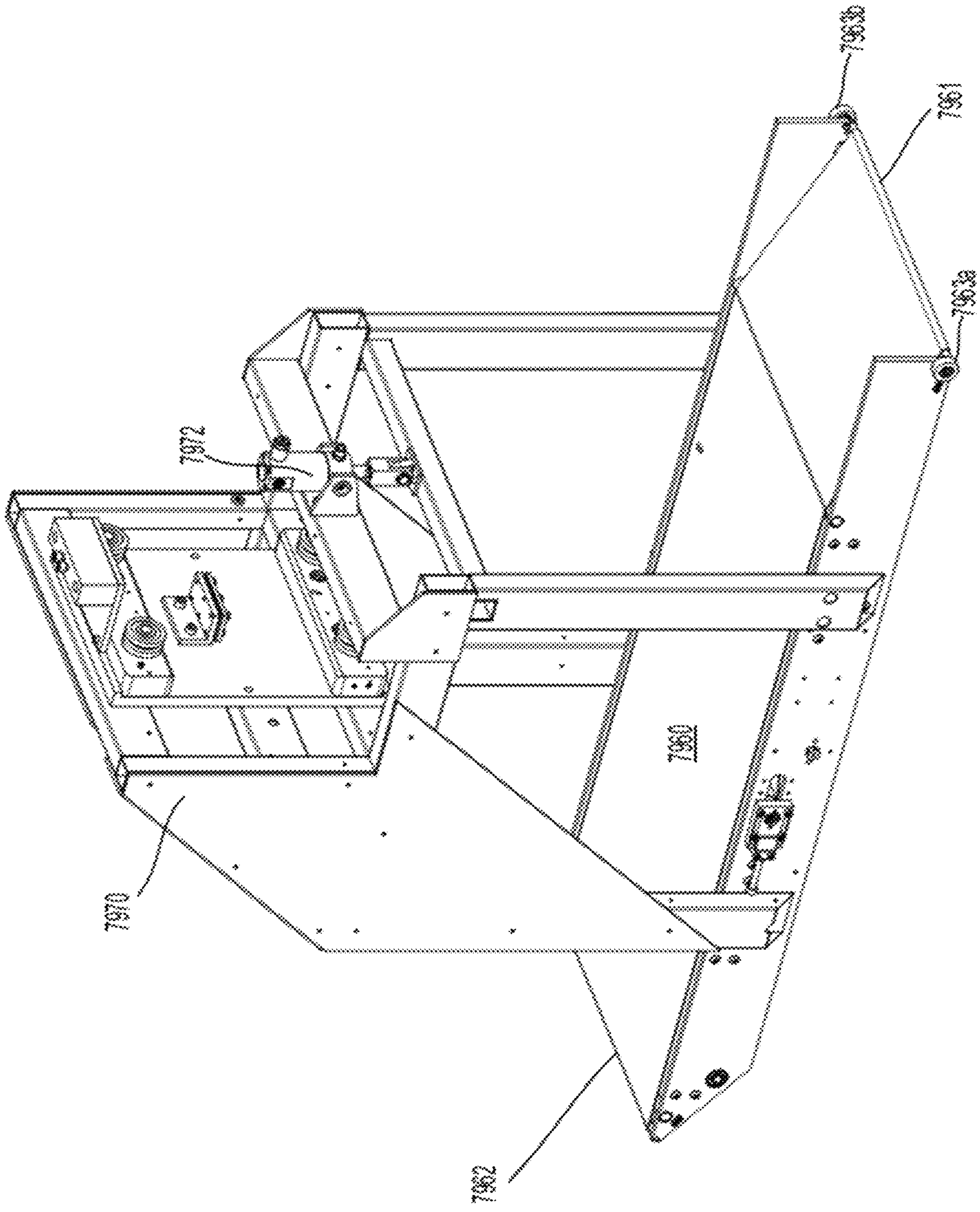
FIG. 23 depicts a perspective view of an example of an autonomous gantry mounted folded article retrieval conveyor of FIGS. 21-22.
Figure 24A:
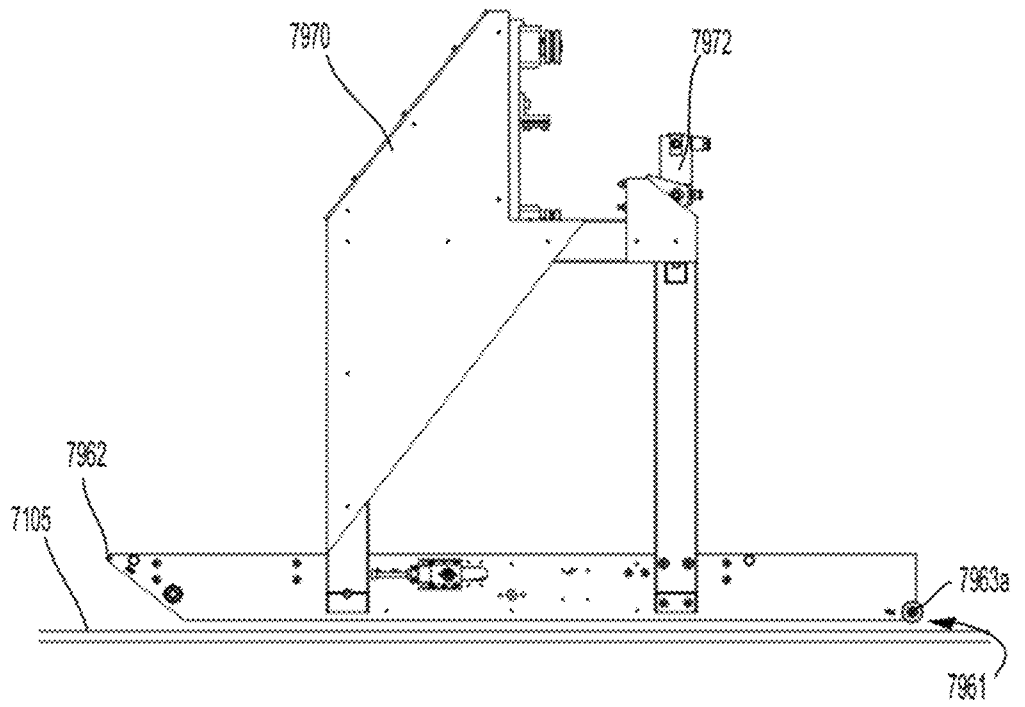
FIG. 24A depicts a side view of an example gantry mounted conveyor carriage and folded article retrieval conveyor of the folded garment unloading station of FIGS. 21-23.
Figure 24B:
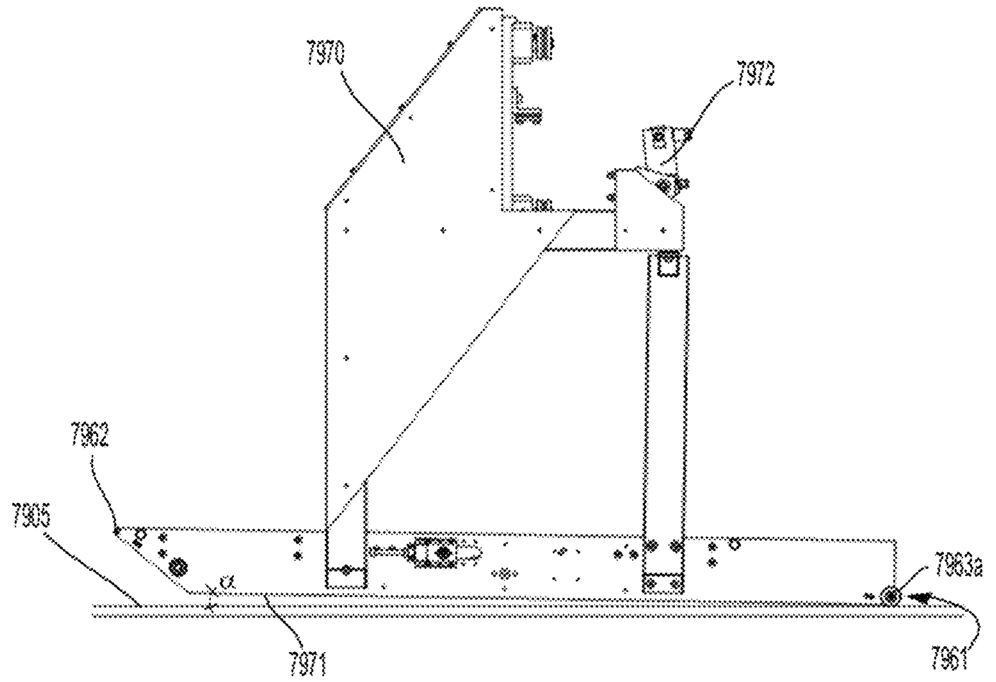
FIG. 24B depicts a side view of an example gantry mounted conveyor carriage and folded article retrieval conveyor of FIGS. 21-24A with a retrieving end (e.g., a leading edge 7961) of the conveyor lowered to a platter surface.
Figure 25:
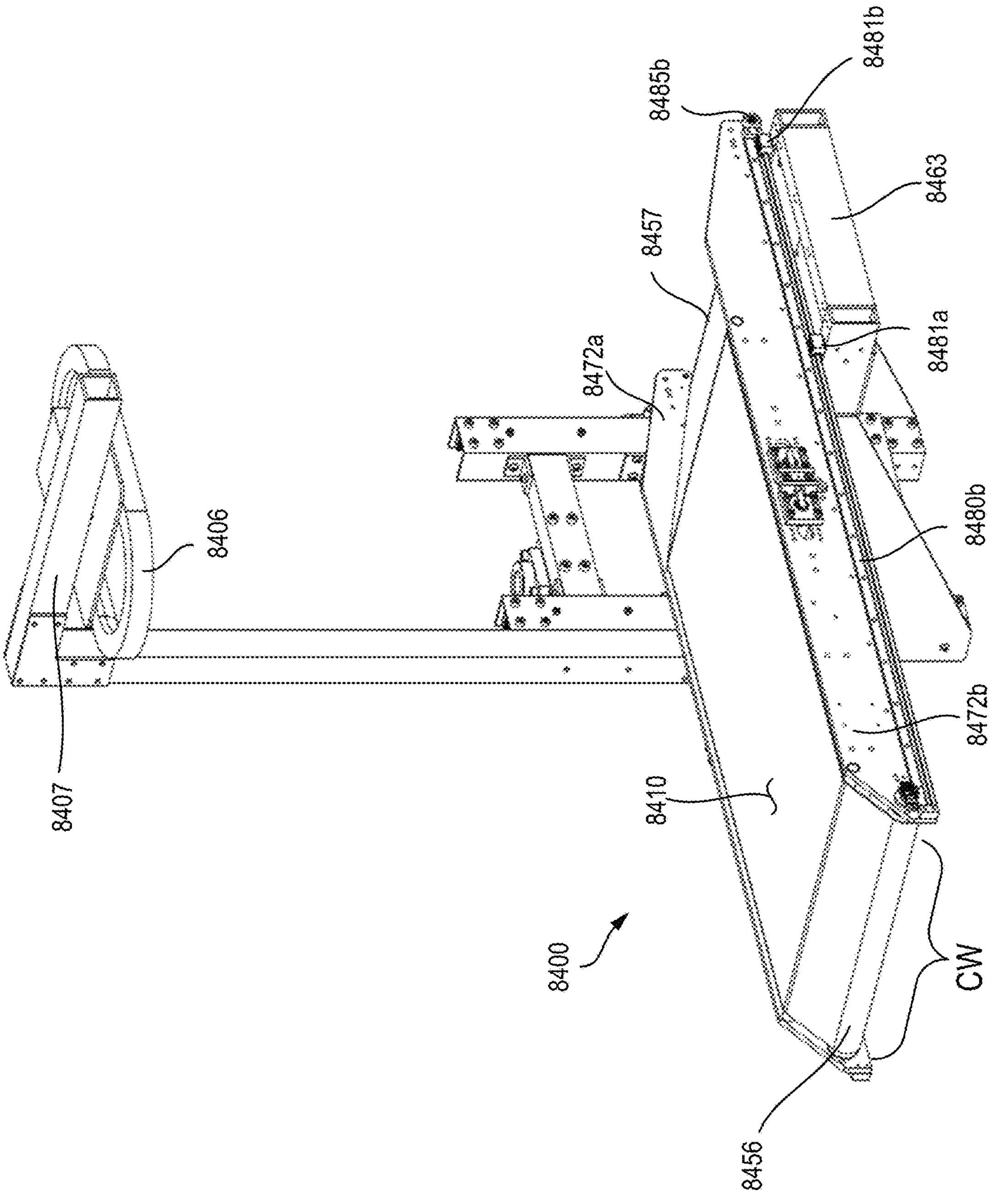
FIG. 25 depicts a front side perspective receiving end view of an example assembly of the conveyor movably engaged with a support tower platform and the support tower of FIGS. 16A-17.

In order to position the leading edge 7961 of the conveyor 7960 adjacent the folded article 7300 on the top surface 7105 of the platter 7100, the carriage 7970 is configured to pivot the leading edge 7961 of the conveyor 7960 down from a pivot shaft adjacent the trailing edge of the conveyor 7960. As shown in FIGS. 23 and 24A-B, a linkage 7972 near the leading edge 7961 lowers the leading edge 7961 of the conveyor 7960 down onto the platter 7100 top surface 7105 such that a bottom edge 7971 of the carriage 7970 is at an angle relative to the top surface 7105 as viewed from the side (FIG. 24B) and oriented from the trailing edge 7962 to the leading edge 7961. In implementations, the conveyor 7960 further comprises one or more wheels 7963*a-b* disposed in line with the leading edge 7961 configured to rotate and enable the leading edge 7961 to slide along the top surface 7105 of the platter 7100 while the belt of the conveyor 7960 rotates. The one or more wheels 7963*a-b* are configured to raise the leading edge 7961 above the top surface 7105 by between about 0.0254 mm to 5 mm (e.g., about 0.001 inch to 0.2 inch) such that the leading edge 7961 can slide up against and/or beneath an edge of the folded article 7300. In implementations, the linkage 7972 comprises a piston (e.g., a piston comprising a valve relief) configured to enable the leading edge 7961 of the conveyor 7960 to lower to the top surface 7105 under gravitational force. In implementations, the piston linkage 7972 is in operable communication with the controller 7005 and is configured to lift the leading edge 7961 back to a horizontal position under power once the laundry article is detected to be fully disposed on the conveyor 7960.

In implementations, as shown in FIG. 6, the unloading station 7950 comprises one or more sensors 7952*a-c* configured to detect at least one of the presence, orientation, and height of the folded article disposed on a platter 7100 received within the unloading station 7950 and output a signal to the at least one controller 8005, 205 indicative of the at least one detected characteristic. In implementations, the one or more sensors 7952*a-c* comprise one or more optical sensors disposed at least one of above and adjacent to the unloading station 7950. In implementations, the one or more sensors 7952*a-c* comprise one or more optical sensors disposed on at least one of the gantry rail 7955 and the carriage 7970. Additionally or alternatively, in implementations, the one or more sensors 7952*a-n* comprise one or more optical sensors 7952*a-c* (e.g., a depth camera) disposed on at least one of the unloading elevator 7900 and an unloading elevator cantilever 7901 extended about the unloading station. Additionally or alternatively, in implementations, the one or more sensors 7952*a-c* comprise one or more optical sensors disposed on a rail or beam mounted above the unloading station 9750. In implementations, the one or more sensors 7952*a-c* are configured to detect one or more edges of the folded article disposed on a platter 7100 at the unloading station 7950. Additionally, in implementations, the controller 7005 is configured to determine a location and orientation of a folded edge along the top surface 7105 of the platter 7100 based on one or more received signals output by the one or more sensors 7952*a-c*.

Based on the received output signal of the one or more sensors 7952*a-c*, the at least one controller 8005, 205 is configured to communicate with one or more drive motors configured to move carriage 7970 and the conveyor 7960 thereon in the x-axis and y-axis directions (Tx and Ty) and position the leading edge 7961 of the conveyor 7960 adjacent an identified and located edge of the folded article. Additionally, in implementations, a drive motor 7912 of the receiving coupling 7988 of the unloading station 7950 is configured to be in operative communication with the at least one controller 8005, 205. In implementations, based on one or more received signals from the one or more sensors 7952*a-n*, the at least one controller 8005, 205 is configured to instruct the drive motor of the receiving coupling 7988 of the unloading station 7905 to rotate the platter 7100 coupled thereto (e.g., by a platter coupling 7165 seating in the receiving coupling 7988 in mated engagement) until the one or more sensors 7964*a-n*, detect an edge of the folded article 7300 being parallel with the leading edge 7961 of the conveyor 7960.

Returning to FIGS. 12-14, each one of the at least two bi-directional conveyors 8400, 8400*a-b* comprises at least one noseroller edge at the depositing end 8457 (e.g., a relatively small placing edge) and a relatively larger idler roller on a handoff end (e.g., receiving end 8456). In implementations, each conveyor 8400 comprises a receiving end 8456 configured to nest with a discharge end of the retrieval conveyor 7960 and a platform end (e.g., the depositing end 8457) configured to deposit on and retrieve from the plurality of tiered platforms 8105*a-b* one or more of the plurality of folded laundry articles 7300*a-n*. A belt 8410 extending from each receiving end 8456, 8456*a-b* and platform end (depositing end 8457, 8457*a-b*) of each one of the at least two bi-directional conveyors 8400*a-b* runs 90 degrees to the length of the plurality of tiered platforms 8105*a-d* in both a forward direction D and a reverse direction R depending. In implementations, as shown in FIGS. 12 and 13, the system 8000 comprises a sensor 7964 disposed at least one of above and adjacent a hand off area in which the discharge station conveyor 7960 nests with one of the at least two bi-directional conveyors 8400*a-b* to hand off a folded laundry article 7300 by simultaneously rotating their belts in the forward direction D, toward the plurality of tiered platforms 8105*a-d*. in implementations, the handoff nesting location is a specified spot and the unloading station conveyor 7960 and the bi-directional conveyor 8400 move to the predetermined location for nesting and handing off the folded laundry article 7300.

In implementations, the hand off area sensor 7964 is configured to monitor the handoff of a laundry article 7300 for at least one of the presence of a folded laundry article, a successful handoff of a folded laundry article, and any toppling, unfolding, or any other repositioning that would require refolding prior to packing. The hand off area sensor 7964 is configured to output a signal to the at least one controller 8005, 205 indicative of one or more of the presence of a folded laundry article, a successful handoff of a folded laundry article 7300, and any condition requiring refolding. In implementations, the hand off area sensor 7964 comprises an image sensor, and the at least one controller 8005, 205 is configured to process a received one or more images with a processing model, for example, a neural network model, to determine whether the handed off folded laundry article remains in a sufficiently folded state for packing. Additionally or alternatively, the hand off area sensor 7964 comprises an image sensor, and the at least one controller 8005, 205 is configured to process a received one or more images to determine height of the folded laundry article and article dimensions (e.g., area footprint 7302).

Once a folded laundry article is successfully received by one conveyor 8400*a* of the at least two bi-directional conveyors 8400*a-b* adjacent the unloading station 7950, the receiving conveyor 8400*a* is configured to place the retrieved folded laundry article 7300 at one of the plurality of spaced apart positions 8110*a*(*a*1-*f*2)-8110*d*(*a*1-*f*2) on one of the plurality of tiered platforms 8105*a-d* or atop one or more articles disposed at that spaced apart position. Placing a folded article 7300 on one of the plurality of tiered platforms 8105*a-d* includes optionally placing the retrieved folding laundry article 7300 directly on the at least one placer conveyor 8200, 8200*a-b* or atop another folded laundry article on the at least one placer conveyor 8200, 8200*a-b*. Additionally or alternatively, the folded laundry article 7300 can be deposited on a stationary platform and another of the at least two bi-directional conveyors, for example a bidirectional conveyor 8400*b* on an opposite side of the plurality of tiered platforms 8105*a-d* from the unloading station 7950, is configured to retrieve the folded laundry article from the one of the plurality of spaced apart positions and stack the folded laundry article on the at least one placer conveyor 8200, 8200*a-b* in the order for packing.

As previously described the order can be at least one of determined as folded laundry articles are received by the packing robot 8000, determined by predictive modelling of articles in a load being processed at robots preceding the packing robot and their one or more matching characteristics, and established with pre-determined locations on the at least one placer conveyor 8200, 8200*a-b* based on size (e.g., footprint area) or article type. Additionally or alternatively, the conveyor 8400*b* on the opposite side of the plurality of tiered platforms 8105*a-d* from the unloading station 7950 can receive a folded laundry article directly from the conveyor 8400*a* receiving the article from the unloading station conveyor 7960. Additionally or alternatively the at least two bi-directional conveyors can operate on a shared side of the plurality of tiered platforms 8105*a-d*. Additionally or alternatively, the at least two bi-directional conveyors 8400*a-b* comprises two or more conveyors disposed on at least one side of the plurality of tiered platforms 8105*a-b*, each one of the two or more conveyors 8400*a-b* disposed on at least one side of the plurality of tiered platforms 8105*a-d* being configured to transit up to and abut a drop off point of another of the two or more conveyors 8400*a-b* configured to transit along the same length-wise side of the plurality of tiered platforms 8105*a-d*.

Once a folded article 7300 is deposited at one of the plurality of spaced apart positions 8110*a*(*a*1-*f*2)-8110*d*(*a*1-*f*2), the at least one controller 8005, 205 is configured to store in the memory 8010, 2010 the one of the plurality of spaced apart positions 8110*a*(*a*1-*f*2)-8110*d*(*a*1-*f*2) at which the retrieved folded laundry article is placed and at least one article characteristic of the one or more characteristics. In implementations, the at least one article characteristic comprises at least one of folded article size and article type. The at least one controller 8005, 205 is configured to instruct at least one of the two or more bi-directional conveyors to retrieve one or more folded laundry articles from one or more of the spaced apart positions 8110_a_(_a_1-_f_2)-8110_d_(_a_1-_f_2) for packing based on at least one of evaluating the one or more characteristics of each one of one or more placed laundry articles 7300_a-n_ at one or more spaced apart positions 8110_a_(_a_1-_f_2)-8110_d_(_a_1-_f_2) and receiving at least one sensor output indicative of at least one of a folded article size and article type of one or more laundry articles 7300_a-n_ being folded or expected to be folded (e.g., the remainder of a load of a customer's laundry articles still in processing prior to the packing system 8000). In all implementations, the at least two bi-directional conveyors 8400_a-b_ are configured to retrieve one of the plurality of folded laundry articles 7300_a-n_ from the plurality of tiered platforms 8105_a-b_ and arrange each retrieved folded laundry article 7300 on the at least one placer conveyor 8200, 8200_a-b_ for loading into a refillable cartridge 8300. The folded laundry articles 7300_a-n_ can be at least one of arranged in an ordered queue on the at least one placer conveyor 8200, 8200_a-b_ for loading into a container in order, and repeatedly stacked on the at least one placer conveyor 8200 and loaded in real time. Additionally, in implementations, the at least one controller 8005, 205 is configured to queue one or more folded laundry articles 7300, 7300_a-n_ for loading based on knowledge of the articles comprising a load of laundry and which articles have been folded and received already on the plurality of tiered platforms 8105_a-d_.

Turning now to FIGS. 16A-17 and 25-31B the at least two bi-directional conveyors 8400_a-b_ each comprise a rotatable surface 8410 (e.g., a belt 8410) disposed on a carriage 8450 and a belt drive 8425, 8425_a-b_ (FIG. 18) configured to rotate the rotatable surface 8410 to move a folded laundry article disposed thereon in a direction of motion of the rotatable surface 8410.

Each of the at least two bi-directional conveyors 8400, 8400_a-b_ (hereinafter referred to in the singular for simplicity and clarity as "bi-directional conveyor 8400") are identically constructed and include a receiving end 8456 and a depositing end 8457. Each bi-directional conveyor 8400 is configured to be moveably engaged with a driven support tower 8500 to cantilever the receiving end 8456 to nest with a complimentarily inclined end of the unloading station conveyor 7960 for retrieving a folded laundry article and to cantilever the depositing end 8457 over one of the plurality of tiered platforms 8105_a-b_ for depositing the folded laundry article onto either a surface of one of the plurality of tiered platforms 8105_a-b_ or another folded laundry article of the plurality of household laundry articles 7300_a-n_ previously deposited on one of the plurality of tiered platforms 8105_a-b_.

As shown in FIG. 16B, in implementations, the receiving end 8556 and depositing end 8557 of the conveyor 8400 are terminating ends of angled portions of the conveyor. The angled depositing end 8457 being sloped downward at an angle? from a top surface of the conveyor 8400 and the angled receiving end 8456 being sloped downward at an angle from a top surface of the conveyor 8400. The angle? comprises a range of between about 10 to 20 degrees and the angle comprises a range of between about 30 to 70 degrees. Angling the receiving end 8456 and depositing end 8457 of the circulatable conveyor belt 8854 assists with retrieving a folded laundry article 7300 up onto the conveyor from a nested unloading station conveyor 7960 and depositing the folded laundry article on one of the plurality of tiered platforms 8105_a-d_ without the unbound folded laundry article 7300 unfolding during transit. Additionally, this angled, nested configuration of the overlapped two conveyors 7960, 8400 eliminates an unprotected gap and prevents pinching of portions of the deformable laundry article 7300 that might occur in between such a gap between the two conveyors 7960, 8400, which could cause jams and unfold or potential damage the laundry article. The nested configuration also establishes a flat (level) continuous article movement path during transfer, thereby minimizing the number of times the folded article 7300 has to go up and down an angled surface.

The downwardly sloped angle? at the depositing end 8457 of the bi-directional conveyor 8400 enables a gradual angle over which a folded laundry article is conveyed off of the bi-directional conveyor 8400. In implementations, as shown at least in FIGS. 28-30B, a noseroller 8459 disposed at the depositing end 8457 comprises a diameter of between about 4 mm to 15 mm. In implementations, the noseroller 8459 comprises a diameter of between about 5 mm to 10 mm.

The small diameter knife edge of the depositing end 8457 assists with smooth, non-turbulent transitions of a folded laundry article onto and off the conveyor 8400 and prevents the folded laundry article from rolling over on top of itself during retrieval from a surface. An idler roller 8458 disposed at the receiving end 8456 comprises a diameter of between about 25 to 40 mm, and in implementations, a round bar 8461 disposed at a top corner of the receiving end 8456 comprises a diameter in a range of between about 4-20 mm and enables a closely nested configuration between the unloading station conveyor 7960 and the bi-directional conveyor 8400.

The unbound folded laundry article 7300 is a folded laundry article that is not wrapped, scaled, restrained, or fastened in any way. The unbound folded laundry article is folded by a folding robot 7000 and delivered to the packing system 8000 for packing without being held in a folded state by any shrink wrapping or plastic ties or other constraints wrapped around or placed upon the unbound folded laundry article. Eliminating such ties and wraps reduces waste and environmental damage caused by such waste and facilitates quickly unloading the folded laundry packing and shipping container contents into a dresser drawer or closet. All design considerations described herein with regard to implementations are intended to prevent unfolding, crumpling, or otherwise disturbing one or more folded and/or stacked deformable laundry articles 7300.

The carriage 8450 (FIG. 28) defines the structure of the conveyor 8400 and is configured to mount to the driven support tower 8500. In implementations no part of the conveyor 8400 extends lower than the receiving end 8456 and depositing end 8457 such that nothing interferes with or disturbs a surface below the receiving end or a stack of one or more folded laundry articles 7300 below the depositing end 8457. In implementations, as shown in FIG. 29B, the conveyor carriage 8450 comprises a bottom plate 8486 configured to block off the moving belt 8410 from contacting folded laundry articles therebelow while providing increased stiffness to the carriage 8450. This configuration also enables the conveyor to lower close to a surface of a platform 8105 for reliably retrieving an article (e.g., the depositing end 8457 is above and within a few millimeters (e.g., 1 mm or less, 2 mm, 3 mm, 4 mm) of the surface on which the folded article is disposed). As shown in FIGS. 16A-17 and 25-27, in implementations, a carriage 8450 of the conveyor 8400 comprises a pair of externally mounted longitudinal siderails 8472_a-b_ having protrusions 8480_a-b_ (e.g., linear rails) affixed along the length thereof for engaging with stationary bearings 8481_a-d_ (FIGS. 16C, and 17) that allow the carriage 8450 to extend in forward D and reverse R directions to cantilever in both directions. Each one of the longitudinal siderails 8472*a-b* extends the length of the conveyor 8400. In implementations, each one of the longitudinal sidewalls 8472*a-b* comprises a thickness of between about 1 mm to 10 mm. In implementations, each one of the longitudinal sidewalls 8472*a-b* is made of folded sheet metal and comprises a thickness of between about 1 mm-1.5 mm.

Figure 26:
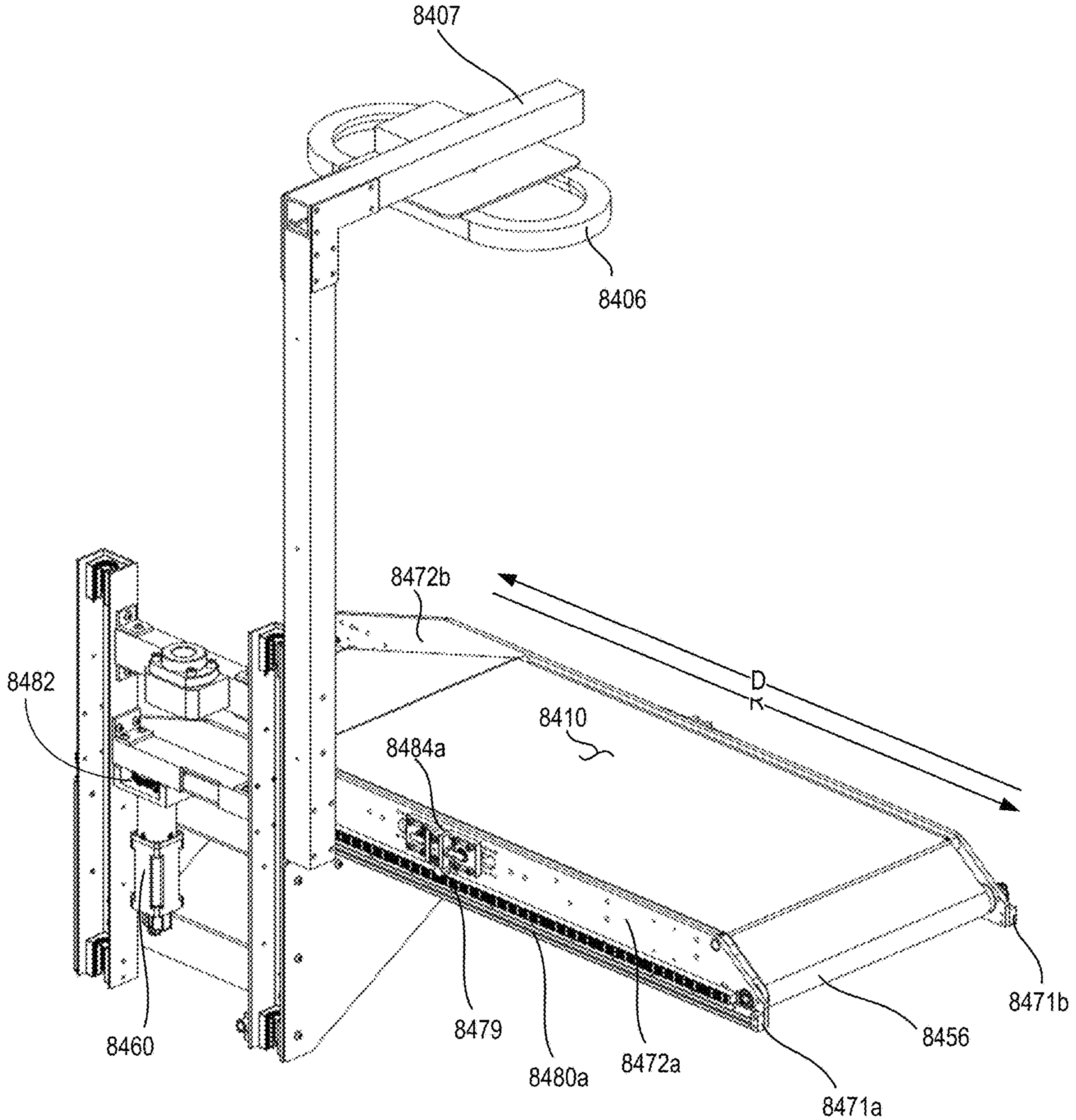
FIG. 26 depicts a tower side perspective receiving end view of the assembly of FIG. 25 including a rack and pinion conveyor extend (e.g., cantilever) mechanism.
Figure 27:
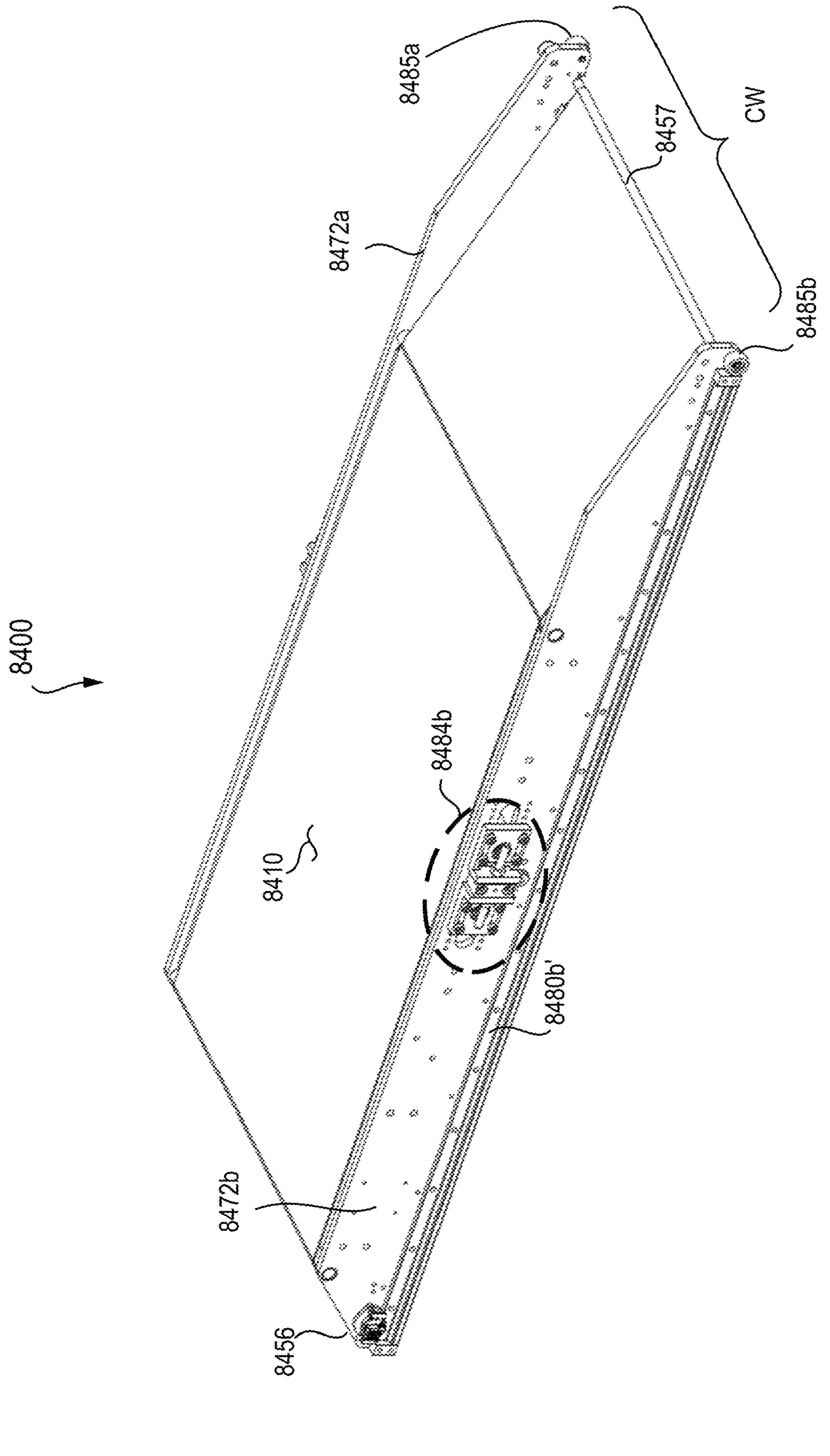
FIG. 27 depicts a perspective depositing end view of an example conveyor of the system of FIGS. 25-26.

As shown in FIG. 26, at least one of the one or more side rails 8472, 8472*a-b* is configured to engage with the cantilever motor 8460 for cantilevering the conveyor 8400 during receipt of the folded laundry article from the unloading station conveyor 7960 and depositing of the folded laundry article on the plurality of tiered platforms 8105*a-d*. The cantilever motor 8460 drives the conveyor 8400 back and forth within the stationary bearings 8481*a-d*. In implementations, as depicted at least in FIGS. 16B and 26, the cantilever motor 8460 is configured to engage with the one or more side rails 8472 to drive a linear motion. A pinion gear 8482 of the driven support tower 8500 is configured to engage one or more extend racks 8479 disposed along the length of at least one of the siderails 8472*a* of the carriage 8450 such that the protrusions 8480*a-b* of the carriage 8450 slide back and forth in the bearings 8481*a-d* disposed on a platform 8463 of the driven support tower 8500.

The platform 8463 (FIGS. 16A-D and 17) further comprises the cantilever drive motor 8460 mounted thereto and configured to at least one of drive the carriage 8450 to cantilever (e.g., extend) the receiving end 8456 of the conveyor 8400 to nest with the unloading station conveyor 7960 and drive the depositing end 8457 over the plurality of tiered platforms 8105*a-d* to deliver and/or retrieve a folded laundry article 7300 at one of the plurality of spaced apart positions 8110*a*(*a*1-*f*2)-8110*d*(*a*1-*f*2) and a particular height, either directly on the surface of one of the plurality of tiered platforms 8105*a-d* or atop another already queued folded laundry article or stack of folded laundry articles. In implementations, as previously described, a siderail 8472*a* and drive motor 8460 engage in a rack and pinion configuration. For example, the rack gear 8479 can be mounted to a siderail 8472*a* of the carriage 8450 and the pinion gear 8482 can be attached to the cantilever drive motor 8460 on the elevator platform 8463 for engaging with the rack gear 8479 to drive the carriage 8450 back and forth in the forward direction D and reverse direction R. In implementations, the conveyor 8400 can be extended and retracted by other linear drive assemblies including at least one of pistons, ball screws, belt, screw, chain, and roller guided (e.g., friction roller) drive assemblies configured to impart linear motion.

Additionally, as shown in FIGS. 16A-17, in implementations, the platform 8463 is configured to raise and lower on the driven support tower 8500 in the directions of doubled ended arrow V. In implementations, the platform 8463 is configured to engage one or more vertical rails 8566*a-b* disposed on (e.g., affixed to or formed with the tower 8500), such as SBR linear rails. An elevator drive motor 8465 is configured to raise and lower the platform 8463 via a linear motion. In implementations, the drive motor 8495 is operably linked to the platform 8463 via a ball screw and nut assembly 8569. Alternatively, in implementations, the drive motor can be operably linked to the platform 8463 via a timing belt drive or a chain drive. Additionally, in implementations as shown in FIG. 26, the carriage 8450 further comprises disposed thereon at one or both ends on a face of the side rails 8872*a-b* at least one of a hard stop 8471*a-b* and a limit magnet configured to be detected by a limit switch disposed on or adjacent the elevator platform 8463 for detecting an end of travel (e.g., to tell the cantilever drive 8460 when to stop cantilevering the conveyor 8400). The at least one of the hard stop 8471*a-b* and limit magnet and limit switch pair is therefore configured to enable detection of an end of travel in a full cantilevered extension in the direction of either arrow D (forward) and R (reverse).

Additionally, in implementations, the carriage 8450 comprises a proximity sensor configured to output a signal to the at least one controller 8005, 205 indicative of an unacceptable height of the carriage 8450 relative to a surface of one of the plurality of tiered platforms. An unacceptable height is one in which the conveyor 8400 would collide with at least one of a surface of one of the plurality tiered platforms 8105*a-d* and one or more folded laundry articles disposed thereon. Additionally or alternatively, in implementations as shown in FIGS. 25, 27-28, and 31B, the carriage 8450 comprises a pair of nose wheels 8485*a-b* configured to elevate one of the at least two bi-directional conveyors 8400, 8400*a-b* from a surface of one of the plurality of tiered platforms 8105*a-d* while at least one of placing a folded laundry article on and retrieving one or more folded laundry articles from one of the plurality of spaced apart positions 8110*a*(*a*1-*f*2)-8110*d*(*a*1-*f*2). The pair of nose wheels 8485*a-b* therefore maintain a minimum distance of a bi-directional conveyor 8400 to a top surface of one of the plurality of tiered platforms 8105*a-d* such that the structure of the carriage 8450 is prevented from rubbing or dragging on the surface of a platform 8105.

Figure 28:
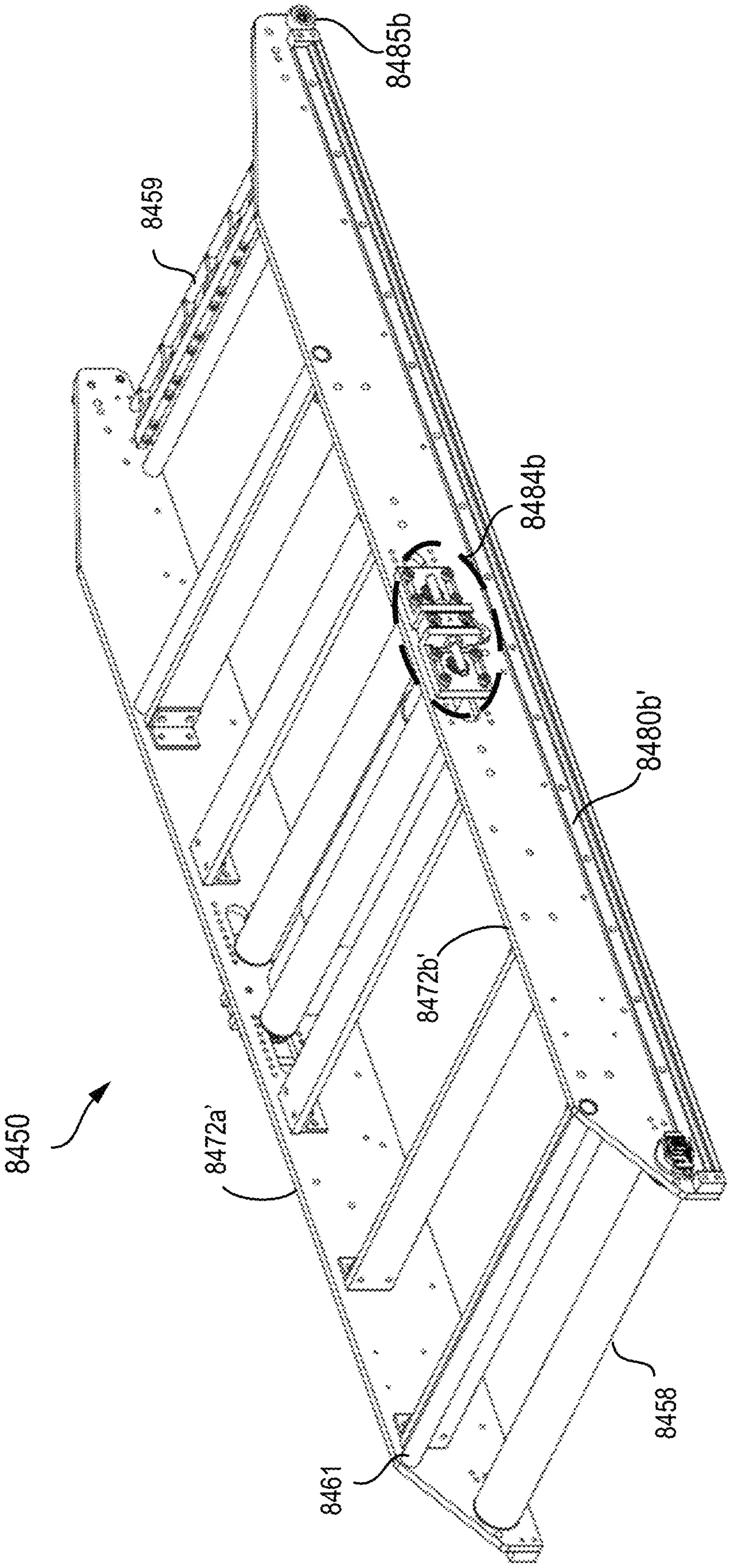
FIG. 28 depicts a perspective view of an example carriage of the conveyor of FIGS. 25-27 with the conveyor belt removed.
Figure 29A:
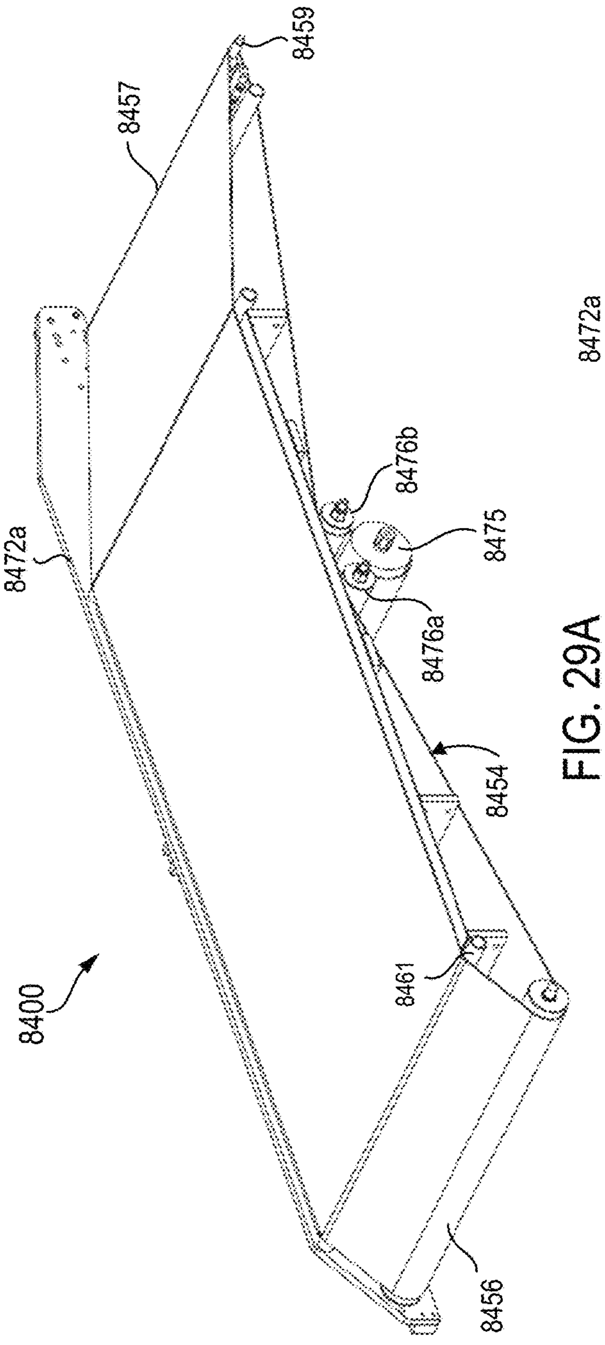
FIG. 29A depicts a perspective side view of the conveyor of FIGS. 25-27 with a sidewall of the carriage removed.
Figure 29B:
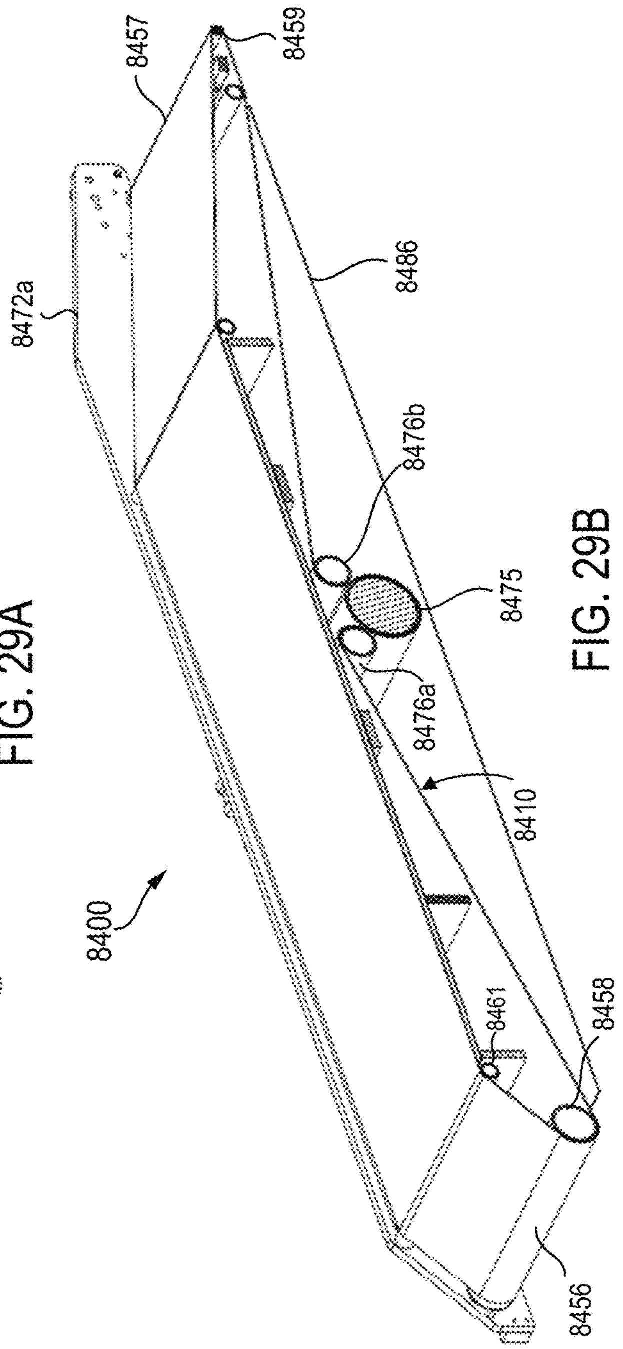
FIG. 29B depicts a perspective side view of the bisected conveyor of FIG. 29A showing a tension roller assembly.
Figure 30A:
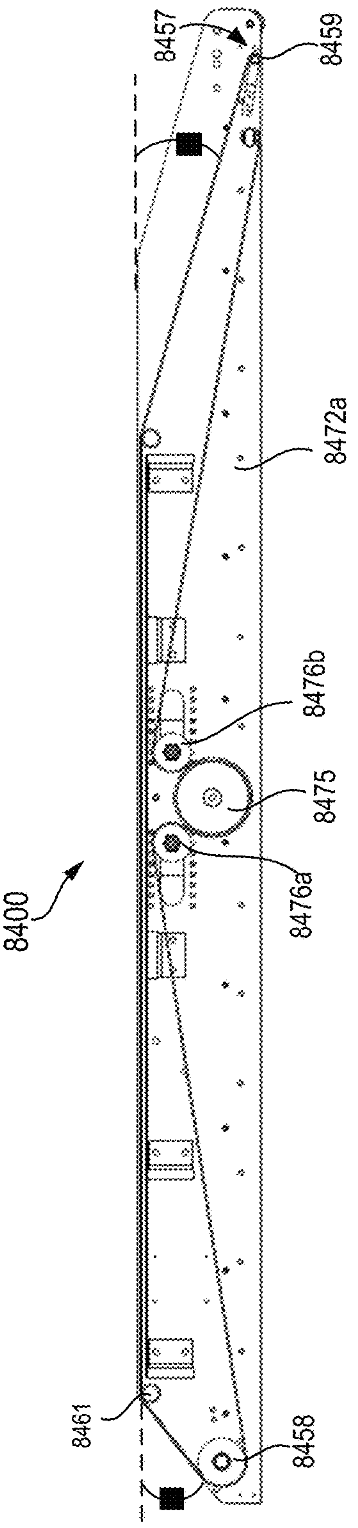
FIG. 30A depicts a side cross section view of the conveyor of FIGS. 29A-B depicting the tension roller assembly.
Figure 30B:
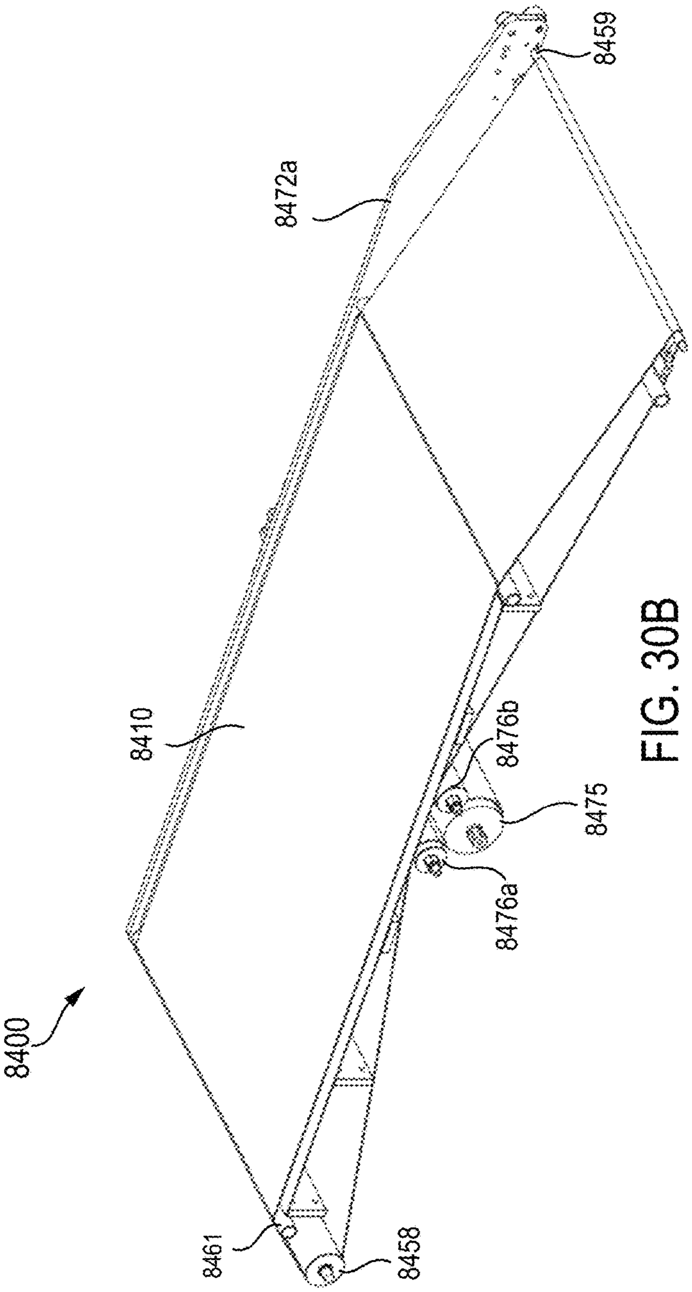
FIG. 30B depicts a perspective view of the conveyor of 30A.
Figure 31A:
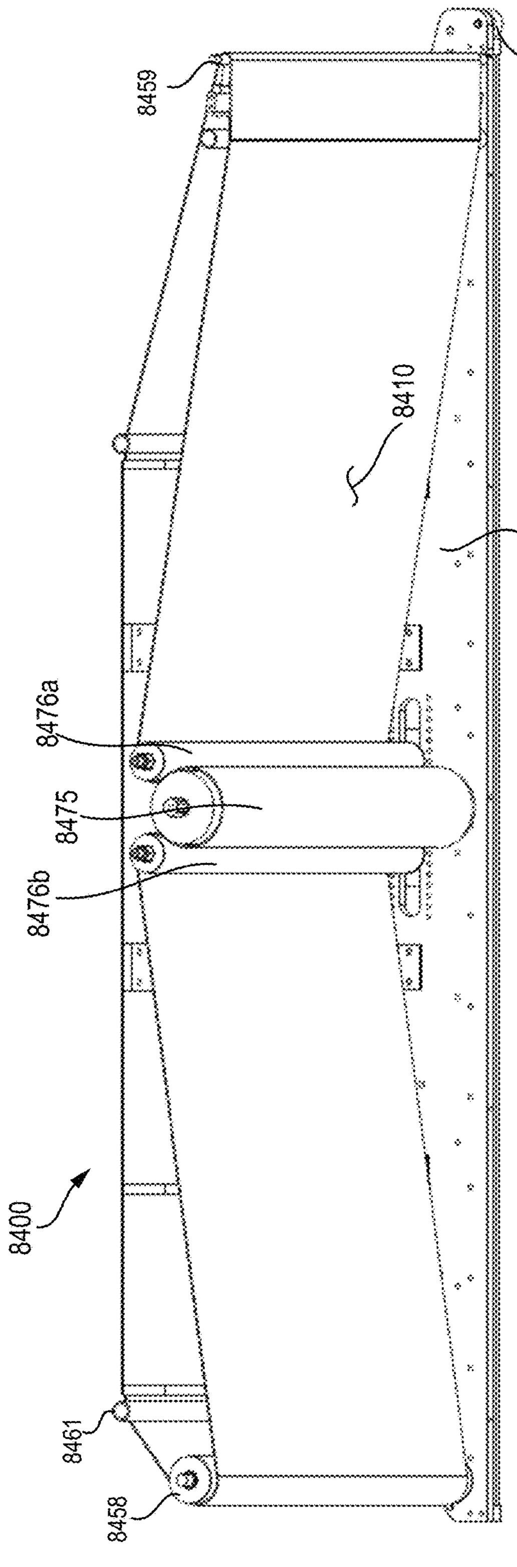
FIG. 31A depicts a bottom perspective view of the tension roller assembly of the conveyor of FIGS. 25A-30B with one sidewall removed.
Figure 31B:
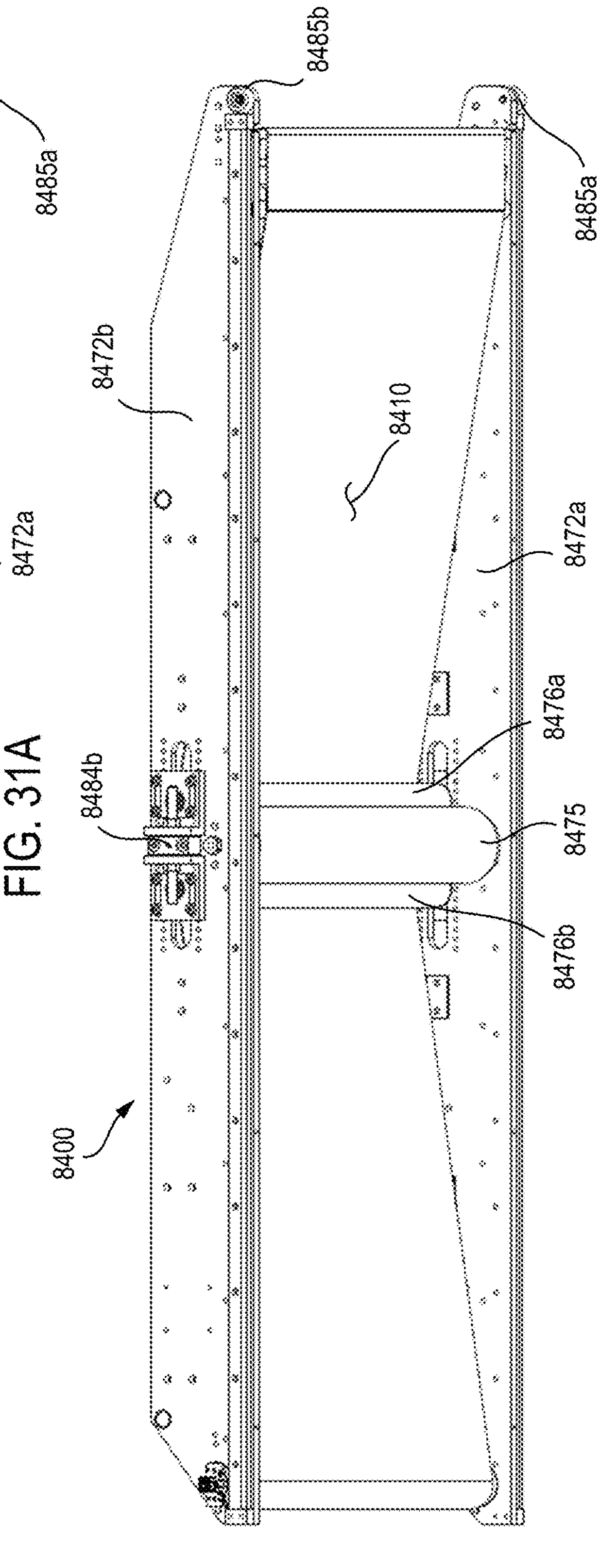
FIG. 31B depicts a bottom perspective view of the conveyor of FIG. 27A with both sidewalls attached.
Figure 32A:
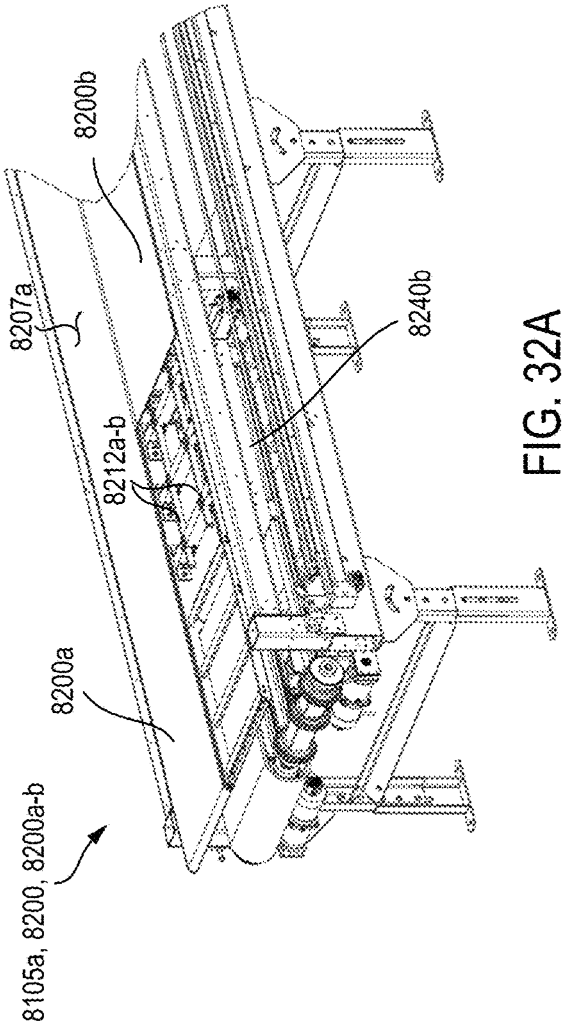
FIG. 32A depicts an example perspective end view of a partially exposed loading end conveyor support of a placer conveyor in a retracted position.
Figure 32B:
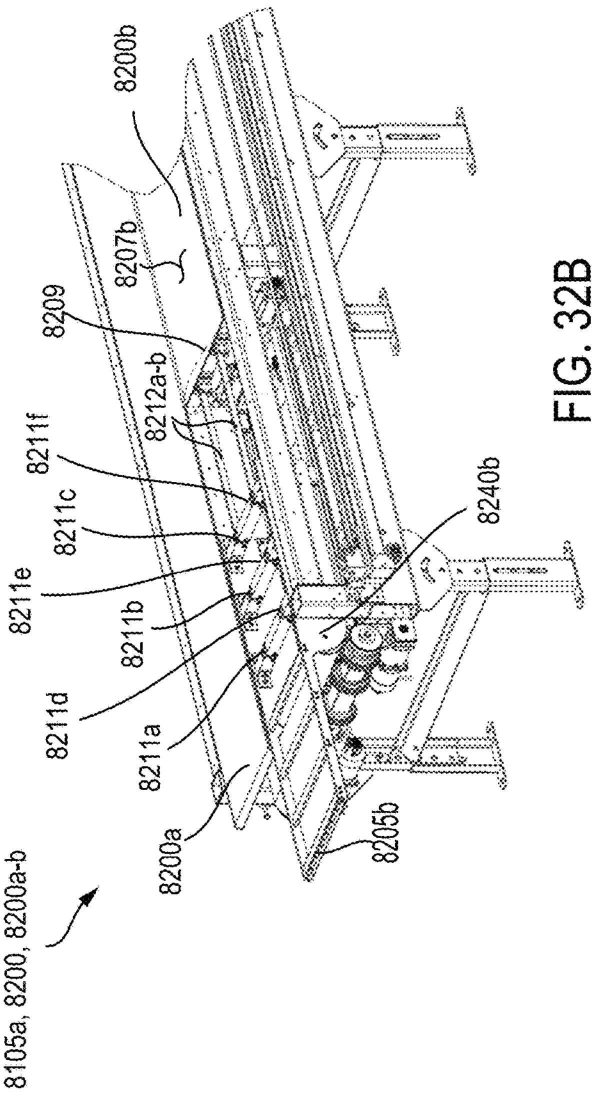
FIG. 32B depicts an example perspective end view of a partially exposed loading end conveyor support of a placer conveyor of FIG. 32A in an extended position with the conveyor support beams exposed.

As shown in FIG. 28 and the cut away view of FIGS. 29A-31B, the carriage 8450 comprises a drive roller 8475 having a motor disposed therewithin comprising the belt drive 8425 (FIG. 18). Additionally, in implementations, the carriage 8450 comprises a pair of tension rollers 8476*a-b* for tensioning the belt 8410 of the conveyor 8400. The tension rollers 8476*a-b* increase the wrap of the belt 8410 around the drive roller 8475, which helps prevent the belt 8410 from slipping or running off track (e.g., moving side to side). In implementations such as that of FIGS. 26-28, tracking is achieved by tensioning the tension rollers 8476*a-b* by adjusting tension screws on either side of the tension rollers 8476*a-b*. Because the belt 8410 is configured to be rotated in both the forward and reverse directions, the pair of tension rollers 8476*a-b* disposed on opposite sides of the drive roller 8475 work in conjunction to maintain belt tension on the receiving end 8456 and the depositing end 8457 of the conveyor 8400.

Additionally, in implementations, the tension rollers 8476*a-b* each have an adjustable angle, which adjustability helps prevent the belt 8410 from running off track (e.g., moving side-to-side). The tracking is achieved by the combination of the three middle rollers—the drive roller 8475 and the pair of tension rollers 8476*a-b*. Because the belt 8410 moves bi-directionally (e.g., rotates in the forward direction D and reverse direction R) and the drive roller 8475 and the pair of tension rollers 8476*a-b* are tightly clustered, one of each of the pair of tension rollers 8476*a-b* sets tracking in each direction. The first roller of the pair of tension rollers 8476*a-b* the belt 8410 sees in each direction has the greatest tracking influence. The tension roller 8476*b* closest to the depositing end 8457 helps adjust the belt tracking in the reverse direction R, while roller 8476*a* closest to the receiving end 8456 helps adjust the belt tracking in the forward direction D.

Additionally or alternatively, in implementations, the drive roller 8475 is lagged (e.g., rubber-coated) to assist with preventing the belt 8410 from slipping. Additionally or alternatively, in implementations, at least one of the rollers 8458, 8459, 8475 of the carriage 8450 are crowned rollers.

In implementations, at least one of the drive roller 8475 and the idler roller 8458 crowned.

In implementations, the axle ends of each roller of the pair of tension rollers 8476*a-b* are removable from the outside of the carriage 8450. The carriage comprises tension blocks 8484*a-b* configured to be removed from the outside of the carriage for enabling removal of the axles of the tension rollers 8476*a-b*. With their axles removed, each one of the pair of tension rollers 8476*a-b* can be slid out from the bottom of the conveyor carriage 8450. This enables the belt 8410 to be taken on and off without disassembling the structure of the conveyor carriage 8450.

Returning to FIGS. 12-14 and 16A-17, in implementations, the depositing end 8457 of each bi-directional conveyor 8400, 8400*a-b* is parallel to a length L of the plurality of tiered platforms 8105*a-d*. In implementations, each bi-directional conveyor 8400 comprises a length ranging between about 0.75-1.25 m and a width ranging between about 30-45 cm and each one of the plurality of tiered platforms 8105*a-d* comprises a width W of between about 50-100 cm. The width of each bi-directional conveyor 8400 is configured to be equal to or greater than a maximum dimension of a plurality of predetermined final folding dimensions of the plurality of folded laundry articles.

In implementations in which the folding robot 7000 is configured to fold articles to a plurality of target footprint areas, the width W of the each platform of the plurality of tiered platforms 8105*a-d* is configured to be equal to or greater than twice a medium predetermined dimension for accommodating two folded articles of medium size side-by-side. For example, the plurality of predetermined sizes can include folded length and width dimensions of approximately 20×12 inches, 10×12 inches, 5×12 inches, 6×10 inches, and 5×6 inches for combining and orienting folded articles in even stacks in a particular order along the one or more placer conveyors 8200, 8200*a-b* for efficiently loading into a shipping container 7800 having dimensions of approximately 14×24 inches. (In an alternative embodiment, the at least one placer conveyor 8200 can be narrower and accommodate a single row of folded articles and/or stacks of folded articles article stacks.) The system 8000 is configured to intelligently stack the folded articles 7300 in a particular order and to a particular stack height to minimize or eliminate empty space in the shipping container 7800 and add stability to the shipped articles 7300 so that they remain folded in transit.

To effect intelligently ordered queuing along the at least one placer conveyor 8200, each bi-directional conveyor 8400 is configured to move horizontally along a length L of the plurality of tiered platforms 8105*a-d* to one of a plurality of spaced apart positions 8110*a*(*a*1-*f*2) on the at least one placer conveyor 8200, 8200*a-b*. An elevator platform 8463 is configured to move the conveyor 8400 vertically along a tower 8500 at each spaced apart position to deposit a folded article at a particular height atop at least one of the at least one placer conveyor 8200 and another already deposited folded laundry article. In implementations, as shown in FIGS. 5 and 7A, because the upper ones 8105*b-d* of the plurality of tiered platforms 8105*a-d* are configured to receive a single layer of folded laundry articles or short stack (e.g., 2-3 stacked folded laundry articles) while the folded articles are buffered prior to batching and ordering for packing, the heights Hs1-Hs3 between those platforms is shorter than the height Hp between the lowest platform 8110*a*(e.g., in implementations, the at least one placer conveyor 8200, 8200*a-b*) and the platform 8110*b* directly above it. For example, the upper platform heights Hs1-Hs3 are in a range of between about 10 inches to 20 inches (e.g., approximately 25 cm-51 cm) to accommodate a combined height of one of the at least two bi-directional conveyors 8400, 8400*a-b* and a folded article thereon. The height Hp between the lowest platform 8110*a*(e.g., in implementations, the at least one placer conveyor 8200, 8200*a-b*) and the platform 8110*b* directly above it is in a range of between about 24 inches to 48 inches (e.g., approximately 61 cm-122 cm) to accommodate taller stacks 7301*a-n* of folded laundry articles, matched and stacked together by one or more characteristics for intelligent packing. Additionally, in implementations, the relatively taller height Hp between the lowest platform 8110*a*(e.g., in implementations, the at least one placer conveyor 8200, 8200*a-b*) and the platform 8110*b* directly above it accommodates an offset required by one or more depth cameras 8210, 8210*a-b* for effective sensing of heights of one or more stacks 7301, 7301*a-n* of folded laundry articles.

Returning to the example controls system 400 of FIG. 18, in implementations, the system 8000 comprises one or more drives comprising at least one of one or more belt drives 8425 configured to rotate a belt 8410 of the conveyor 8400, a cantilever drive 8460, an elevator drive 8465, and upper and lower tower drives 8552, 8557 configured to transit a bi-directional conveyor 8400 along the length L of the plurality of tiered platforms 8105*a-d*. In implementations, upper and lower tower drives 8552, 8557 each comprises a stationary motor and a timing belt that pulls the tower 8500 back and forth along the upper rails 8553*a-b* and lower rails 8555*a-b*. Other implementations comprise a chain and sprocket. In other implementations, the motor could be disposed on the tower 8500 to drive it along a chain or timing belt, cable drive, etc. In implementations, the one or more bi-directional conveyor belt drives 8425, 8425*a-b* and cantilever drives 8460, 8460*a-b* are configured to be instructed to move simultaneously by the at least one controller so that folded laundry articles can be deposited while the belt 8410 is rotating and the bi-directional conveyor is retracting its cantilever.

In implementations, one or more sensors 7964, 8210*a-b*, 8408*a-b*, 8430*a-b* are configured to output a signal indicative of at least two of an area footprint of the folded laundry article 7300, an orientation of the area footprint relative to a length L of plurality of tiered platforms 8110*a-d*, a retrieval edge of the folded laundry article 7300, a height of the folded laundry article, and an article type. An area footprint is an area occupied on the surface of one of the plurality of tiered platforms 8105*a-d* by each unbound folded laundry article 7300. Additionally or alternatively, in implementations, at least one sensor of a folding robot 7000 can provide a signal indicative of at least one of an area footprint, height, orientation, and article type of a folded article 7300. The at least one controller 8005, 205 can then use this information communicated via a network 230 to decide whether to deposit the folded laundry article on at least one of one of the plurality of tiered platforms 8105*a-d* and atop another already deposited one or more folded laundry articles disposed on one of the plurality of tiered platforms 8105*a-d*, including the at least one placer conveyor 8200, 8200*a-b*. The at least one controller 8005, 205 is configured to store in a memory 8010, 210 the one of the plurality of spaced apart positions 8110*a*(*a*1-*f*2)-8110*d*(*a*1-*f*2) at which an article is deposited and one or more article characteristics comprising at least one of a folded article height and stack height after loading an article 7300 onto the plurality of tiered platforms.

Additionally or alternatively, the system 8000 is configured to measure article heights and stack heights with the one or more sensors 7964, 8210*a-b*, 8408*a-b*, 8430*a-b* after at least one of depositing the article on one of the plurality of tiered platforms 8105*a-d* and compressing the article with at least one of a plunger and the bottom surface 8486 (FIG. 29B) of the bi-directional conveyor 8400. Additionally or alternatively, in implementations, the at least one plunger (e.g., plunger 8350, 8350*a-b* of FIGS. 35A-B) can apply a low force to a stack 7301 of folded laundry articles 7300*a-n* to determine a stack height and can apply more force to estimate how many folded laundry articles could be compressed into a container 7800 of known volume for maximum filling. Additionally, the at least one controller 8005, 205 can set a height of a bi-directional conveyor 8400 for placing another folded laundry article on top of the stack 7301 of one or more folded laundry articles 7300, 7300*a-n*. Additionally or alternatively, in implementations, the at least one controller uses an average stack height detected by a one or more depth cameras 8210, 8210*a-b* (e.g., from a camera depth map) to estimate how many stacks will combine to fill a container 7800. Additionally or alternatively, in implementations, a bottom surface 8486 (e.g., a stiff plate) of the conveyor carriage 8450 comprises a force sensor configured to determine a stack height. Additionally or alternatively, the at least one controller 8005, 205 is configured to process motor power feedback to determine a stack height.

In implementations, the plurality of unbound folded laundry articles 7300 comprises household laundry belonging to a single household, and the folded laundry articles are packaged to return to the household from which they came. In implementations, the household laundry comprises two or more article types of at least one of different sizes and different shapes. In implementations, each of the two or more article types comprises a longest dimension of between about 4 cm to 500 cm.

The unbound folded laundry articles are not wrapped, sealed, restrained, or fastened in any way. The unbound folded laundry articles are folded by a folding robot 7000 and delivered to the packing system 8000 for autonomous sorting, collating, batching, queuing, and packing without being held in a folded state by any shrink wrapping, plastic ties wrapped around each one of the unbound folded laundry articles, or any other constraints. Eliminating such ties and wraps reduces waste and environmental damage caused by such waste and facilitates quickly unloading the folded container contents into a dresser drawer or closet.

The household laundry can comprise many types of bodily worn garments and cloth articles requiring washing (e.g., sheets, tablecloths, curtains, bath rugs). These garments and articles are deformable meaning they do not hold their shape. Because garments and other cloth articles are supple, they deform when manipulated. Different items of the plurality of laundry articles may have different thickness and stiffness values depending on the material and style of the item. For example, a woven bathmat will be stiffer than a silk blouse. The plurality of laundry articles 7300*a-n* in a single load of household laundry also can comprise many different laundry articles each having a different weight. Additionally, the size of each deformable article 7300 of the plurality of laundry articles 7300*a-n* can vary greatly within a single load of laundry, such that folding each deformable article 7300*a-n* requires maneuvers particular to each article as determined by at least one of article type (e.g., shirt, pants, sock, bathrobe, zippered top, hooded sweatshirt, blouse, button front shirt, sweater, baby clothes, coats, blankets, coats, curtains, bed sheets, and towels), article size, and article material thickness. Because of these variations, size of the area footprint 7302 (e.g., length×width=area (footprint)) occupied on the surface of one of the plurality of tiered platforms 8105*a-d* of each unbound folded article 7300 or stack 7301 of one or more folded laundry articles will vary.

Figure 7B:
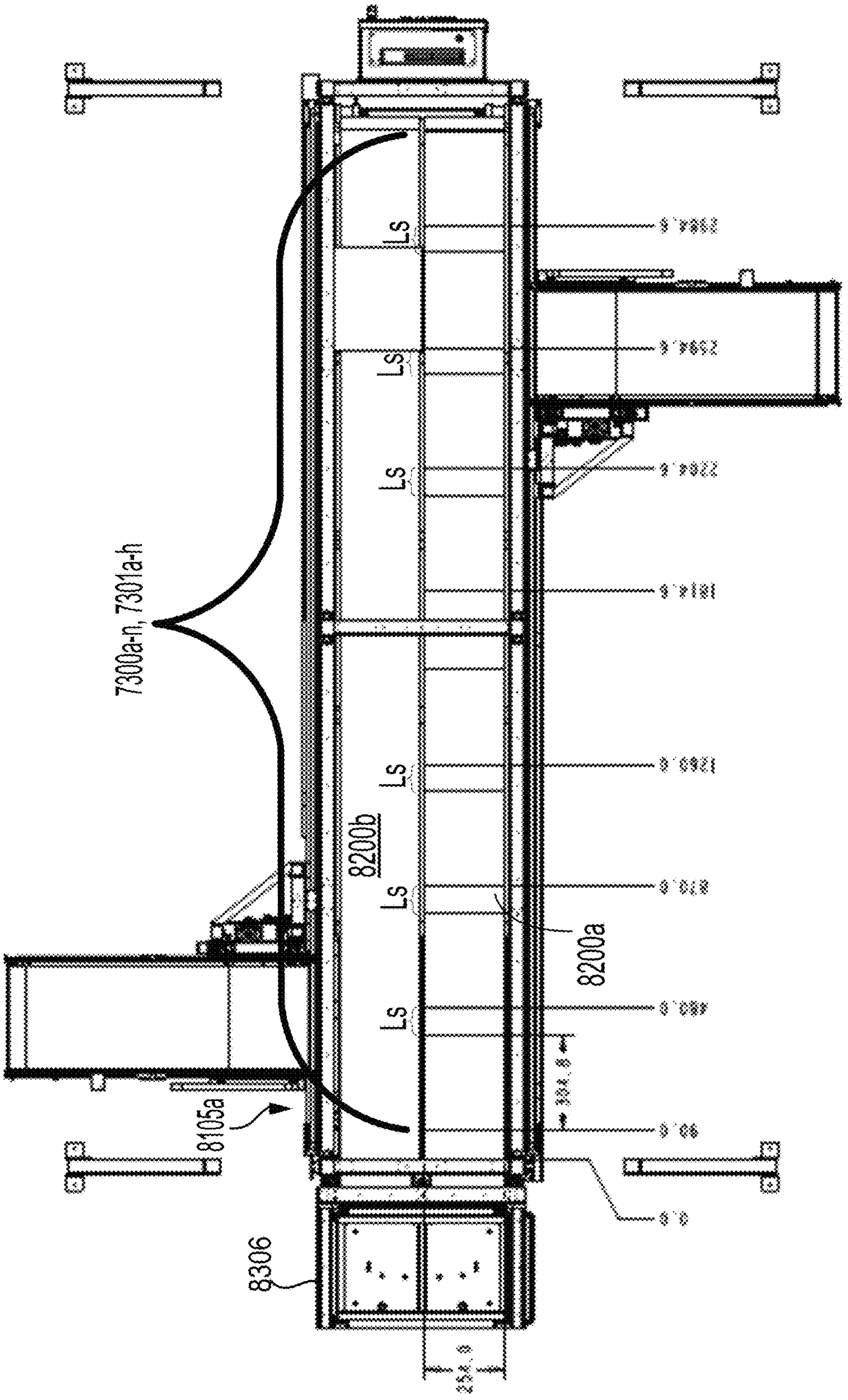
FIG. 7B depicts a top view of stacks of folded laundry article disposed on a placer conveyor of the example system of FIG. 5.
Figure 7C:
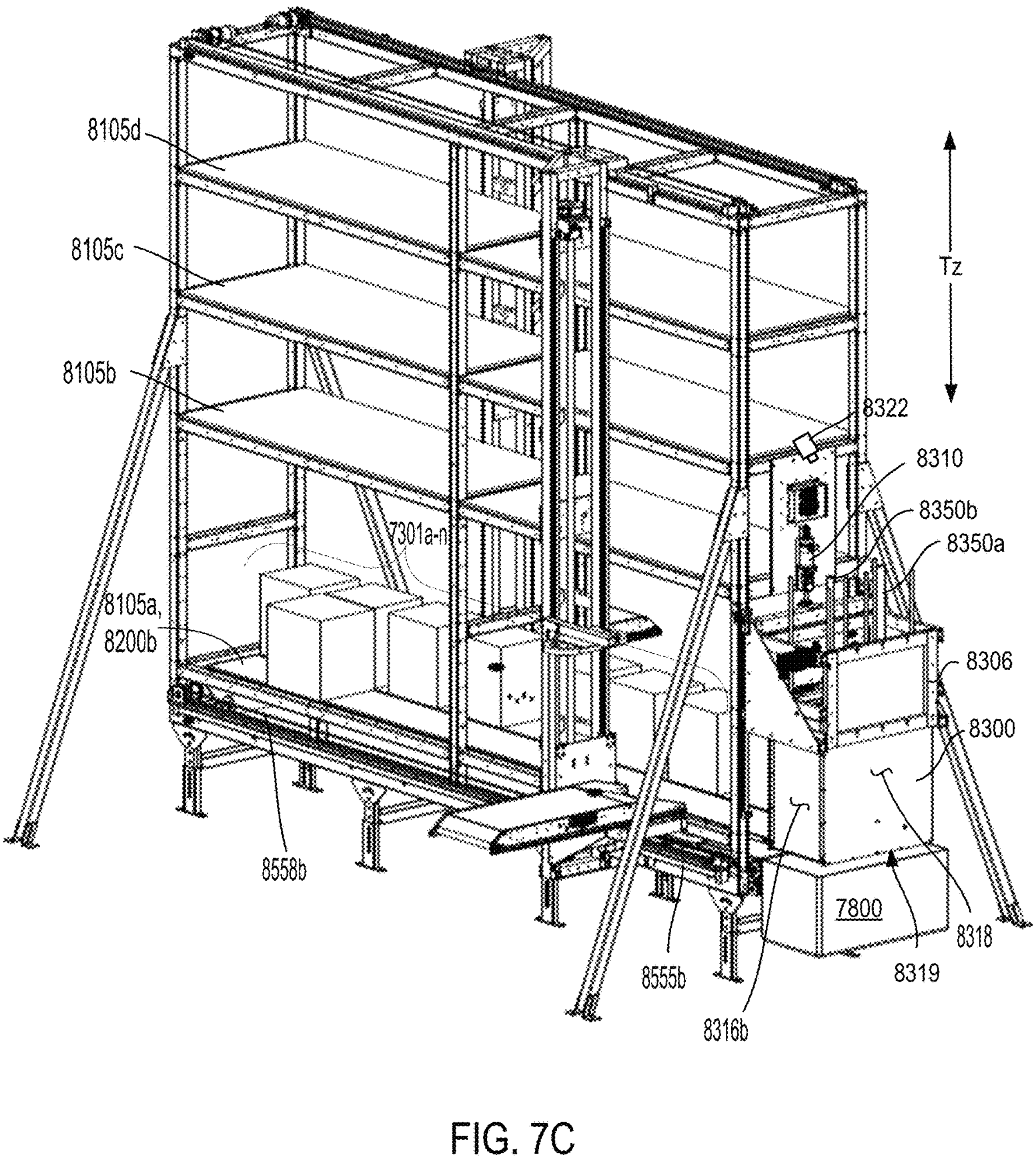
FIG. 7C depicts a perspective side view of stacks of folded laundry article disposed on a placer conveyor of the example system of FIG. 5 and an example refillable cartridge disposed on a plurality of tiered platforms in horizontal, vertical, and depth fixed alignment.

As shown at least in FIG. 7A-C, the system 8000 is configured to deposit each one of the plurality of folded laundry articles 7300*a-n* and layered stacks 7301, 7301*a-n* of folded laundry articles at the plurality of spaced apart positions 8110*a*(*a*1-*f*2)-8110*d*(*a*1-*f*2). The plurality of spaced apart positions 8110*a*(*a*1-*f*2)-8110*d*(*a*1-*f*2) are laterally spaced such that each one of the two or more bi-directional conveyors 8400 can cantilever above and across each of the plurality of tiered platforms 8105*a-d* while avoiding contacting one or more adjacent folded laundry articles 7300, 7300*a-n* or stacks 7301, 7301*a-n* of folded laundry articles. In implementations, the lateral spacing Ls between queued stacks 7301*a-n* is in a range of between about 10 to 150 mm. In implementations, the lateral spacing Ls between queued stacks 7301*a-n* is in a range of between about 60 to 100 mm. the lateral spacing Ls between queued stacks 7301*a-n* is in a range of between about 75-90 mm. In implementations, the lateral spacing is at least 10 mm.

Turning now to FIGS. 32A-34B, once folded laundry articles are stacked and ordered for packing, the at least one placer conveyor 8200, 8200*a-b* transits the folded laundry articles into at least one of a container 7800 and a refillable cartridge 8300 configured to load the container 7800. In implementations, the at least one placer conveyor 8200, 8200*a-b* comprises an extendable nose roller such as that described in U.S. Pat. No. 11,873,174, entitled, "AUTONOMOUS DEVICES, SYSTEMS, AND METHODS FOR QUEUING FOLDED LAUNDRY," herein incorporated by reference in its entirety. In implementations, the at least one placer conveyor 8200, 8200*a-b* comprises at least one support beam 8212*a-b* configured to support a conveyor belt 8207, 8207*a-b* thereon as the extendable nose roller 8205, 8205*a-b* extends. The at least one support beam 8212*a-b* maintains a level surface during extension of the at least one placer conveyor 8200, 8200*a-b* and prevents the conveyor belt 8207, 8207*a-b* from sagging and folded laundry articles thereon from toppling and/or jostling to an unfolded state. In implementations, the support beams 8212*a-b* are disposed within interfacing low-friction slots 8211*a-f* in an extendable noseroller carriage 8240, 8240*a-b* that allow the noseroller carriage to move back and forth in relation to the stationary support beams 8212*a-b* beams. In implementations, the low-friction slots comprise comprised of at least one of DELRIN and ultra-high-molecular-weight polyethylene (UHMW). The support beams 8212*a-b* are bolted in place at one end 8209 to a stationary support structure of the at least one placer conveyor 8200, 8200*a-b* and are supported vertically at the other end by the slots in the noseroller carriage 8240, 8240*a-b*. As the noseroller carriage 8240, 8240*a-b* extends, the support beams 8212*a-b* stay in place in the growing gap between the noseroller carriage and the structure, supporting the otherwise unsupported span of conveyor belt between the two.

Figure 10:
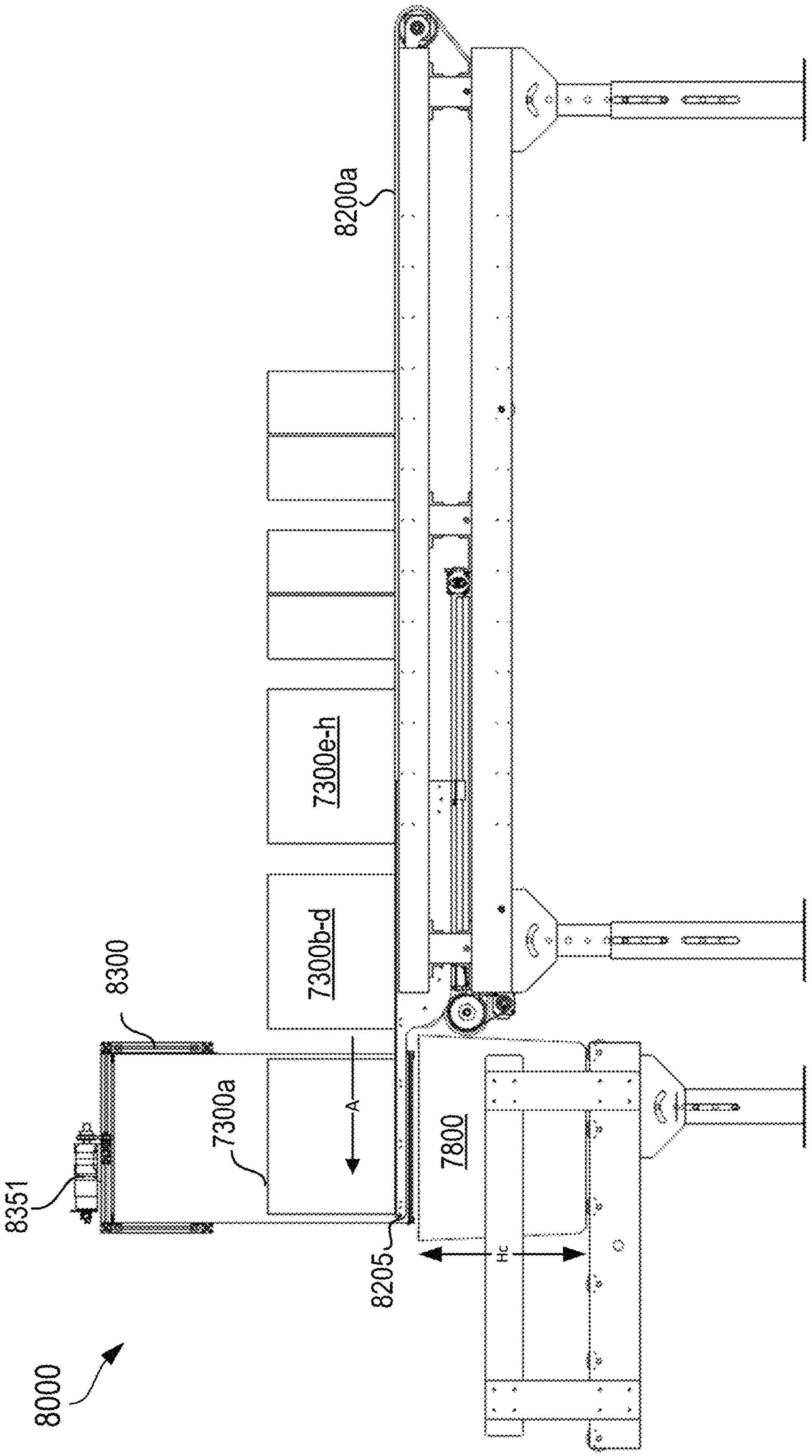
FIG. 10 depicts a side view of a placer conveyor comprising an extendable nose end in an extended position during loading of a folded laundry article or stack of folded laundry articles into a refillable cartridge.
Figure 11:
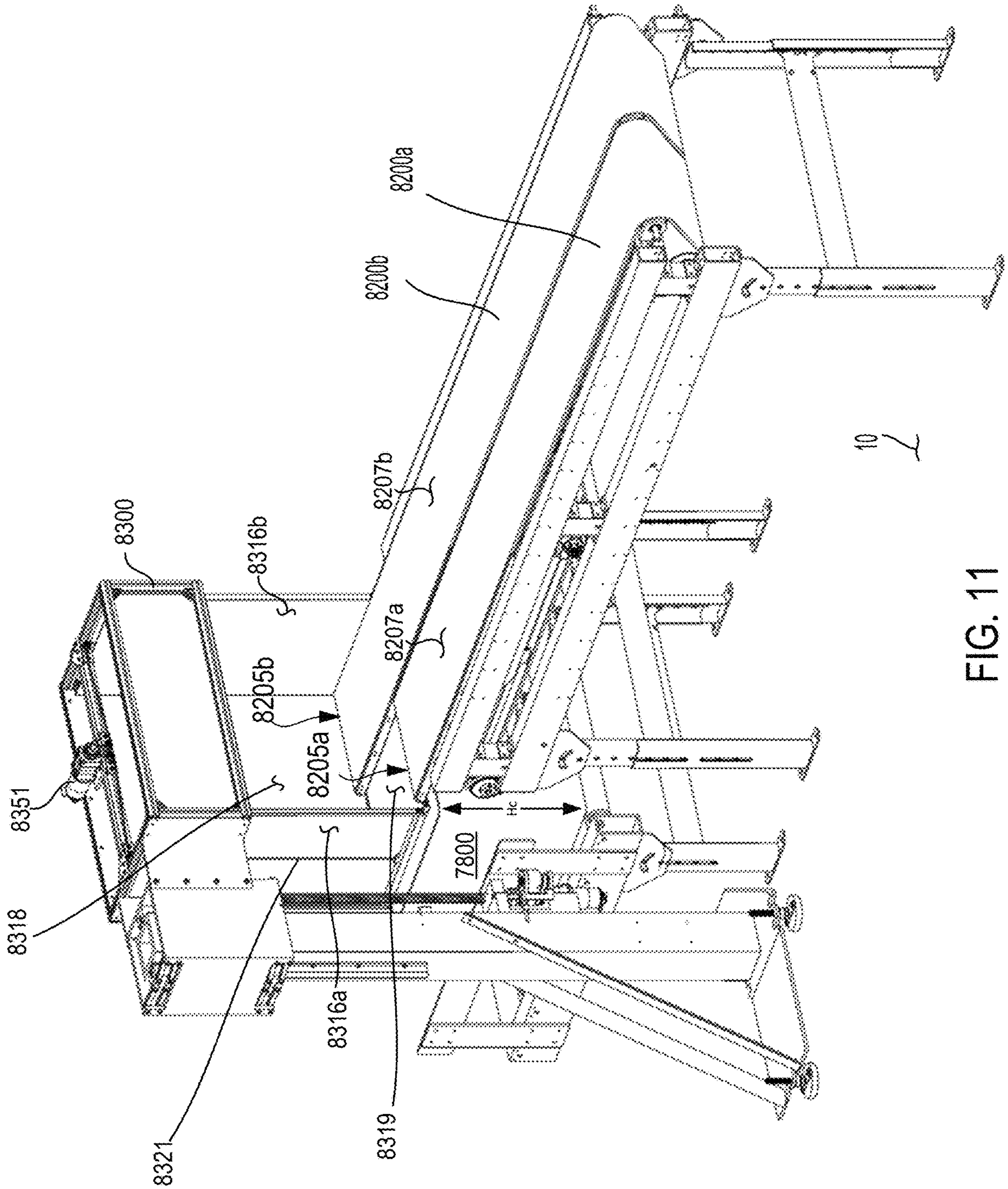
FIG. 11 depicts a schematic perspective view of the placer conveyor of FIG. 10 including a refillable cartridge disposed on an example motorized lifter and two side by side pacer conveyors with minimal or no spacing between them, with one conveyor extended.

In implementations, the at least one placer conveyor 8200, 8200*a-b* comprises at least two side by side placer conveyors 8200*a-b* configured to at least one of extend independently and extend simultaneously to load either or both sides of at least one of a container 7800 and a refillable cartridge 8300 as shown in FIGS. 10-11. Alternatively, in implementations, the at least one placer conveyor 8200 comprise a single conveyor wide enough to support one or more columns of a plurality of spaced apart positions configured to received folded laundry articles along the length L of the placer conveyor. In implementations the refillable cartridge spans a combined width of the at least two side by side placer conveyors. In implementations, the at least one placer conveyor 8200 comprises at least an end portion of a lowest one of the plurality of tiered platforms 8105*a-d*.

Figure 38A:
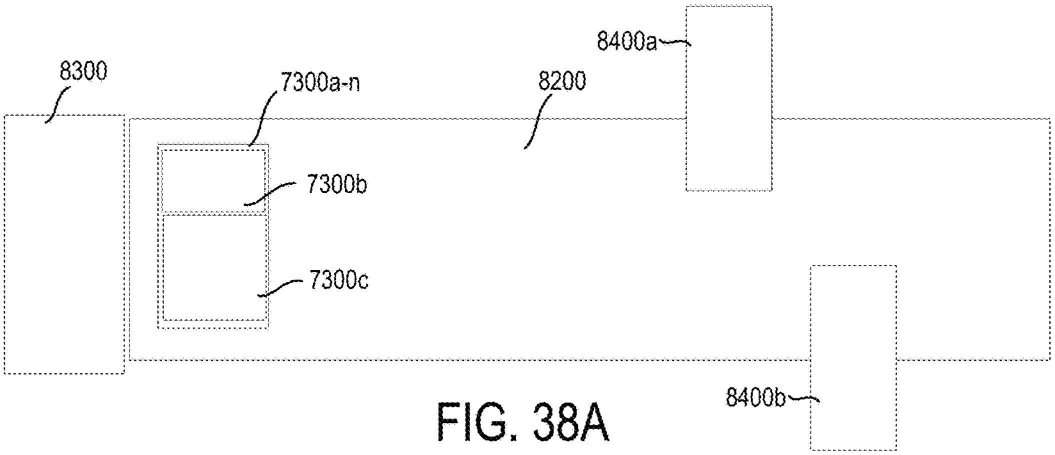
FIG. 38A depicts a schematic top-down view of an example of stacked folded laundry articles on a placer conveyor.
Figure 38B:
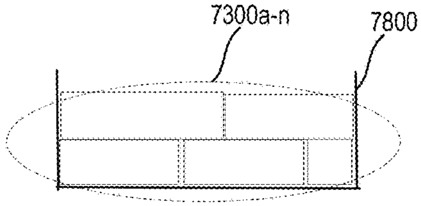
FIG. 38B depicts a schematic cross section view of folded laundry articles of a plurality of sizes intelligently sorted and stacked for maximally filling a container without empty space.
Figure 38C:
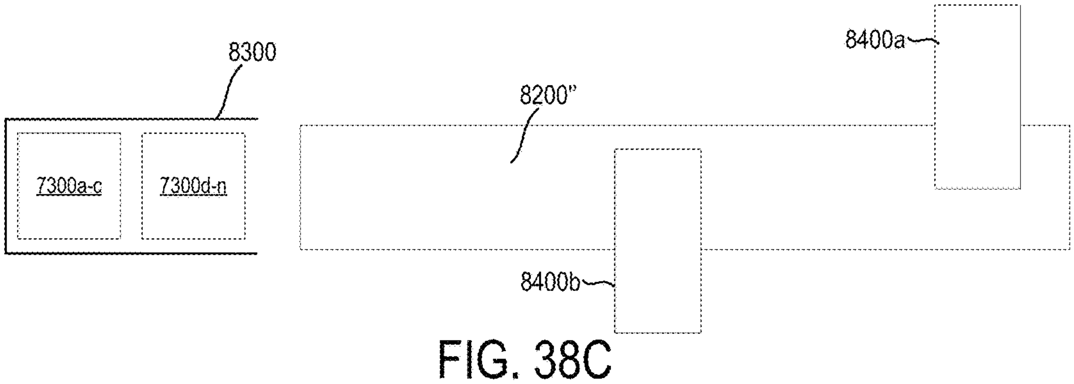
FIG. 38C depicts a schematic top-down view of an example placer conveyor for loading folded laundry articles single file into an end of a rectangular container.
Figure 38D:
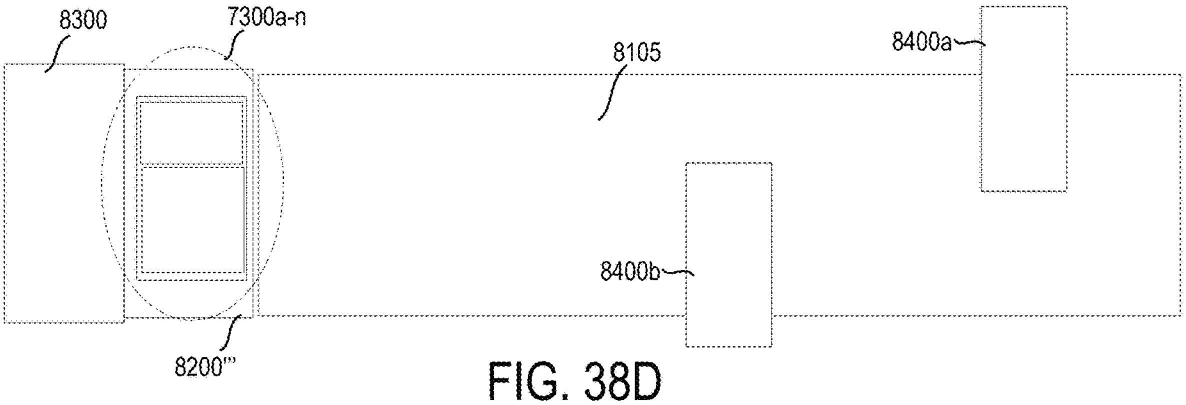
FIG. 38D depicts a schematic top-down view of an example singled queue location placer conveyor for loading an entire container's worth of folded laundry articles into a container.

Alternatively, in implementations as shown in FIG. 38D, the plurality of tiered platforms 8105*a-d* comprise stationary platforms and a single queue-location placer conveyor 8200''' is at least one of adjacent to the plurality of tiered platforms 8105*a-d* and disposed end to end with a lowest one of the plurality of tiered stationary platforms. The single queue location placer conveyor 8200''' comprises only an extend nose with a long surface for queuing multiple stacks of folded laundry articles. The two or more bi-directional conveyors 8400*a-b* are configured to stack folded laundry articles on the single queue location placer conveyor 8200''' directly for packing into the refillable cartridge 8300. In implementations, the multiple stacks queued on the single queue location placer conveyor 8200''' can comprise a single container's 7800 worth of folded laundry articles fully stacked and arranged for loading in their entirety into at least one of the container and a refillable cartridge 8300 as opposed to being loaded incrementally. Additionally or alternatively, in implementations, the multiple stacks queued on the single queue location placer conveyor 8200''' comprises several fully-assembled container's 7800*a-n* stacks 7301*a-n* for a single customer. This alternate single queue location placer conveyor configuration enables additional buffer space and potentially more closely layered platforms for laying out an entire customer load of folded laundry articles prior to combining in stacks in an order for placing in at least one of a refillable cartridge 8300 and a packing container 7800.

Tuning now to FIGS. 7C and 9-11 and 33A-34B, in implementations, the system further comprises a refillable cartridge 8300 configured to movably engage vertical rails 8320*a-b* affixed to the plurality of tiered platforms 8105*a-d* for ensuring vertical, horizontal, and depth alignment with the extendable at least one placer conveyor 8200 (e.g., in implementations, a pair of side-by side placer conveyors 8200*a-b*). In implementations, the refillable cartridge 8300 comprises one such as that described in U.S. Pat. No. 11,873,174, previously incorporated herein in its entirety.

In implementations a refillable cartridge 8300 is configured to receive automatically at least one unbound folded laundry article 7300*a-n* or one or more stacks of folded laundry articles for transfer into a container 7800. In implementations, a stack can comprise one or more laundry articles 7300*a-n* stacked vertically atop one another. In implementations, the refillable cartridge 8300 comprises a pair of opposing sidewalls 8316*a-b* and a back wall 8318 spanning between the pair of opposing sidewalls. In implementations, the pair of opposing sidewalls and the back wall are rigid so that the folded laundry received by the refillable cartridge 8300 is provided with support to keep from toppling and/or unfolding during loading into the refillable cartridge 8300 and from the refillable cartridge 8300 into the container 7800. The refillable cartridge 8300 comprises an opening opposite the back wall. The opening is configured to receive the at least one unbound folded laundry article 7300 or stack of folded laundry articles therethrough. The at least one unbound folded laundry article 7300 or stack of folded laundry articles comprises one or more folded laundry articles that are not wrapped, sealed, restrained, or fastened in any way.

In addition to comprising two opposing sidewalls 8116*a-b* and the back wall 8318, in implementations, the refillable cartridge 8300 further comprises a removable receiving surface 8319 (FIG. 11) configured to span, in a closed position, between a bottom edge of each one of the pair of opposing sidewalls and the back wall. The removable receiving surface is configured to receive thereon the at least one folded laundry article 7300*a-n* or at least one stack 7301, 7301*a-n* of folded laundry articles in a closed position in which the receiving surface extends across the bottom opening of the refillable cartridge 8300 to create a selectively sealed floor. The removable receiving surface moves from the closed position to an open position in which the bottom opening of the refillable cartridge 8300 is exposed so that the received at least one folded laundry article 7300, 7300*a-n* or stack at least one stack 7301, 7301*a-n* slides or falls through the opening into a receiving container 7800 disposed therebeneath. Returning to FIG. 18, the refillable cartridge 8300 further comprises at least one drive 8335 in communication with the at least one controller 8005, 205 for instructing a drive motor to move the removable receiving surface from the closed position to an open position. In implementations, the receiving surface is configured to slide upward along the one or more sidewalls 8316*a-b*. Alternatively, in implementations, the removable receiving surface is configured to slide upward along the back wall 8318. In implementations, the receiving surface can be pulled to the open position by one or more motor driven guidewires 8321 and a timing belt. Alternatively, in implementations, the removable receiving surface can be spring loaded to retract and spool about itself like a spooling window shade. Alternatively, in implementations, the removable receiving surface comprises a hinged one-part or two-part trap door for dropping stacks of one or more folded laundry articles into a container 7800 therebelow. Alternatively, in implementations, the removable receiving surface comprises a two-part surface and each part is configured to independently retract in opposite directions up their respective adjacent sidewall.

In implementations, a height Hc of the container 7800 receiving the folded laundry articles for return to a customer comprises a range of between about 30 to 75 cm. In implementations, a threshold fill height of the refillable cartridge 8300 is equal to or less than the height Hc of the container 7800 such that by not exceeding the threshold height with received one or more stacks 7301, 7301*a-n* of one or more unbound folded laundry articles 7300*a-n*, the one or more unbound folded laundry articles 7300 delivered by the refillable cartridge 8300 to the container 7800 will not overflow the container 7800. Additionally or alternatively, a stack 7301 can exceed the height Hc of the container by a small amount (e.g., approximately 10 cm) if the stack is compressible, as is the case with most deformable laundry articles 7300.

Additionally or alternatively, in implementations, a load cell mounted on at least one plunger 8350, 8350*a-b* configured to compress folded laundry articles within the refillable cartridge 8300 detects when a plunger has reached a threshold compression force indicative of the loaded folded laundry articles being compressed. In implementations, the at least one plunger 8350, 8350*a-b* comprises a motor for lowering and raising the plunger and an absolute position sensor (e.g., a motor encoder) outputs a signal indicative of the height of the loaded one or more folded laundry articles. In implementations, the position sensor can be a magnetic encoder disposed on the drive motor. Alternatively, in implementations, the at least one plunger 8350, 8350*a-b* comprises a piston for lowering and raising the plunger and a sensor disposed on or adjacent to the piston can provide a signal indicative of the height of the loaded one or more folded laundry articles. In implementations, the at least one controller 8005, 205 is configured to at least one of actuate the piston to release air to let the plunger 8350 fall to the top surface of the folded laundry articles (plus a tolerance for springback after contacting a stack 7301) and actuate the piston downward at a pre-set compression force. Based on an output of an adjacent sensor, the at least one controller 8005, 205 is configured to determine a height of the plunger.

Figure 35A:
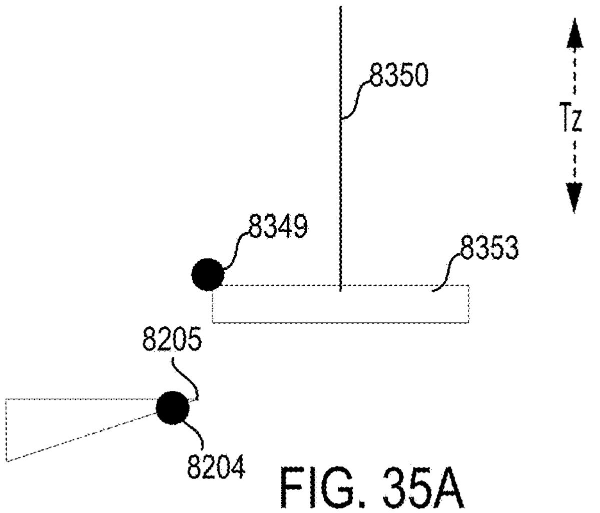
FIG. 35A depicts an example plunger comprising a sensor configured to determine whether folded laundry articles are compressed below a maximum packing height.
Figure 35B:
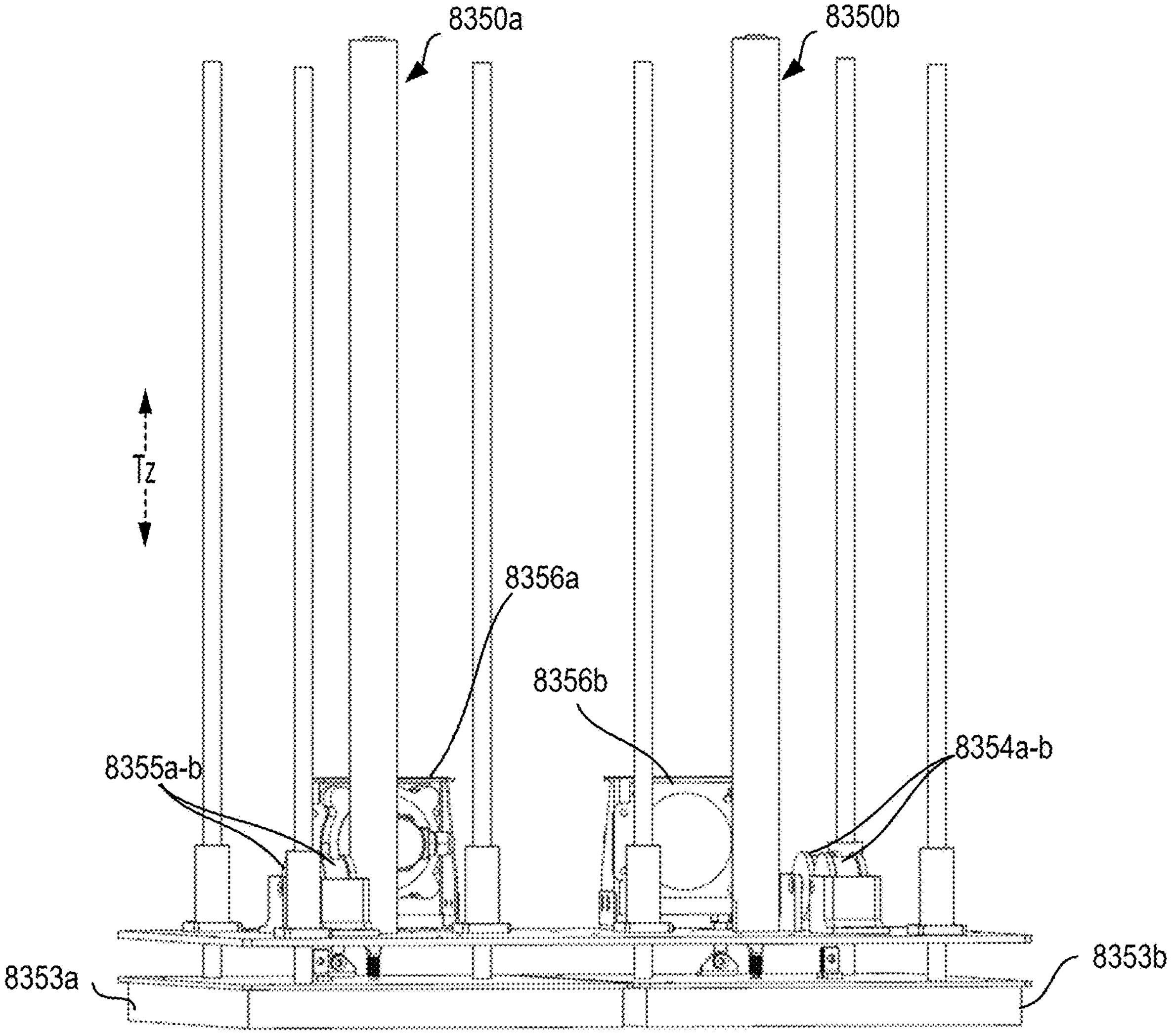
FIG. 35B depicts a pair of example plungers comprising mounted springs for offsetting the weight of the plungers and string pot sensors for detecting the height of the plungers and therefore detect heights of stacks of folded laundry articles.

In implementations as depicted in FIG. 35A, at least one of a surface (e.g. a top surface) of a plate 8353 of a plunger 8350 and a nose 8205 of the at least one placer conveyor 8200 comprises an IR sensor 8204 while the other comprises an IR LED 8349. For example, the plunger 8350 can comprise an IR LED 8349 and the nose 8205 can comprise an IR sensor 8204 such that when the plunger is lowered past the nose, the IR LED 8349 is detected, and the at least one controller 8005, 205 can determine based on the detection signal that the height of loaded articles remains below the loading height of the extendable nose 8205. In implementations, the IR sensor 8204 is at least one of disposed on the nose 8205 and disposed at a fixed position adjacent to the nose 8205. In implementations, the at least one controller 8005, 205 is configured to exhaust air from a piston of the plunger 8350, 8350*a-b* so the plunger plate 8353, 8353*a-b* rests on a top surface of the stack or stacks of folded laundry articles. As depicted in FIG. 35B, one or more constant-force springs 8354, 8354*a-b*, 8355, 8355*a-b* fixedly mounted to a top surface of the plate 8353 offset the weight of the plunger or plungers 8350, 8350*a-b*. With at least one plunger 8350, 8350*a-b* resting on one or more stacks 7301 of folded laundry articles disposed in the refillable cartridge 8300, the at least one controller 8005, 205 is configured to instruct the refillable cartridge 8300 to lower until the IR sensor 8204 detects the LED 8349. The output signal confirming the detection of the passing LED 8340 indicates that a height of the one or more stacks 7301 of folded laundry articles 7300*a-n* is below the placer nose 8205. The one or more controllers 8005, 205 is configured to determine the height of the one or more stacks (e.g. the height of the LED 8349) based on the vertical (Tz-axis) position of the refillable cartridge 8300 at the LED sensor 8340 detection point.

Additionally or alternatively, the system 8000 comprises a time of flight sensor configured to detect a position of the top surface of the plunger plate 8353 and output a signal for the at least one controller 8005, 205 to determine how far down it has traveled. Additionally or alternatively, the at least one plunger 8350, 8350*a-b* comprises at least one string pot sensor 8356, 8356*a-b* (FIG. 35B) or other distance sensor configured to output a signal to the at least one controller 8005, 205 to determine how far down the plate 8353, 8353*a-b* has traveled to reach the top of a folded laundry article 7300 or stack 7301 of folded laundry articles within the refillable cartridge 8300. Additionally or alternatively, the system 8000 comprises a depth camera positioned above the refillable cartridge 8300 configured to detect one or more stack heights therein.

Additionally or alternatively, in implementations, the rigid back wall 8318 of the refillable cartridge 8300 comprises graduated markings indicating a fill depth, and one or more cameras disposed adjacent to the refillable cartridge (e.g., on the framing for the plurality of platforms 8105*a-d*) comprises a field of view aimed at the graduated markings. The one or more cameras are configured to output a signal to the at least one controller 8005, 205 indicative of one or more fill heights of the refillable cartridge. The at least one controller is configured to determine the fill height or heights and whether to at least one of compress the folded laundry articles and instruct the at least one placer conveyor 8200, 8200*a-b* to load one or more additional folded laundry articles or stacks of folded laundry articles into the remaining volume within the refillable cartridge 8300, with or without additional compression.

As described previously with regard to FIGS. 32A-B, the at least one placer conveyor 8200, 8200*a-b* comprises an extendable and retractable nose 8205, 8205*a-b*. The extendable and retractable nose 8205, 8205*a-b* is configured to carry and convey the at least one unbound folded laundry article 7300 or stack of unbound folded laundry articles into the refillable cartridge 8300. In implementations, the at least one controller 8005, 250 is configured to extend the at least one extendable and retractable nose 8205, 8205*a-b* to a back wall 8318 of the refillable cartridge and instruct a drive motor of the refillable cartridge to raise the refillable cartridge until the folded laundry articles therein contact a bottom surface of the at least one extendable and retractable nose 8205, 8205*a-b*. The at least one controller 8005, 205 is configured to detect contact based on at least one of a change in motor feedback and a sensor signal output from a contact sensor disposed on the bottom (e.g., underside) surface of the at least one extendable and retractable nose 8205, 8205*a-b*. In implementations, at least one controller 8005, 205 is configured to drive the refillable cartridge 8300 upward to compress the folded laundry articles therein against the underside(s) of the at least one extendable and retractable nose 8205, 8205*a-b*. Based on the distance traveled by the refillable cartridge and a known starting height of the receiving surface 8319 (FIG. 11) of the refillable cartridge 8300, the at least one controller 8005, 205 is configured to calculate one or more heights of (optionally compressed) folded laundry articles therein and how much volume remains to reach a threshold fill height of the refillable cartridge 8300. This enables the at least one controller 8005, 205 to determine how many additional folded laundry articles the refillable cartridge 8300, and therefore the container 7800, can accommodate.

As depicted in FIGS. 10-11, in implementations, the at least one placer conveyor 8200 comprises two parallel placer conveyors 8200*a-b*. Each one of the two parallel placer conveyors 8200*a-b* is configured to extend its associated nose 8205, 8205*a-b* out to the rigid back wall 8318 of the refillable cartridge 8300, and rotate the associated conveyor belt 8207*a-b* to advance the at least one of the at least one unbound folded laundry article 7300*a* and/or one or more stacks of folded laundry articles toward the rigid back wall 8318. The conveyor belt does not need to circulate to deposit the at least one article 7300 or stack 7301. In implementations, each one of the two parallel pacer conveyors 8200*a-b* comprises a position sensor 8230 comprising at least one of a hall sensor, a drive encoder, and a limit switch that detects the nose 8205, 8205*a-b* reaching the back wall 8318 of the refillable cartridge 8300. In implementations, the position sensor 8230 outputs a signal to a nose extend drive 8232 via a sensor interface in communication with the nose drive. Additionally or alternatively, the one or more drives 8232, 8232*a-b* and position sensors 8230, 8230*a-b* of the two parallel placer conveyors 8200*a-b* are in communication with the at least one controller 8005, 205 via a network interface in wired or wireless communication with the communication network 230. Additionally, the one or more placer conveyors 8200, 8200*a-b* are sized and their positions calibrated relative to the refillable cartridge 8300 such that the extendable and retractable nose 8205, 8205*a-b* reaches a position adjacent the back wall 8318 at full extension. Alternatively, in implementations as previously described, the two parallel placer conveyers 8200*a-b* can be replaced with a single conveyor 8200 functionally operating as described with regard to the two parallel placer conveyors 8200*a-b*.

Figure 9:
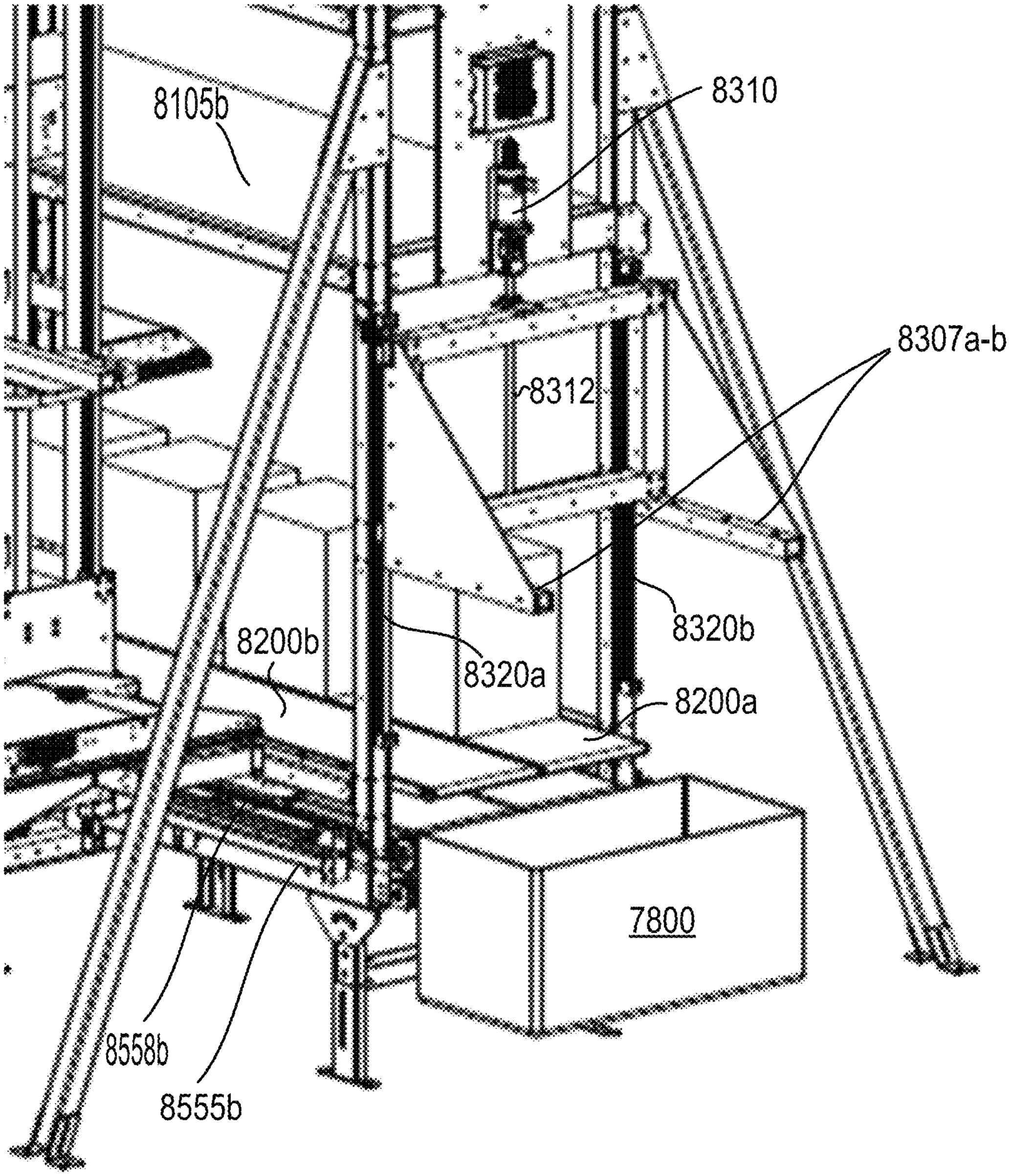
FIG. 9 depicts a portion of the example refillable cartridge disposed on a plurality of tiered platforms of FIG. 7C.

Turning now to FIGS. 7C and 9, in implementations the spacing between the one or more placer conveyors 8200, 8200*a-b* and the refillable cartridge 8300 is fixed by mounting the refillable cartridge to the vertical rails 8320*a-b* disposed on the plurality of tiered platforms. The refillable cartridge 8300 comprises a motor 8310 configured to raise and lower the refillable cartridge 8300 along the vertical rails to align a receiving surface with a height of the one or more placer conveyors 8200, 8200*a-b*. The motor 8310 is configured to raise and lower the refillable cartridge 8300 to at least one of one or more loading positions for receiving at least one unbound folded laundry article or stack of folded laundry articles and an unloading position (FIGS. 33A-B) within the container 7800. The various lift positions can be dynamically determined and/or predetermined, and the motor 8310 can comprise at least one of a position encoder 8515 (e.g., an incremental encoder on the back of the motor that determines incremental position from a limit switch), one or more hard stops, and a height sensor in communication with a processor 8305 and a sensor interface 8362 (FIG. 18). In implementations, the motor 8310 comprises an incremental encoder and at least one of a limit switch and hall sensor for homing (e.g., to determine an absolute position) the travel of the refillable cartridge in the vertical (e.g., Tz.) direction. Additionally, in implementations, the refillable cartridge 8300 comprises a network interface 8365 in at least one of wired and wireless communication with the communication network 230 for receiving operating instructions from the at least one controller 8005, 205 and sending sensors signals to the at least one controller for determining a vertical position (e.g., a position along the Tz direction of travel) of the refillable cartridge.

Taking FIGS. 7C and 9 together, in implementations, the refillable cartridge 8300 comprises an upper frame 8306 (e.g., an upper structural portion of the refillable cartridge 8300) configured to mount on horizontal arms 8307*a-b* for secure and effective alignment of the refillable cartridge to the at least one placer conveyor 8200, 8200*a-b*. Mounting features the between the upper frame 8306 and horizontal arms 8307*a-b* include a tolerance to allow for positioning side-to-side and front-to-back. The upper frame 8306 and horizontal arms 8307*a-b* are configured to be affixed to one another once aligned. In implementations, the arms 8307*a-b* are configured to slidably engage the vertical rails 8320*a-b*. In implementations, the refillable cartridge 8300 can be affixed to the upper frame 8306 by fasteners and the upper frame 8306 can be affixed to the horizontal arms 8307*a-b* by at least one of bolts, screws, rivets, other mechanical fasters, and welds. In implementations, the horizontal arms 8307*a-b* are driven to raise and lower in the vertical direction (e.g., Tz direction) by a ball screw 8312 in operative engagement with a motor 8310. In implementations, the one or more vertical rails 8320*a-b* (e.g., SBR rails) comprise one or more hard stops limiting a bottom end of the vertical travel of the refillable cartridge 8300 and a hard stop at the top end of the vertical travel so that the nut remains engaged with the ball screw and linear bearings of the horizontal arms 8307*a-b* remain engaged with the rails. Additionally, in implementations, the motor 8310 comprises a brake to prevent the refillable cartridge 8300 from dropping in an event of power loss.

The horizontal arms 8307*a-b* is configured to raise and lower the refillable cartridge 8300 such that at least one of the removable receiving surface 8319 (FIGS. 7C and 33A-34B) and a top surface of an unbound folded laundry article 7300 received within the refillable cartridge 8300 is positioned below a bottom surface of the at least one placer conveyor 8200 prior to loading an unbound folded article into the refillable cartridge 8300. In implementations, the at least one of the receiving surface 8319 and the top surface of the unbound folded laundry article 7300 received within the refillable cartridge 8300 is configured to be positioned below a bottom surface (e.g., a plate) of the at least one placer conveyor 8200 by a distance in a range of between about 0.25 mm to 100 mm prior to loading.

In implementations, the refillable cartridge 8300 is configured to be lowered between one or more selectable loading heights and lowered to a preset unloading height within the container 7800. In implementations, at least one of the controller 8005, 205 is further in operable communication with the motor 8310 and configured to raise and lower the refillable cartridge 8300 between the one or more selectable loading heights and the preset unloading height. In implementations, the at least one placer conveyor 8200 is fixed at a predetermined height, and the motor 8310 further comprises one or more position sensors 8360 (FIG. 18) configured to sense at least one of a height of the refillable cartridge 8300 and a distance traveled along the vertical rails 8320*a-b*. In implementations, the one or more position sensors 8360 comprises a rotary encoder disposed on the motor 8310, the rotary encoder in conjunction with a homing limit switch or Hall sensor being configured to output a signal to the at least one controller 8005, 205 indicative of an absolute of position of the removable receiving surface 8319. Additionally or alternatively, the one or more position sensors comprises a depth sensor configured to detect a change in height of the refillable cartridge 8300 relative to a known height at fixed position.

In implementations, the motor 8310 is configured to lower the refillable cartridge 8300 to align the lowest top surface within the refillable cartridge 8300 with the at least one placer conveyor 8200 to receive the next folded laundry article 7300 or stack 7301 of laundry articles on the lowest top surface. For example, in implementations, the at least one controller 8005, 205 is configured to receive an output signal from the one or more position sensors 8360 (e.g., a height sensor) and a sensed signal of at least one sensor 8322 (FIG. 8) in wired or wireless communication with the at least one controller 8005, 205, the sensed signal being indicative of a height of the at least one unbound folded laundry article 7300 or stack 7301 of folded laundry articles received within the refillable cartridge 8300.

Additionally or alternatively, in implementations, the system 8000 comprises a break-beam sensor in communication with the at least one controller 8005, 205 for indicating when a lowering stack is no longer sensed such that a top surface of one or more articles or stacks of articles disposed within the refillable cartridge 8300 is detected. For example, a break-beam sensor can be positioned horizontally to detect the presence of one or more stacks of folded laundry articles disposed in the refillable cartridge 8300. As the refillable cartridge lowers, the break beam sensor will detect when at least one of two halves of the refillable cartridge has no detectable folded laundry articles at a detected height and therefore identify a location for placing one or more additional folded laundry articles within the refillable cartridge 8300.

In implementations, the at least one sensor 8322 configured to detect a height of the at least one unbound article received within the refillable cartridge 8300 is at least one of a break beam, a 3-D camera, an IR sensor, a 2-D camera, LIDAR, LADAR, a sonar proximity sensor, an ultrasonic ranging sensor, a radar sensor, and a pair of stereo depth cameras. In implementations, the at least one sensor can be configured to output 3-D image data to the at least one controller 8005, 205. Additionally or alternatively, in implementations, the at least one sensor 8322 can be configured to output one or more 2-D images to the at least one controller 8005, 205. In implementations the one or more sensors comprises a REALSENSE camera, positioned above the refillable cartridge 8300.

Based on the sensed one or more detected heights of the at least one unbound folded article 7300 or stacks of folded laundry articles received within the refillable cartridge 8300 relative to the height of the removable receiving surface 8319, the at least one controller 8005, 205 is configured to determine whether the height of the at least one unbound folded laundry article 7300 or stacks of articles reaches the threshold height for filling a container 7800. In implementations, the threshold height can be a range of heights slightly shorter than a maximum threshold height such that no additional folded laundry article could be received without exceeding the maximum threshold. Returning now to FIGS. 33A-34B, an alternate implementation of movably mounting the refillable cartridge 8300 is shown, but the functionality of the refillable cartridge as described herein is applicable to all implementations including those of FIGS. 7C and 9. In implementations, the threshold filling height Hrc (FIGS. 33A-B) of the refillable cartridge 8300 is equal to or less than the height Hc of the container 7800 such that by not exceeding the threshold height Hc with a received one or more unbound folded laundry articles 7300, the one or more unbound folded laundry articles 7300 delivered by the refillable cartridge to the container 7800 will not overflow the container 7800. Additionally or alternatively, as described previously with regard to implementations, the threshold height Hrc can exceed the height Hc of the container by a small amount (e.g., approximately 10 cm) if the a stack 7301 of folded laundry articles is compressible to within the height Hc of the container. Additionally or alternatively, as described previously with regard to implementations, one container's-worth of folded laundry articles can be queued at a single time in a particular order for loading such that the one or more folded laundry articles are stacked intelligently and loaded into the refillable cartridge 8300 and the container 7800 according to at least one of article type, size, and folded article orientation. In implementations, a full container's worth of folded articles can be pre-queued on the at least one placer conveyor 8200, 8200*a*-*b* and then queued in stacks before being loaded into the refillable cartridge 8300. In implementations, the at least one placer conveyor 8200, 8200*a*-*b* can keep loading the refillable cartridge 8300 until the queued stacks are all loaded because they are already determined to fit within the target volume of the container 7800.

Alternatively, in implementations, the at least one controller 8005, 205 is configured to determine an unoccupied height between the threshold height Hrc of the refillable cartridge and at least one of the removable receiving surface 8319 and a top surface of an unbound folded laundry article 7300 received within the refillable cartridge 8300. Based on the determination of the unoccupied height, the at least one controller 8005, 205 is configured to at least one of: instruct the drive motor 8310 to lower the refillable cartridge 8300 until the output signal from the one or more position sensors is indicative of a lowest top surface of the at least one unbound article being below a bottom surface of at least one loading end of the at least one placer conveyor 8200, 8200*a*-*b*, and instruct the drive motor 8310 to lower the refillable cartridge 8300 until the output signal from the one or more position sensors 8322 is indicative of the refillable cartridge 8300 being positioned at the unloading height within the container 7800.

Figure 33B:
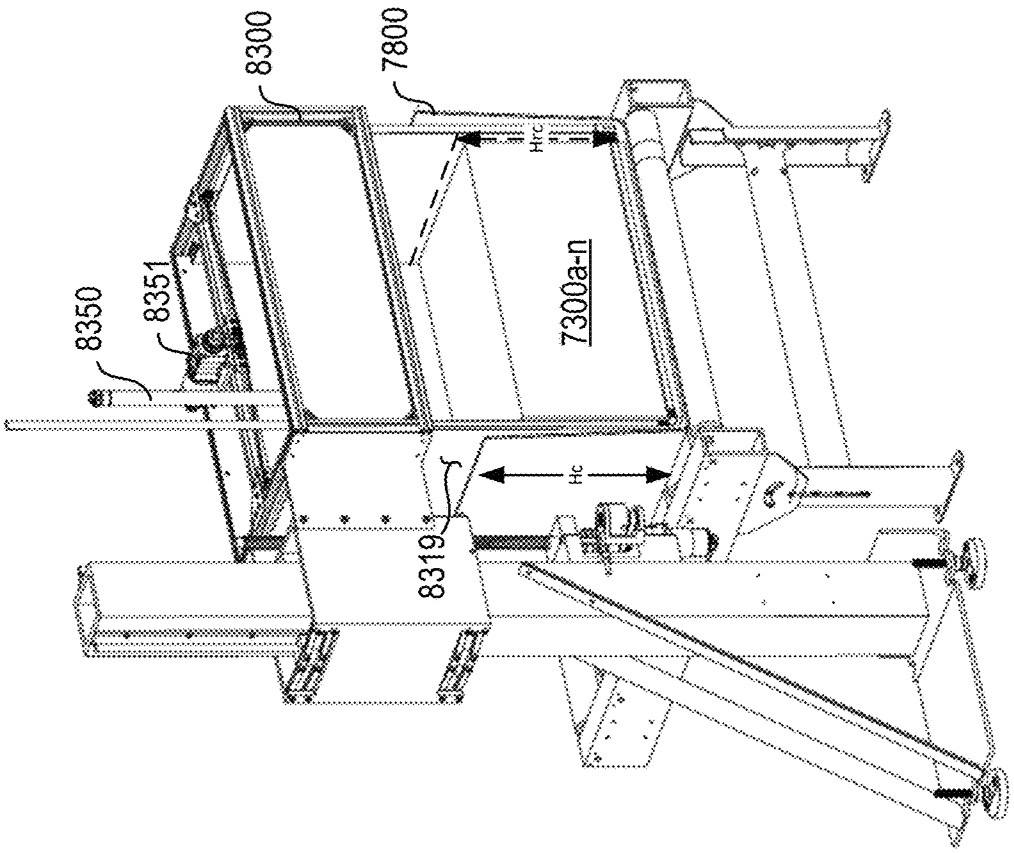
FIG. 33B depicts the view of 33A with the refillable cartridge fully lowered within a container for delivering fold laundry thereto with the receiving surface removed (e.g., retracted up the movable support side of the refillable cartridge) and with the container front wall cross sectioned to show the cartridge deposited therein.
Figure 33A:
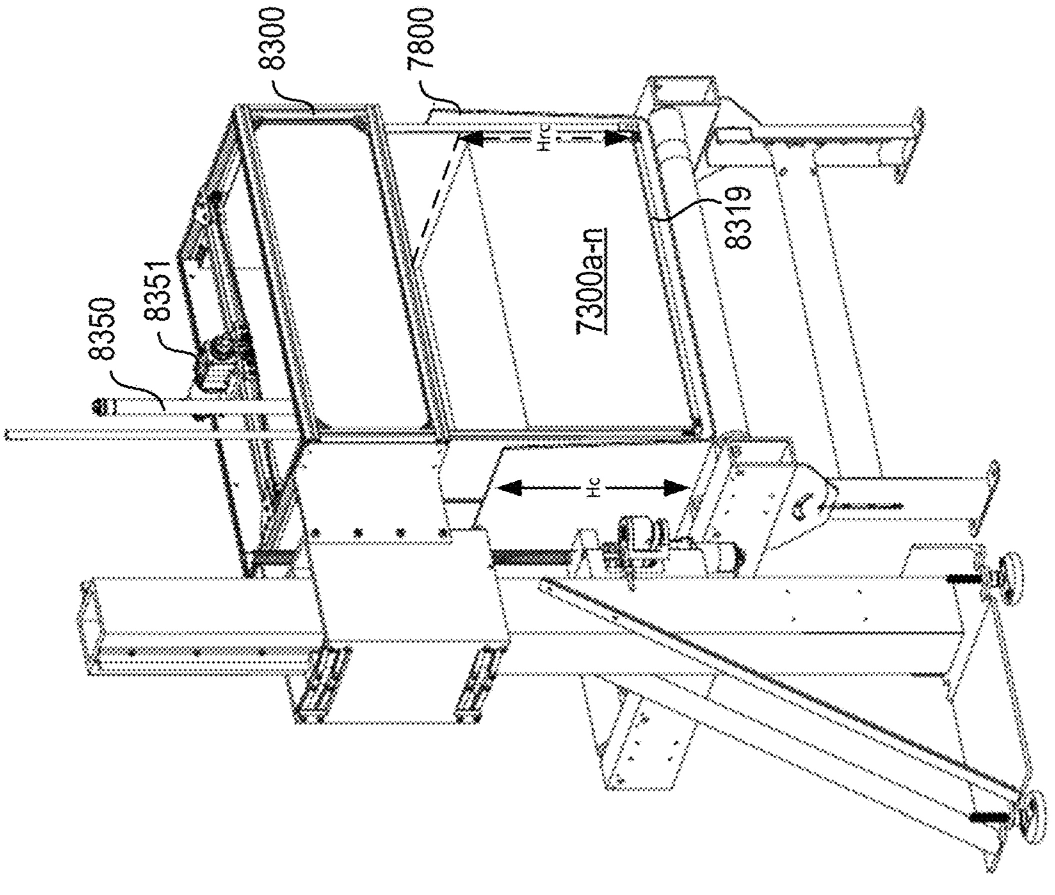
FIG. 33A depicts a perspective view of refillable cartridge disposed on a movable support for loading folded laundry into a container with the refillable cartridge fully lowered within a container for delivering fold laundry thereto with the receiving surface still in place and with the container front wall cross sectioned to show the cartridge deposited therein.
Figure 34B:
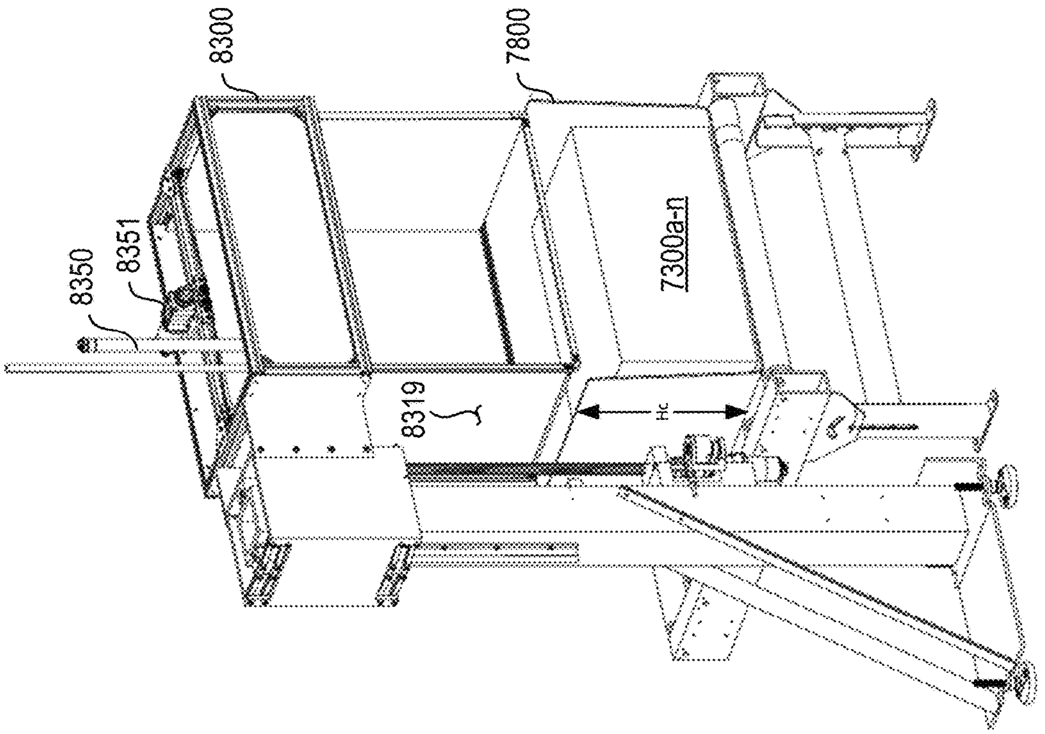
FIG. 34B depicts the view of 34A with the refillable cartridge fully retracted (e.g., raised) from the container, leaving the articles of laundry disposed within the container.
Figure 34A:
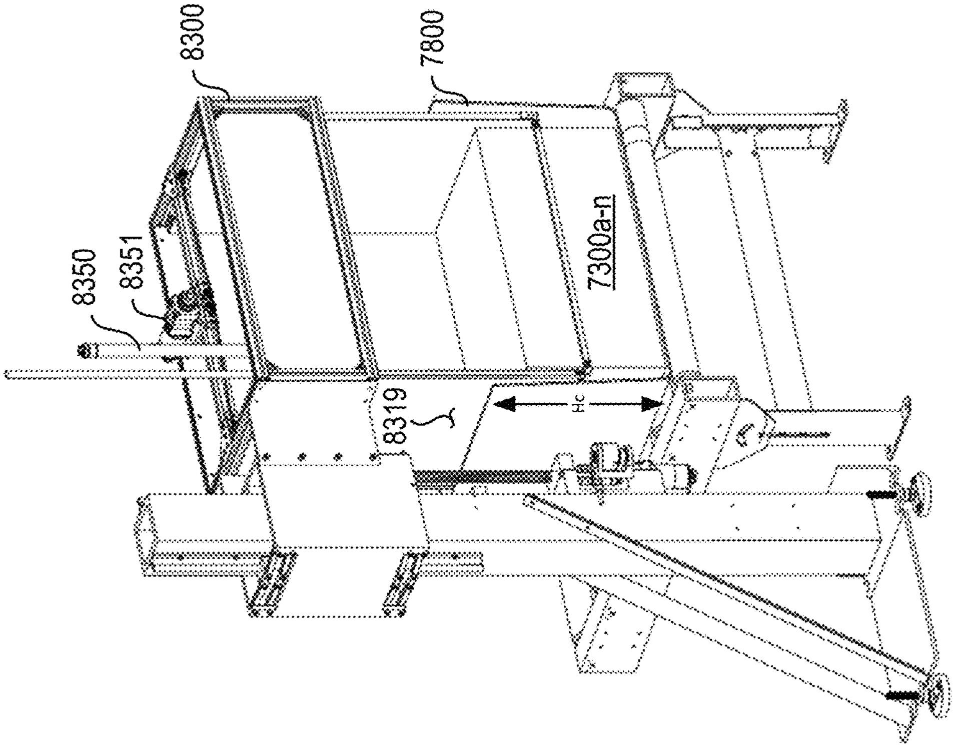
FIG. 34A depicts the view of 33B with the refillable cartridge partially retracted (e.g., raised) from the container.

As shown in FIGS. 33A-B, in implementations, the at least one controller 8005, 205 is configured to instruct at least one drive 8351 to retract the removable receiving surface 8319 in response to receiving a signal output from the one or more position sensors indicative of the refillable cartridge 8300 being positioned at the unloading height within a container 7800. Additionally or alternatively, the actuation of the drive motor 8351 retracting the receiving surface 8319 can be triggered by a signal output from a proximity sensor (not shown) mounted at least one of in or on the exterior surface of the refillable cartridge or the interior surface of the container 7800.

In implementations, as shown in FIGS. 7C and 33A-B, one or more plungers 8350, 8350*a*-*b* are configured to engage the received at least one unbound folded laundry article 7300 received within the refillable cartridge 8300, and apply a compression force, rest unpressurized on top of a folded laundry article 7300 or stack 7301 of folded laundry articles to assist in height sensing, and retract from the at least one unbound folded laundry article 7300 or stack 7301 of unbound folded laundry articles such that they are compressed within the refillable cartridge 8300 for maximum filling. Additionally or alternatively, in implementations, the one or more plungers 8550 are configured to remain engaged with the received at least one unbound folded laundry article 7300 or a stack of unbound folded laundry articles during a descent of the refillable cartridge 8300 into the container 7800 to ensure maximum compression and/or prevent any jostling of stacked, folded laundry articles during descent. In implementations, a plunger compression force comprises a range of between about 0.25 lbf to 8 lbf. In implementations, each pneumatic cylinder driving a plunger is driven by pressurized air in a range of between about 10 PSI to 20 PSI.

In implementations, each one of the one or more plungers 8350 can comprise a plunger drive in operative communication with the one or more plungers 8350 and at least one position sensor disposed on the one or more plungers 8550*a*-*b*. The at least one position sensor is configured to sense a height of the at least one unbound folded laundry article 7300 or stack of unbound folded laundry articles received within the refillable cartridge 8300 and output a signal indicative of the height to the at least one controller 8005, 205. In implementations, the at least one position sensor comprises an encoder on a drive motor of the one or more plungers and/or a distance sensor measuring the height of at least one of the one or more the plungers 8350 from some fixed point. Alternatively, the one or more plungers 8350*a*-*b* are actuated with at least one pneumatic cylinder. The compressive force of the one or more plungers 8350 is set by at least one of the size of the cylinder (e.g., the air pressure) or the air pressure actuating it. This eliminates a need for load sensing such that the one or more plungers 8350 would always press down with a constant force. A distance sensor mounted above the one or more plungers 8350 then measures the height of the plunger and/or the height of the stack 7301 of folded laundry articles 7300*a*-*n*.

Additionally or alternatively, in implementations, a plate 8353 (FIG. 35A) of the at least one plunger 8350 comprises a compliant surface therebeneath for accommodating a stack having an uneven height, or in the instance of the plate spanning more than one stack of varying heights, for accommodating a height variance across two stacks of folded laundry articles. In implementations, the plate 8353 comprises a thin rigid material, such as metal or plastic, that is about ?" to ½" thick (e.g., 3 mm to 12 mm) and the complaint contact surface therebeneath comprises a compliant material such as a foam layer making the overall combined height of the plate and plunger between about ⅛" to 5" (e.g., 3 mm to 12 cm) deep in a vertical direction.

Additionally, in implementations, the at least one plunger 8350*a-b* is a single plunger disposed within the refillable cartridge 8300 in alignment with a leading stack adjacent the sidewall up which the receiving surface retracts. Plunging the leading stack assists with preventing the folded laundry articles from crumpling and/or unfolding as the receiving surface 8319 is retracted.

Although implementations of height sensing of one or more unbound folded laundry articles received within the refillable cartridge 8300 have been described in some implementations, additionally or alternatively, the at least one controller 8005, 205 is configured to determine whether or not the received one or more unbound folded laundry articles 7300*a-n* exceeds the threshold height Hc by tracking the heights of the queue articles or stacks of articles on the at least one placer conveyor 8200, 8200*a-b* and establishing their order along spaced apart positions 8110*a*(*a*1-*f*2)-8110*d*(*a*1-*f*2) for optimized filling of the refillable cartridge 8300. For example, the one or more unbound folded laundry articles 7300*a-n* can be queued in stacks of known heights along the at least one placer conveyor 8200, 8200*a-b* so that the at least one controller 8005, 205 can calculate the appropriate number of stacks of folded laundry articles to insert into the refillable cartridge 8300 to optimize filling the container 7800 with as little empty space as possible and without exceeding a hold volume of the container 7800. Additionally or alternatively, in implementations, one container's-worth of stacks of folded laundry articles 7300*a-n* are queued at a single time and stacked intelligently according to at least one of article type, size, and folded article orientation.

Additionally or alternatively, in implementations, the at least one controller 8005, 205 is configured to predictively model using a machine learning model how much one or more laundry articles 7300, 7300*a-b* and stacks 7301, 7301*a-n* of laundry articles will compress in the container 7800 when packed together. Additionally or alternatively, in implementations, the at least one controller 8005, 205 is configured to predictively model how much one or more laundry articles 7300, 7300*a-b* and stacks 7301, 7301*a-n* of laundry articles disposed on the plurality of tiered platforms 8105*a-d* will compress in a container based on analyzing a depth camera map for a maximum height of a given stack and its average height (e.g., maximum height and average height of a stack of uneven top surface height). Additionally or alternatively, in implementations, the at least one controller 8005, 205 is configured to predictively model how much one or more laundry articles 7300, 7300*a-b* and stacks 7301, 7301*a-n* of laundry articles will compress in a container based on receiving a sensor signal indicative of two measurements in the refillable cartridge 8300—the two measurements being a resting height of a plunger 8350, 8350*a-b* when air is exhausted from a piston cylinder, and a compressed height of the plunger 8350, 8350*a-b* during downwards actuation and compression of a stack. Based on receipt of these two output signals, the at least one controller 8005, 205 is configured to determine how springy and compressible the stack 7301 is beneath the plunger 8350, 8350*a-b*.

Additionally or alternatively, the at least one controller 8005, 205 is configured to use one or more of the above methods in addition to calculating a height from adding together stack heights of one or more stacks 7301, 7301*a-n* disposed on the at least one placer conveyor 8200, 8200*a-b*. The at least one controller 8005, 205 can then measure the height of the stacks when placed in the refillable cartridge 8300 with the plungers, adding a tolerance in a range of 0.5-3 inches (1.27 cm-3 cm) for stack springback (e.g., folded laundry articles expanding vertically after compression by the plunger 8350, 8350*a-b*).

Figure 36:
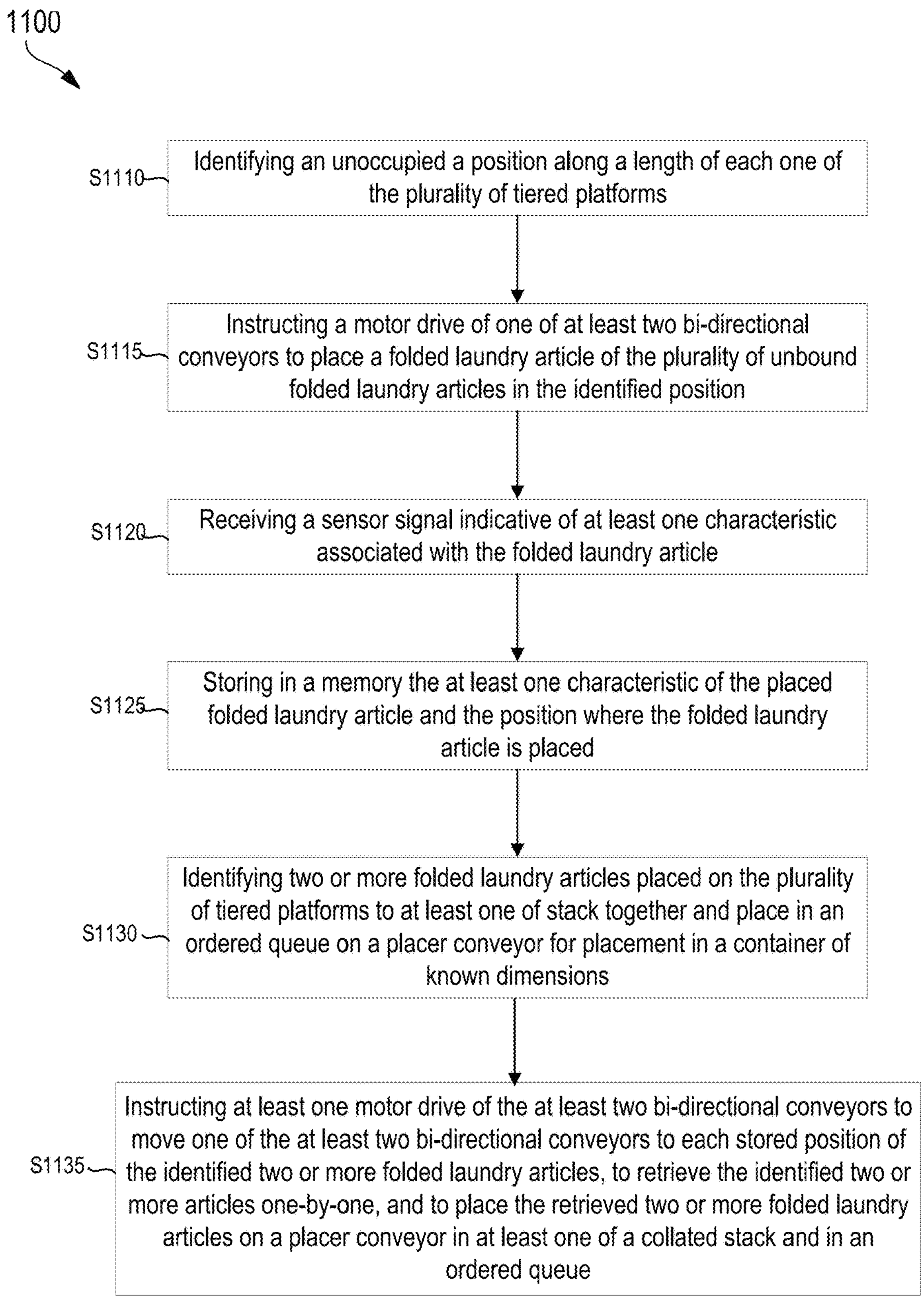
FIG. 36 depicts an example method of placing, retrieving, batching, and queuing for packing a plurality of unbound folded household laundry articles.

Referring now to FIG. 36, any of the examples and implementations described previously with regard to the system 8000 are applicable to implementations described herein with regard to a method 1100 of robotically packing a container 7800 with one or more unbound folded laundry articles 7300, 7300*a-n* or stacks 7301, 7301*a-n* of unbound folded laundry articles comprising household laundry. The method 1100 of packing is configured to be executed autonomously by at least one controller 8005, 205, and the at least one controller 8005, 205 is configured to be in operative communication with the one or more processors, sensors, and drives of the system 8000 described with regard to all of the preceding implementations, including the controls schematic of FIG. 18. In examples, the at least one controller 8005, 205 is configured to communicate with each device of the system 8000 over a communication network 230 via at least one of wired and wireless communication protocols.

In implementations, a method for rearranging in a packing order a plurality of unbound folded laundry articles disposed on a plurality of tiered platforms 8105*a-d* comprises at least one controller 8005, 205 identifying S1110 an unoccupied spaced apart position 8110*a*(*a*1-*f*2)-8110*d*(*a*1-*f*2) (e.g., coordinate positions) along a length L of each one of the plurality of tiered platforms 8105*a-d*. In implementations, one or more sensors in communication with the at least one controller is configured to output a signal indicative of the one or more unoccupied positions 8110*a*(*a*1-*f*2)-8110*d*(*a*1-*f*2). Additionally or alternatively, in implementations, the method comprises storing in a memory a record of the open, unoccupied spaced apart positions 8110*a*(*a*1-*f*2)-8110*d*(*a*1-*f*2) configured to subsequently receive a folded laundry article 7300. The method comprises instructing S1115 a motor drive of one of at least two bi-directional conveyors 8400*a-b* to place a folded laundry article 7300 of the plurality of unbound folded laundry articles 7300*a-n* in the identified position. The method 1100 comprises receiving S1120 a sensor signal indicative of at least one characteristic associated with the folded laundry article 7300 and storing S1125 in a memory 8010, 210 the at least one characteristic of the placed folded laundry article and the position 8110*a*(*a*1-*f*2)-8110*d*(*a*1-*f*2) where the folded laundry article 7300 is placed. In implementations, the method additionally includes updating in a memory store the remaining open, unoccupied spaced apart positions 8110*a*(*a*1-*f*2)-8110*d*(*a*1-*f*2) configured to subsequently receive a folded laundry article. The method comprises identifying S1130 two or more folded laundry articles placed on the plurality of tiered platforms 8105*a-d* to at least one of stack together on at least one of a static one of the a plurality of tiered platforms 8105*b-d* and at least one placer conveyor 8200, 8200*a-b* and place in an ordered queue on the at least one placer conveyor 8200, 8200$a$-$b$ for placement in a container 7800 of known dimensions.

In implementations, as previously described with regard to methods of adaptive modelling, stacking folded laundry articles together in a stack 7301 comprises identifying one or more matching characteristics including at least one of article type, article footprint area, and article wearer. In implementations, the at least one controller 8005, 250 is configured to identify, based on sensor outputs of one or more preceding robots (3000, 4000, 5000, 6000, 7000), two or more folded laundry articles for stacking together prior to placing on one of the plurality of platforms 8105$a$-$d$. Additionally or alternatively, in implementations, the at least one controller 8005, 250 is configured to instruct the at least two bi-directional conveyors 8400, 8400$a$-$b$ to build a stack 7301 of two or more folded laundry articles 7300 on one of the static shelves 8105$a$-$d$ rather than identifying an open position, especially if no open positions remain.

Once folded laundry articles 7300$a$-$n$ are disposed on the plurality of platforms 8105$a$-$d$, the method 1100 comprises instructing S1135 at least one drive motor 8460 of the at least two bi-directional conveyors 8400$a$-$b$ to move one of the at least two bi-directional conveyors 8400$a$-$b$ to each stored position 8110$a$($a$1-$f$2)-8110$d$($a$1-$f$2) (e.g., a coordinate position) of the identified two or more folded laundry articles 7300, 7300$a$-$n$, to retrieve the identified two or more folded laundry articles one-by-one or in a stack 7301, and to place the retrieved two or more folded laundry articles or stack 7301 of folded laundry articles on at least one placer conveyor 8200, 8200$a$-$b$ in at least one of a collated stack 7301 and in an ordered queue for loading into a container 7800 for maximum volume occupancy and stack stability within the container 7800. Additionally or alternatively, in implementations, each one of the at least two bi-directional conveyors 8400$a$-$b$ is configured to retrieve one or more articles from the for depositing at one or more positions on the at least one placer conveyor 8200, 8200$a$-$b$, and in implementations the at least two bi-directional conveyors 8400$a$-$b$ can operate simultaneously.

Figure 37A:
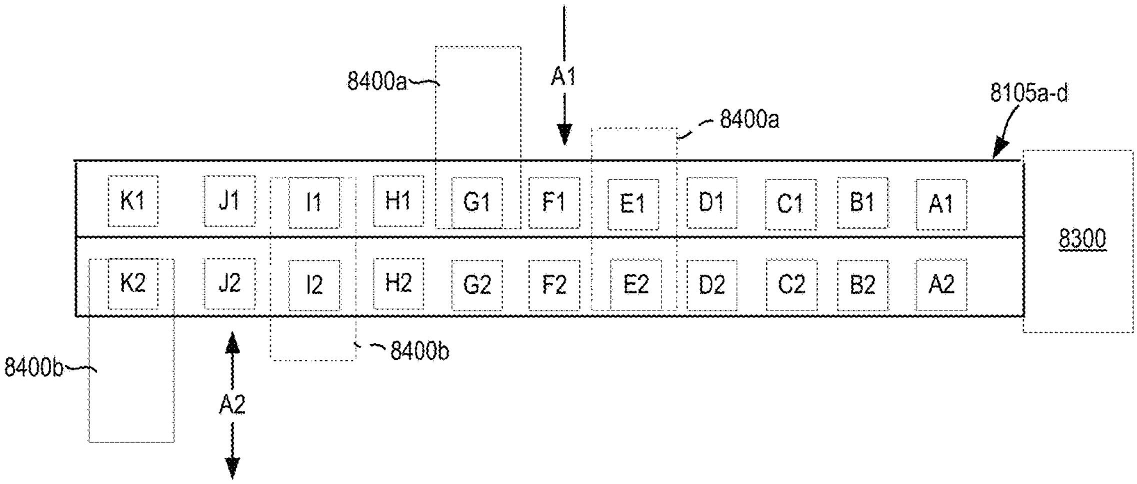
FIG. 37A depicts a schematic top-down view of an example placing and sorting system.

As shown in FIG. 37A and as described previously with regard to implementations, the at least two bi-directional conveyors 8400$a$-$b$ comprises at least one bi-directional conveyor disposed on each lengthwise side of plurality of tiered platforms 8105$a$-$d$ and each of the at least two bi-direction conveyors 8400$a$-$b$ is configured to reach front and back ones (nearest and furthest one) of a plurality of spaced apart positions A(1-2)-K(1-2). In implementations, both of the at least two bi-directional conveyors 8400$a$-$b$ are configured to place and rearrange folded laundry articles on the plurality of tiered platforms 8105$a$-$d$ and at least one placer conveyor 8200, 8200$a$-$b$. Alternatively, in implementations, as shown in FIG. 37A one bi-directional conveyor 8400$a$ moves articles in the direction of arrow A1 from a folding robot and/or unloading station to the plurality of spaced apart positions. The other one of the at least two bi-directional conveyors 8400$b$ moves articles off and onto the plurality of tiered platforms 8105$a$-$d$ in the directions of double arrow A2 and is dedicated to rearranging the folded laundry articles and stacking and queuing folded laundry articles on at least one placer conveyor.

Figure 37B:
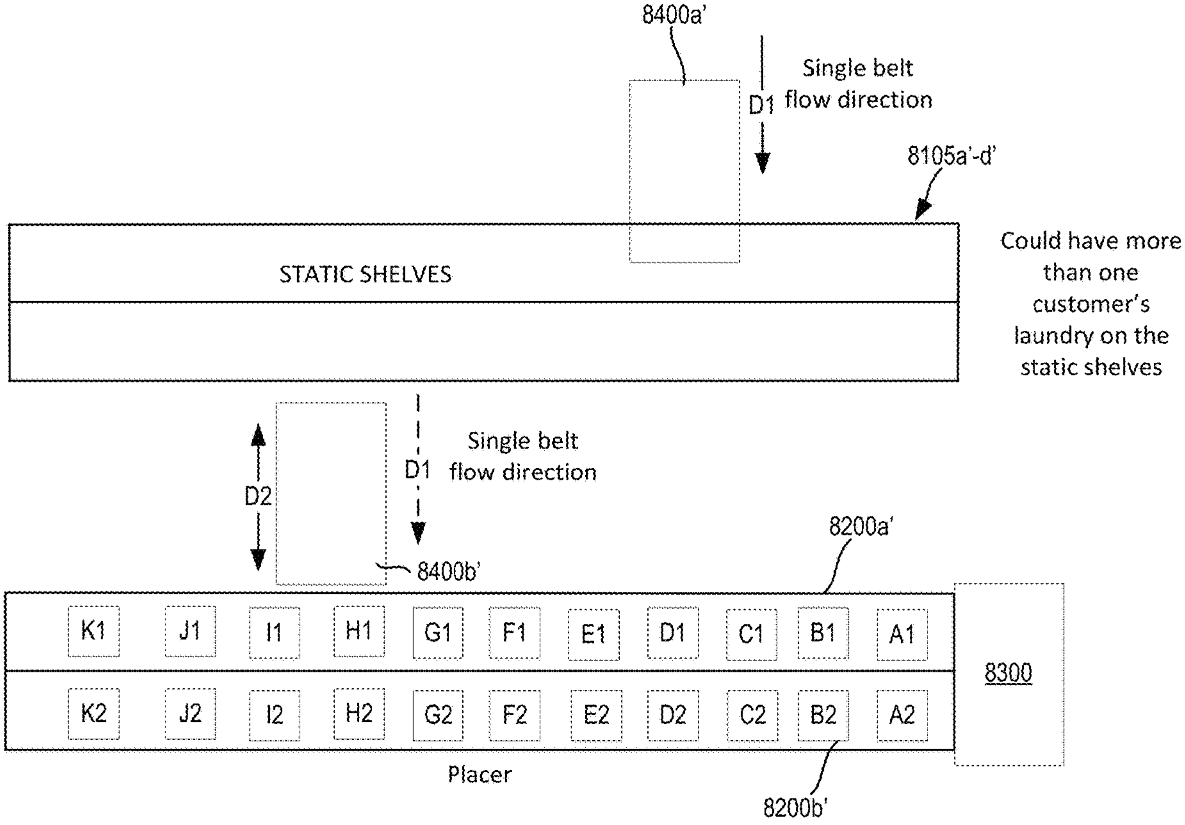
FIG. 37B depicts a schematic top-down view of an alternate example placing and sorting system.

Alternatively, in implementations, as shown in FIG. 37B a plurality of tiered platforms 8105$a$'-d' comprises vertically stacked static shelves configured to receive folded laundry articles of one or more customer households. Each household's laundry can be collated into stacks 7301$a$-$n$ on one or more placer conveyors 8200', 8200$a$'-b' disposed adjacent and parallel to the plurality of tiered platforms 8105$a$'-d'. One stacking conveyor 8400$a$' of at least two stacking conveyors 8400$a$'-b' moves articles in the direction of arrow D1 from a folding robot and/or unloading station to the plurality of tiered platforms. 8205$a$'-d'. The other one of the at least two stacking conveyors 8400$b$' cantilevers in the direction of double arrow D2 to move folded laundry articles 7300 off and onto the plurality of tiered platforms 8105$a$'-d' in the directions of arrow D2 to deposit each folded laundry article into one or more ordered stacks on at least one placer conveyor 8200', 8200$a$'-b'. In implementations, the at least one placer conveyor 8200', 8200$a$'-b' can be flanked along either side by pluralities of tiered platforms and packing boxes (e.g., containers 7800) for one or more households and can switching between receiving articles from a plurality of tiered platforms on one side or the other. Additionally, in implementations, the at least two stacking conveyors 8400$a$'-b' need only run their belts in a single direction, that of arrows D1, thereby reducing the requirements for belt tensioning and tracking required of bi-directional conveyors.

Turning now to FIGS. 38A-39B, various implementations of methods of queuing and placing one or more folded laundry articles 7300, 7300$a$-$n$ in one or more stacks 7301, 7301$a$-$n$ in a refillable cartridge or container 7800 are shown.

FIG. 38A depicts a schematic top-down view of an example of stacked folded laundry articles on a placer conveyor 8200. In implementations, the articles are layered in a column prior to placing in a refillable cartridge or container. For example, in implementations, one or more larger articles 7300$a$ can be disposed beneath one or more smaller folded articles 7300$b$, 7300$c$ stacked side-by-side atop the larger article 7300$a$. In implementations, in which the at least one placer conveyor 8200 comprises two or more placer conveyors 8200$a$-$n$, one or more articles can span across the two or more placer conveyors 8200$a$-$n$ and the two or more placer conveyors can move together to deliver that spanning folded laundry article or articles into the refillable cartridge 8300.

FIG. 38B depicts a schematic cross section view of folded laundry articles of a plurality of sizes intelligently sorted and stacked for maximally filling a container without empty space. In implementations, the articles 7300$a$-$n$ are placed by at least one placer conveyor 8200, 8200$a$-$b$ in a stacked and brick-layered configuration to fill the entire volume of a container 7800. The at least one controller 8005, 205 is configured to analyze the heights and area footprints of each folded laundry article 7300$a$-$n$ and determine an order in the direction of placement (e.g., the direction moving the folded laundry articles into a refillable cartridge and/or container) and a width position across the at least one conveyor 8200, 8200$a$-$b$ at which to place each folded laundry article such that the plurality of folded laundry articles 7300$a$-$n$ are placed efficiently against and between one another within the container 7800.

FIG. 38C depicts a schematic top-down view of an example placer conveyor 8200" for loading folded laundry articles single file into an open end of a rectangular container or refillable cartridge 8300. In implementations, a single lane placer conveyor 8200" is configured to load into the container or refillable cartridge 8300 a back stack of folded laundry articles 7300$a$-$c$ first and then a front stack of folded laundry articles 7300$d$-$n$. Additionally or alternatively, in implementations, the single lane placer conveyor 8200" is configured to load folded laundry articles 7300$a$-$n$ incrementally in a bricklaying manner matching heights back-to-front throughout the loading process. Although the example of FIG. 38C shows two stacks of folded laundry articles, this method of loading is not limited to two discrete stacks.

Alternatively, in implementations as shown in FIG. 38D, the plurality of tiered platforms 8105, 8105*a-d* comprise stationary platforms and a single queue-location placer conveyor 8200''' is at least one of adjacent to the plurality of tiered platforms 8105, 8105*a-d* and disposed end to end with a lowest one of the plurality of tiered platforms. The single queue location placer conveyor 8200''' comprises only an extendable nose with a surface for queuing multiple full (e.g., not partial) stacks of folded laundry articles 7300*a-n*. The two or more bi-directional conveyors 8400*a-b* are configured to stack folded laundry articles on the single queue location placer conveyor 8200''' directly for packing into the refillable cartridge 8300. In implementations, the multiple stacks queued on the single queue location placer conveyor 8200''' comprises at least one of a single fully-assembled container's 7800 worth of one or more stacks of folded laundry articles that would then be loaded in their entirety into a refillable cartridge 8300 as opposed to being loaded incrementally (e.g., combining partial stacks 7300*a-n* disposed on a longer placer conveyor for sequential loading into the refillable cartridge 8300).

Additionally or alternatively, in implementations, the multiple stacks queued on the single queue location placer conveyor 8200''' can comprise several fully-assembled container's 7800*a-n* stacks 7301*a-n* for a single customer. The single queue location placer conveyor 8200''' can comprise several full-container's-worth stack assembly positions thereon such that many sub-stacks aren't needed and the size and cost of a longer placer conveyor is reduced by assembling multiple containers' worth of aggregated folded laundry articles for loading sequentially in their cumulative entirety into their containers.

This alternate configuration and method of using a single queue location placer conveyor 8200''' enables additional buffer space on the plurality of tiered platforms 8105*a-d* and potentially more closely layered platforms 8105*a-d* for laying out a customer's entire load of folded laundry articles 7300*a-n* prior to combining in stacks in an order for placing in at least one of a refillable cartridge 8300 and a packing container 7800 as fully and stably as possible. In this implementation of packing folded laundry with a single queue-location placer conveyor 8200''' at least one of the at least two bi-directional conveyors 8400*a-b* is configured to load up stacks at a single assembly station comprising a one-stack-size placer conveyor that can then load the refillable cartridge. Additionally or alternatively, at least one of the at least two bi-directional conveyors 8400*a-b* is configured to load a refillable cartridge 8300 directly.

Figure 40:
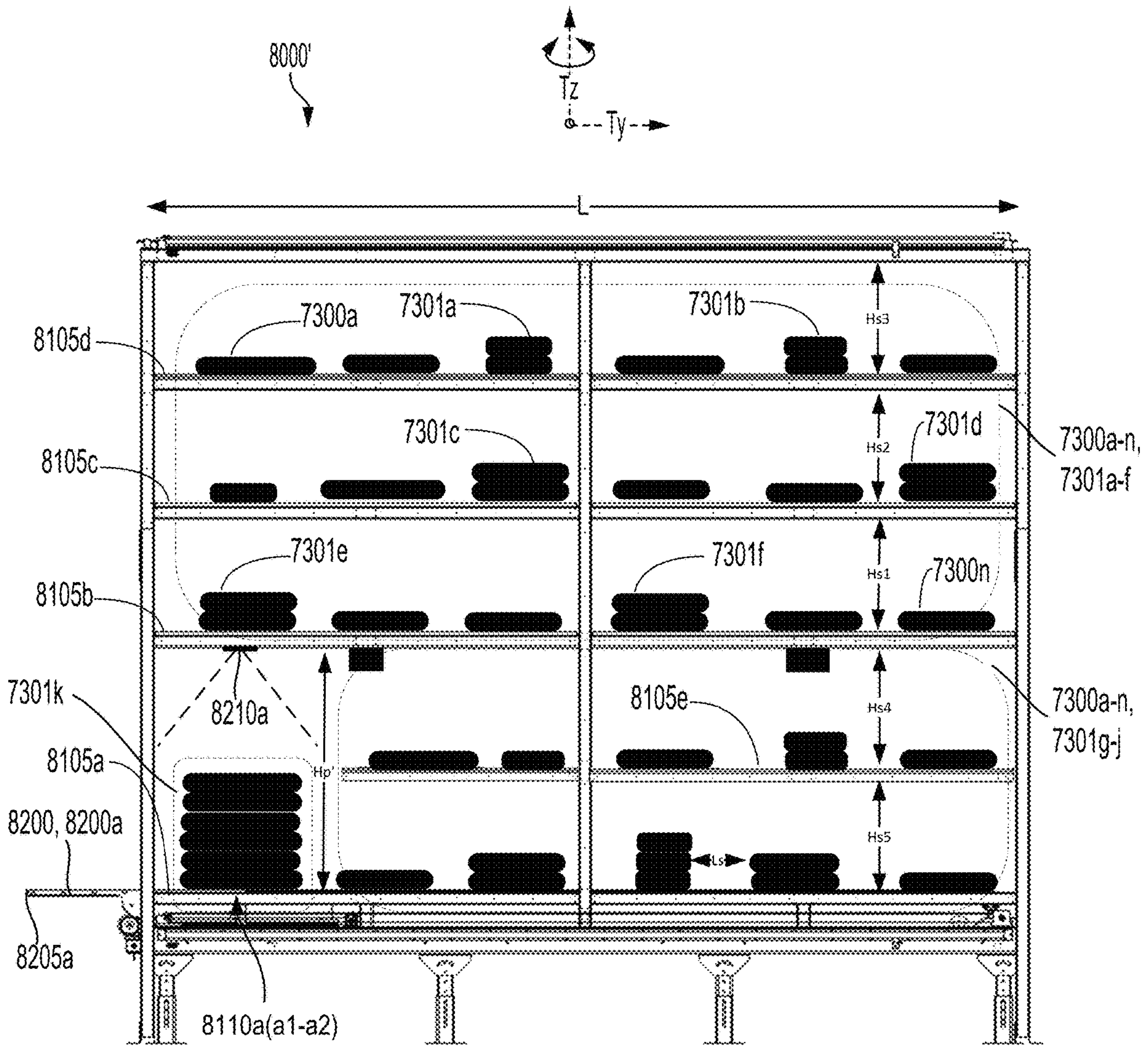
FIG. 40 depicts a schematic side view of an example alternate tiered packing system with folded laundry articles disposed on a plurality of tiered platforms.

Alternatively, in implementations, as shown in FIG. 40 a single, front most position or pair of positions on at least one placer conveyor 8200 is configured to receive an assembled stack 7301*k* of folded laundry articles 7300, 7300*a-n* for placing in a refillable cartridge 8300. The stack 7301*k* can comprise an entire container's worth of folded laundry articles or a partial container's worth of folded laundry articles. In the implementation of FIG. 40, an additional platform 8105*c* is included between the lowest platform 8105*a* of the plurality of platforms (e.g., the at least one placer conveyor 8200, 8200*a-b*) and the second platform 8105*b*, but not extending the full-length L of the plurality of tiered platforms 8105*a-c*. The additional platform 8105*e* (e.g., additional to the implementation of FIG. 7A) is shorter than the remaining platforms such that the front most loading position on the lowest platform 8105*a*(e.g., the at least one placer conveyor 8200, 8200*a-b*) can accommodate a stack 7301*k* of folded laundry articles. Similar to the implementation of FIG. 38C, in this implementation, at least one of the at least two bi-directional conveyors 8400*a-b* is configured to load up one or more stacks at a single assembly position 8110*a*(*a*1-*a*2) on the extendable and retractable nose end of the at least one placer conveyor 8200, 8200*a-b* for loading the refillable cartridge. Additionally or alternatively, the system 8000 is configured to measure article heights and stack heights at the single assembly position 8110*a*(*a*1-*a*2) with a sensor 8210*a* (e.g., a depth camera) such that the at least one controller 8005, 205 can determine, based on an output of the sensor, that a stack 7301*k* of folded laundry articles 7301*k* will fit within a remaining empty volume within the refillable cartridge 8300.

A spacing (e.g., height Hs4) between the additional platform 8105*c* and a platform above and a spacing (e.g. height Hs5) between the additional platform 8105*e* and the platform below are approximately the same or the same as the spacings (e.g., heights Hs1, Hs2, and Hs3) between the platforms 8105*b-d* above the additional platform 8105*c*. This configuration enables additional buffer space on the plurality of tiered platforms 8105*a-e* and potentially more closely layered platforms 8105*a-e* for laying out a customer's entire load of folded laundry articles 7300*a-n* prior to combining in stacks in an order for placing in at least one of a refillable cartridge 8300 and a packing container 7800 as fully and stably as possible. As shown in FIG. 40, at the single assembly position, the spacing Hp' between the at least one placer conveyor 8200, 8200*a-b* and the platform directly above (e.g., 8105*b*) is greater than the spacing between adjacent pairs of the other platforms (Hs1-Hs5).

Figure 39A:
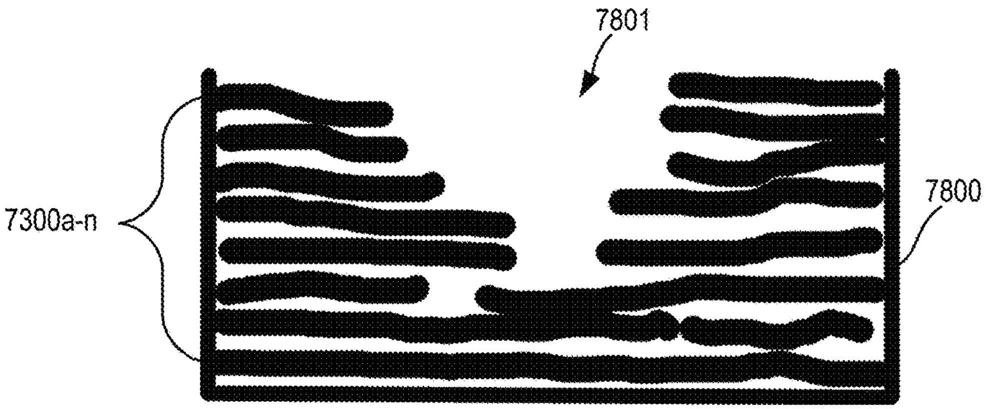
FIG. 39A depicts a schematic cross section view of folded laundry articles of a plurality of sizes filling a container with a central cavity for receiving small, unfolded articles such as socks and underwear.
Figure 39B:
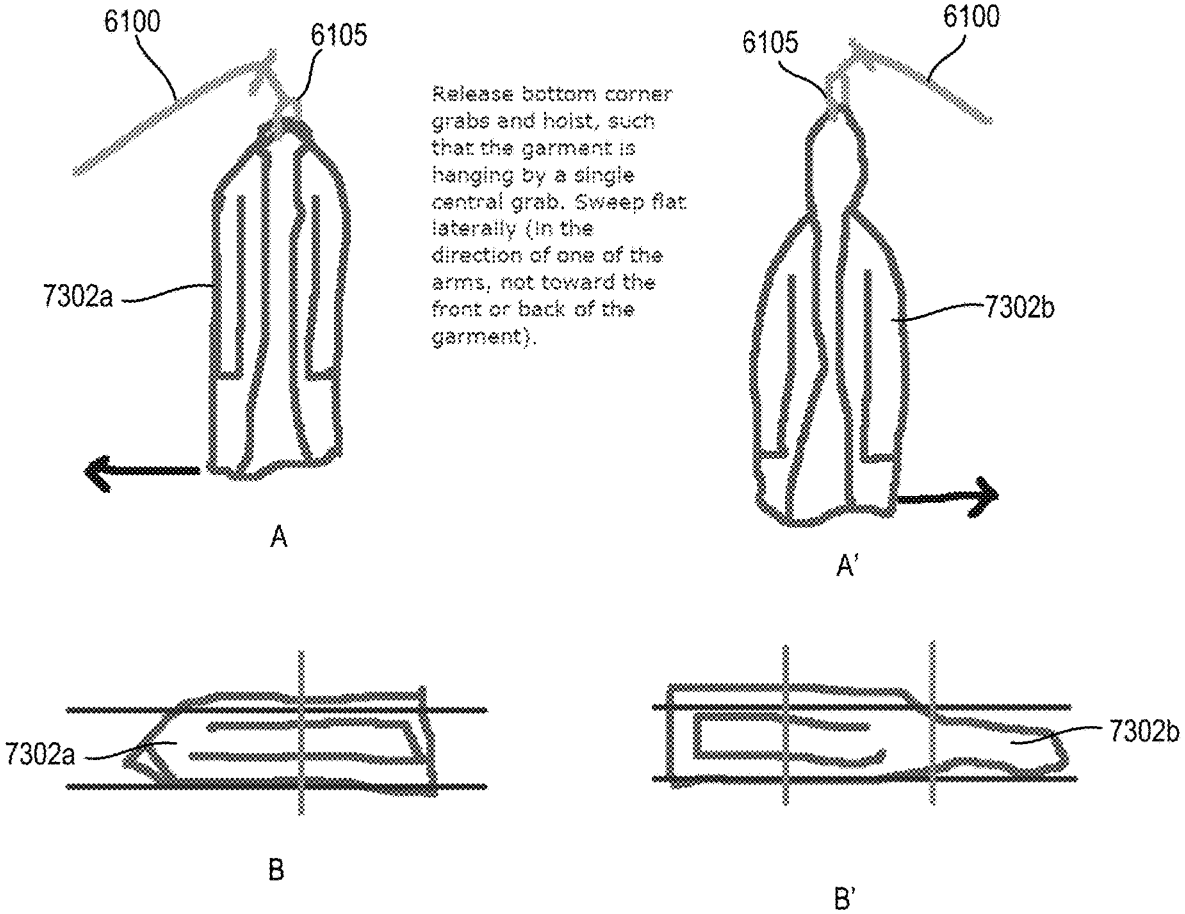
FIG. 39B depicts a sequence of laying an article flat for packing without folding.

Filling a container 7800 intelligently is facilitated by laying out folded laundry articles and determining an order for loading that enables an efficient and stable staking configuration within the container 7800. FIG. 39A depicts a schematic cross section view of folded laundry articles 7300*a-n* of a plurality of sizes filling a container with a central cavity 7801 for receiving small, unfolded articles such as socks and underwear. In implementations, a portion of a plurality of folded laundry articles are loaded efficiently and compactly much like in FIG. 38B along a bottom of a container. A remainder of the folded laundry articles are loaded so that one edge of each article (e.g., a 10" or 12" edge in the example area footprint sizes 7302*a-c* of FIG. 8) is aligned flush with an interior surface of the container 7800, thereby leaving a central cavity 7801 between the folded laundry articles 7300*a-n*. The central cavity 7801 is configured to receive therein small and/or unfolded items such as paired or unpaired socks, underwear, baseball caps, sneakers, etc. In implementations, a plurality of socks can be deposited on one or more of the plurality of tiered platforms 8105*a-n* and one or more sensors can output a signal to the at least one controller 8005, 205 indicative of one or more characteristics of the socks including at least one of color, size, and pattern such that the at least one controller 8005, 205 can instruct one or more of the at least two bi-directional conveyors 8400, 8400*a-b* to match and pair the socks prior to packing.

Additionally, other items intentionally may not be folded prior to packing. For example, a repositioning robot 6000 can manipulate and reposition a clean laundry article for introduction to a packing system 8000 without folding. In implementations, the manipulated and repositioned laundry articles can be handed off to one of the at least two bi-directional conveyors 8400*a-b* of the packing system. Additionally or alternatively, the manipulated and repositioned laundry articles can transit to a folding robot 7000, which skips folding the laundry article and passes it off to a packing system 8000 in its repositioned but not folded state. For example, open front shirts 7302*a* and hooded shirts and sweatshirts 7302*b* can be held by a neck or hood end and laid flat in the direction of a robotic arm 6100 of the repositioning robot 6000 and gripper 6105 holding it as shown in the sequences A-B, A'B' of FIG. 39B. The method of queuing a laid-flat article for packing can include depositing the laid-flat article across the width W of the at least one placer conveyor 8200 (e.g., in implementations, a combined width W of two or more placer conveyors 8200*a-b*) for placement at either the bottom or the top of the container 7800 (e.g., either first or last in the packing queue). Placing the laid flat article into a container last results in fewer wrinkles which may be desirable for certain articles such as, for example, dress shirts.

Figure 41A:
FIG. 41A depicts a schematic cross section side view of folded laundry articles of a plurality of sizes filling a container comprising an inner lining or cinch mechanism for constraining the folded laundry articles in transit.
Figure 41B:
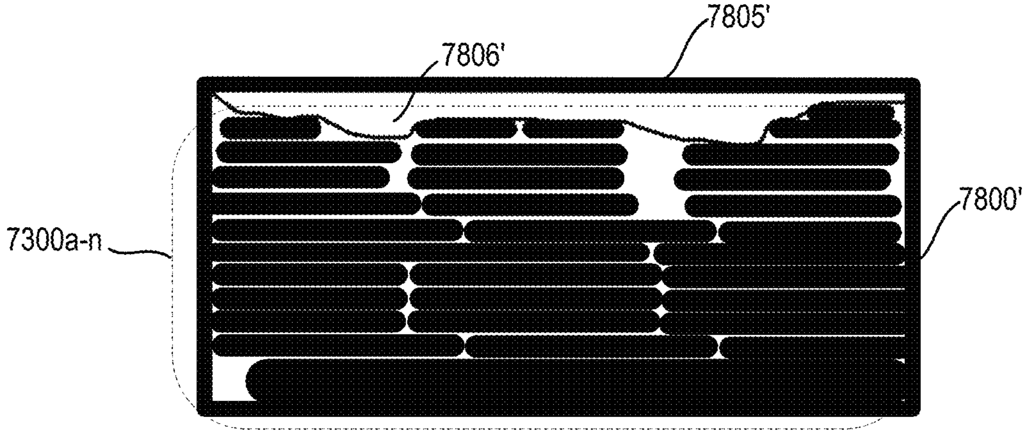
FIG. 41B depicts a schematic cross section side view of folded laundry articles of a plurality of sizes filling a container comprising an inflatable bladder under a closure lid for constraining the folded laundry articles in transit.

In addition to intelligently stacking articles for secured placement within a container 7800, in implementations, as depicted in the schematic of FIG. 41A, a container 7800' comprises an inner lining 7802 having a top end closure, such as a cinch closure for preventing folded articles from toppling or jostling to an unfolded state. Other closure and/or securing mechanisms can comprise at least one of linings with zippered closures, hook and loop closure straps, and inflatable bladders 7806' (FIG. 41B) disposed under top lids 7805' of containers 7800' configured to expand to fill an empty volume of space above loaded articles 7300*a-n* and compress at least the top articles to immobilize them against the articles therebeneath. Mechanical closures can be automatically pulled, zippered, or adhered by one or more robotic arms disposed adjacent the system 8000 within reach of the loaded container 7800'. In implementations of an inflatable bladder, the mechanism for inflation comprises at least one of a mechanical operator (e.g., a button, a pull cord, etc.) activated by a human or robotic arm and a remotely activated actuator in operable communication with the at least one controller 8005, 205 for activating upon sealing the container 7800' for transit.

Although the above-described systems and methods are described in implementations comprising deformable laundry articles, any of the systems and methods herein are applicable to the handling of any deformable articles or any articles of varying sizes needing to be packed in a container 7800 (e.g., a box or a bag) while minimizing empty space and maintaining a placement order and configuration.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

Example embodiments of the present inventive concepts may be embodied in various devices, apparatuses, and/or methods. For example, example embodiments of the present inventive concepts may be embodied in hardware and/or in software (including firmware, resident software, micro-code, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

As used herein, a "neural network" refers to machine learning structures. Neural networks include one or more layers of "neurons" that each receive input information and produce an output as, for example, a weighted sum of the inputs with an optional internal bias value within the neuron, or some other predetermined function that produces an output numeric value based on a combination of the input values to the neuron. The weights that are assigned to different inputs in the structure of the neural network are produced during a training process for the neural network. A simple neural network includes an input layer of neurons connected to an output layer of neurons. The output layer of neurons is configured to produce outputs based on numeric functions applied to the inputs received at the output layer such as threshold functions with parameters that are produced during a training process. A neural network may include "deep" neural networks in which multiple layers of "hidden" neurons are arranged between the input layer and the output layer with varying structures for the hidden layers including fully connected layers where the output of a neuron in a first layer is connected to an input of each neuron in the next layer or partially connected layers where the outputs of neurons in a first layer are only connected to inputs of a portion of the neurons in the next layer.

A "pose" is the position and orientation of an object in a reference frame. In some embodiments, the pose is a position and orientation of a deformable laundry article. The pose can be specified by a position in two- (x,y) or three-dimensions (x,y,z) and a heading angle. The pose can also be further specified by an orientation including a deformable shape or volume of the laundry article, which may take into account folds, creases, curves or other shapes and positions of the laundry article. The reference frame may be a global reference frame that is fixed to the environment or may be a relative reference frame that is in relationship to another object in the environment.

"Deformable" means that a shape of an article can be bent or folded. Deformable laundry articles are typically fabric clothing or washable household items as described herein. Deformable laundry articles do not typically hold a particular or stiff shape when lifted or manipulated.

"Intelligently sorted" refers to grouping or ordering articles, for example, by size, weight, shape, function, color, fabric type, washing and/or drying requirements or other characteristics.

Although the terms "first" and "second" may be used herein to describe elements of the systems and devices herein, this does not necessarily imply an order unless the context indicates otherwise. The terms "first" and "second" are intended to distinguish one element from another element. Thus, a first element could be termed a second element, and similarly, a second element could be termed a first element without departing from the teachings of the present invention.

What is claimed is:

1. A system for autonomously placing and rearranging a plurality of folded laundry articles in a queue for sequential packing comprising:

a plurality of tiered platforms configured to receive thereon the plurality of folded laundry articles at a plurality of spaced apart positions, the plurality of tiered platforms comprising at least one placer conveyor configured to load the plurality of folded laundry articles in a sequential order into a refillable cartridge;

at least two bi-directional conveyors disposed adjacent opposite longest sides of the plurality of tiered platforms configured to at least one of place a folded laundry article of the plurality of folded laundry articles on the plurality of tiered platforms, retrieve a folded laundry article of the plurality of folded laundry articles from the plurality of tiered platforms, and stack a folded laundry article of the plurality of folded laundry articles atop another one of the plurality of folded laundry articles disposed on at least one of the plurality of tiered platforms;

at least two driven support towers slidably engaged with upper and lower support rails disposed along the opposite longest sides of the plurality of tiered platforms, each one of the at least two driven support towers having movably engaged thereon a carriage of the at least two bi-directional conveyors;

at least two carriage drive motors configured to transit the carriage of each one of the at least two bi-directional conveyors longitudinally and vertically to reach each one of the plurality of spaced apart positions and to reach the at least one placer conveyor for placing a retrieved folded laundry article in the ordered queue;

one or more sensors disposed at least one of on and adjacent at least one of the plurality of tiered platforms, the at least two bi-directional conveyors, and the at least two driven support towers, the one or more sensors being configured to output a signal indicative of at least one of one or more occupied spaced apart positions of the plurality of spaced apart positions, one or more characteristics of one or more folded laundry articles at each occupied spaced apart position, a height of a stacked one or more folded laundry articles disposed on the at least one placer conveyor, and a presence of a folded laundry article disposed on one or more of the at least two bi-directional conveyors; and at least one controller in operable communication with the at least two carriage drive motors, at least two support tower drives, the one or more sensors, a belt drive of each of the at least two bi-directional conveyors, a memory, and a communication network, the at least one controller being configured to instruct at least one drive of the at least two driven support towers to transit along the opposite longest sides of the plurality of tiered platforms to one of the plurality of spaced apart positions, and instruct at least one of an elevator drive and a cantilever drive of the at least two carriage drive motors to move at least one of the at least two bi-directional conveyors at least one of vertically and longitudinally to cantilever over and retract from one of the plurality of tiered platforms to at least one of deposit and retrieve at least one of the plurality of folded laundry articles at the one of the plurality of spaced apart positions.

2. The system of claim 1, wherein the at least one controller is further configured to receive via the communication network a signal indicative of the one or more characteristics of each one of the plurality of folded laundry articles.

3. The system of claim 2, wherein the one or more characteristics comprise at least one of an article size, article height, article type, article color, article tilt direction relative to the opposite longest sides of the plurality of tiered platforms, article tilt angle, article material, and article wearer.

4. The system of claim 2, wherein the at least one controller is further configured to store in the memory an association of the one or more characteristics of each one of the plurality of folded laundry articles placed on the plurality of tiered platforms and an occupied one of the plurality of spaced apart positions at which each one of the plurality of folded laundry articles is disposed.

5. The system of claim 2, wherein the at least one controller is further configured to determine, based on the one or more characteristics, an order of arranging on the at least one placer conveyor for packing, two or more of the plurality of folded laundry articles, instruct at least one of the at least two support tower drives and at least one of the at least two carriage drive motors to move at least one of the at least two bi-directional conveyors to a spaced apart position of one of the plurality of folded laundry articles, instruct the belt drive to rotate in a reverse direction to retrieve one of the plurality of folded laundry articles from the spaced apart position, instruct at least one of the at least two support tower drives and at least one of the at least two carriage drive motors transit the at least one of the at least two bi-directional conveyors and the retrieved one of the plurality of folded laundry articles to an ordered position along the at least one placer conveyor, and instruct a belt drive of the at least one of the at least two bi-directional conveyors to rotate in a forward direction to place the retrieved one of the plurality of folded laundry articles at least one of on the at least one placer conveyor and atop a previously deposited another one of the plurality of folded laundry articles in the ordered position for packing.

6. The system of claim 5, wherein determining the order of arranging on the at least one placer conveyor for packing further comprises receiving outputs from one or more sensors regarding each one of the placed folded laundry articles of the plurality of folded laundry articles and determining an order of packing based on at least one of detected folded article sizes of the plurality of folded laundry articles and known packing container dimensions.

7. The system of claim 6, wherein the detected folded article sizes are variable among the plurality of folded laundry articles, the plurality of folded laundry articles comprises household laundry belonging to a common household, and the household laundry comprises two or more article types of at least one of different sizes and different shapes, the two or more article types comprising a longest dimension of between about 4 cm to 500 cm.

8. The system of claim 1, wherein instructing at least one of the at least two carriage drive motors to move at least one of the at least two bi-directional conveyors comprises instructing two or more of the at least two carriage drive motors simultaneously to move two or more of the at least two bi-directional conveyors.

9. The system of claim 1, wherein the at least two bi-directional conveyors run 90 degrees to an orientation of the opposite longest sides of the plurality of tiered platforms.

10. The system of claim 1, wherein the plurality of spaced apart positions comprises at least two parallel lengths of positions disposed adjacent each longest opposite side of the plurality of tiered platforms, and each one of the at least two bi-directional conveyors is configured to reach all of the plurality of spaced apart positions in either of the at least two parallel lengths of positions.

11. The system of claim 10, wherein the at least two bi-directional conveyors comprise a conveyor configured to receive a folded laundry article from a folding robot and place the retrieved folded laundry article at one of the plurality of spaced apart positions on one of the plurality of tiered platforms, and a stacking conveyor configured to retrieve the folded laundry article from the one of the plurality of spaced apart positions and stack the folded laundry article on the at least one placer conveyor in the order for packing into the refillable cartridge.

12. The system of claim 11, wherein the at least one controller is configured to store in the memory the one of the plurality of spaced apart positions on which the retrieved folded laundry article is placed and at least one article characteristic comprising at least one of folded article size and article type.

13. The system of claim 11, wherein the at least one controller is configured to instruct the stacking conveyor to retrieve one or more articles for packing based on at least one of evaluating the one or more characteristics of each one of one or more placed laundry articles at one or more spaced apart positions and receiving at least one sensor output indicative of at least one of a folded article size and article type of one or more laundry articles being folded or expected to be folded.

14. The system of claim 1, wherein the at least one controller is further configured to retrieve from a database for determining the order of packing one or more characteristics comprising at least one of article wearer and customer sorting preference.

15. The system of claim 1, wherein the one or more sensors comprises at least one of an image sensor, a position sensor, and a distance sensor.

16. The system of claim 15, wherein the one or more sensors comprise at least one of a 3-D camera, an IR sensor, a 2-D camera, LIDAR, LADAR, a sonar proximity sensor, an ultrasonic ranging sensor, a radar sensor, and a pair of stereo depth cameras.

17. The system of claim 15, wherein the at least one controller is configured to analyze a received image from an image sensor and process the received image with a classifier to determine at least one of the one or more characteristics.

18. The system of claim 1, wherein each one of the at least two bi-directional conveyors comprise a rotatable surface disposed on the carriage and a drive motor configured to rotate the rotatable surface to move an article disposed thereon in a direction of motion of the rotatable surface.

19. The system of claim 1, further comprising at least one retractable plunger configured to at least one of compress one or more folded laundry articles disposed within a refillable cartridge configured to be loaded with one or more folded laundry articles by the at least one placer conveyor and detect a stack height of the one or more folded laundry articles disposed within the refillable cartridge, the at least one retractable plunger comprising one or more springs mounted to a top surface of a plunger plate.

20. A method for rearranging in a packing order on a placer conveyor a plurality of folded laundry articles, comprising: identifying, at a controller, an unoccupied position along a length of each one of a plurality of tiered platforms configured to receive each one of the plurality of folded laundry articles at a plurality of spaced apart positions, the unoccupied position being at least one of tracked by the controller and detected by one or more sensors configured to output a signal to the controller indicative of the position being unoccupied by a folded laundry article; instructing a motor drive of one of at least two bi-directional conveyors to place one of the plurality of folded laundry articles in the identified unoccupied position; receiving a sensor signal indicative of at least one characteristic associated with the placed one of the plurality of folded laundry articles; storing in a memory in communication with the controller the at least one characteristic of the placed one of the plurality of folded laundry articles and the position where the one of the plurality of folded laundry articles is placed, the at least one article characteristic comprising at least one of folded article size and article type; identifying two or more folded laundry articles of the plurality of folded laundry articles placed on the plurality of tiered platforms to at least one of stack together and place in an ordered queue on the placer conveyor for placement in a container of known dimensions; and instructing at least one motor drive of the at least two bi-directional conveyors in operable communication with the controller to move one of the at least two bi-directional conveyors to each stored position of the identified two or more folded laundry articles; retrieve the identified two or more folded laundry articles individually; and place the retrieved two or more folded laundry articles on the placer conveyor in at least one of a collated stack and an ordered queue.

21. The method of claim 20, wherein the controller is configured to instruct at least one of the at least two bi-directional conveyors to retrieve the identified two or more folded laundry articles upon determining 80 percent or more of the spaced apart positions are occupied by the plurality of folded laundry articles.

22. The method of claim 20, wherein the plurality of folded laundry articles are separated, spread, and folded by a plurality of autonomous systems comprising one or more sensors configured to detect one or more characteristics of each one of the plurality of folded laundry articles and communicate the detected one or more characteristics to the controller for determining two or more articles for stacking together on the placer conveyor.

23. The method of claim 20, wherein the at least two bi-directional conveyors comprise a conveyor configured to receive a folded laundry article from a folding robot and place the retrieved folded laundry article at one of the plurality of spaced apart positions on one of the plurality of tiered platforms, and a stacking conveyor configured to retrieve the folded laundry article from the one of the plurality of spaced apart positions and stack the folded laundry article on the at least one placer conveyor in the order for packing into a refillable packing cartridge.

24. The method of claim 23, further comprising instructing the stacking conveyor to retrieve one or more folded laundry articles of the plurality of folded laundry articles from the plurality of platforms for packing based on at least one of evaluating the one or more characteristics of each one of one or more placed folded laundry articles at one or more of the plurality of spaced apart positions and receiving at least one sensor output indicative of at least one of a folded article size and article type of one or more laundry articles being folded by the folding robot or expected to be folded and received by one of the at least two bi-directional conveyors.

* * * * *